US008156041B2

(12) United States Patent
Jun et al.

(10) Patent No.: US 8,156,041 B2
(45) Date of Patent: Apr. 10, 2012

(54) DYNAMIC INDICATOR FOR CONTEXT SENSITIVE REAL-TIME COMMUNICATIONS

(75) Inventors: Gyuchang Jun, Mountain View, CA (US); Kurt H. Huang, Mountain View, CA (US); Matthew C. Graves, Scotts Valley, CA (US)

(73) Assignee: Digital River, Inc., Minnetonka, MN (US)

( * ) Notice: Subject to any disclaimer, the term of this patent is extended or adjusted under 35 U.S.C. 154(b) by 168 days.

(21) Appl. No.: 10/881,981

(22) Filed: Jun. 29, 2004

(65) Prior Publication Data

US 2005/0044224 A1 Feb. 24, 2005

Related U.S. Application Data

(60) Provisional application No. 60/483,843, filed on Jun. 29, 2003.

(51) Int. Cl.
*G06Q 40/00* (2006.01)

(52) U.S. Cl. ........................................................ 705/39

(58) Field of Classification Search .................... 705/35, 705/39, 41, 26, 27, 14

See application file for complete search history.

(56) References Cited

U.S. PATENT DOCUMENTS

| | | | | |
|---|---|---|---|---|
| 6,912,662 | B1 * | 6/2005 | McCall et al. | 726/26 |
| 2002/0087461 | A1 * | 7/2002 | Ganesan et al. | 705/39 |
| 2002/0087469 | A1 * | 7/2002 | Ganesan et al. | 705/40 |
| 2002/0099607 | A1 * | 7/2002 | Sosa et al. | 705/14 |
| 2002/0111907 | A1 * | 8/2002 | Ling | 705/41 |
| 2002/0138401 | A1 * | 9/2002 | Allen et al. | 705/37 |
| 2004/0059684 | A1 * | 3/2004 | Jang | 705/65 |

OTHER PUBLICATIONS

Definition of limit order: http://www.sec.gov/answers/limit.htm: Apr. 19, 2001.*

Bergstein, Brian, "Tiny Internet Sales Hyped Again, But Skeptics Abound" [online], date unknown, The Associated Press, [retrieved on May 17, 2004]. Retrieved from the Internet: <URL: http://www.usatoday.com/tech/news/2003-12-01-micropay_x.htm>.

Maguire, James, "Big Changes in Small Payments" [online], Mar. 23, 2004, Jupitermedia Corporation, [retrieved on May 17, 2004]. Retrieved from the Internet: <URL: http://ecommerce.internet.com/how/paid/article/0,,10364_3330031_1,00.html>.

(Continued)

*Primary Examiner* — Olabode Akintola

(74) *Attorney, Agent, or Firm* — North Oaks Patent Agency; Shawn B. Dempster; Lynn M. Holly

(57) ABSTRACT

A method and apparatus in which a Spender may spend money to buy an item, spend money on a donation, etc. A Spender (sometimes called a buyer) will typically use client software to access content, where the client is typically a computing device that includes a display, which facilitates the transaction between a Spender and an Earner. An "Earner" (sometimes called a seller) is someone who provides items or content within the system for sale, trade, or acquisition in return for credit or money earned. In the described embodiments, an Earner's server may be anything, which serves content and/or includes an Earner gateway, which facilitates trusted third party interaction frequently used in the system, and may also be used to describe several servers or a server farm. In some embodiments, the Earner's server is included as a part of the server controlling content access.

20 Claims, 53 Drawing Sheets

OTHER PUBLICATIONS

Tedeschi, Bob, "Developing Systems of Online Payment" [online], date unknown, New York Times Company, [retrieved on May 17, 2004]. Retrieved from the Internet: <URL: http://www.nytimes.com/2003/07/21/technology/21ECOM.html?ex=1374206400&en=1ba...>.

"Firstgate states with unique worldwide technology" [online], Jul. 28, 2003, Firstgate Internet Inc., [retrieved on Mar. 24, 2004]. Retrieved from-the Internet: <URL: http://www.firstgate.com/cgi-bin/site_active.pl?TEMPLATE=/EN/presse/pm/01488/index...>.

"Sell Digital Goods Online" [online], date unknown, PayLoadz, Inc., [retrieved on Mar. 24, 2004]. Retrieved from the Internet: <URL: http://payloadz.com>.

"Getting Started" [online], date unknown, PayLoadz, Inc., [retrieved on Mar. 24, 2004]. Retrieved from the Internet: <URL: http://payloadz.com/guide.asp>.

"Online Payment Solution" [online], date unknown, Paystone Technologies Corp., [retrieved on Mar. 24, 2004]. Retrieved from the Internet: <URL: http://paystone.com>.

"Buy Online, Sell Online" [online], date unknown, Paystone Technologies Corp., [retrieved on Mar. 24, 2004]. Retrieved from the Internet: <URL: http://paystone.com/company/index.php?PHPSESSID=ce6da92bfa5779c5e683a435...>.

"News" [online], date unknown, Paystone Technologies Corp., [retrieved on Mar. 24, 2004]. Retrieved from the Internet: <URL: http://paystone.com/company/news.php>.

"Paystone Basics" [online], date unknown, Paystone Technologies Corp., [retrieved on Mar. 24, 2004]. Retrieved from the Internet: <URL: http://paystone.com/support/index.php>.

"Big Change for Small Change" [online], date unknown, Peppercoin, Inc., [retrieved on Mar. 24, 2004]. Retrieved from the Internet: <URL: http://corp.peppercoin.com>.

"Peppercoin Company Overview" [online], date unknown, Peppercoin, Inc., [retrieved on Mar. 24, 2004]. Retrieved from the Internet: <URL: http://corp.peppercoin.com/about/about.jsp>.

"Company History" [online], date unknown, Peppercoin, Inc., [retrieved on Mar. 24, 2004]. Retrieved from the Internet: <URL: http://corp.peppercoin.com/about/history.jsp>.

"Generate Revenue from Your Digital Content and Website" [online], date unknown, Yaga Inc., [retrieved on Mar. 24, 2004]. Retrieved from the Internet: <URL: http://yaga.com/solutions/>.

"Drive Digital Content Sales with Yaga's Affordable ASP Payment Solution" [online], date unknown, Yaga Inc., [retrieved on Mar. 24, 2004]. Retrieved from the Internet: <URL: http://yaga.com>.

"nPost.com Interview with Kurt Huang" [online], Mar. 22, 2004, nPost.com, [retrieved on May 17, 2004]. Retrieved from the Internet: <URL: http://www.npost.com'interview.jsp?intID=INT00081>.

"Recent Articles" [online], date unknown, BitPass, Inc., [retrieved on May 17, 2004]. Retrieved from the Internet: <URL: http://www.bitpass.com/learn/AboutUs/news.html>.

"Press Releases" [online], date unknown, BitPass, Inc., [retrieved on May 17, 2004]. Retrieved from the Internet: <URL: http://www.bitpass.com/learn/AboutUs/releases2004.html>.

"Welcome to Your Account" [online], date unknown, RedPaper, LLC, [retrieved on May 17, 2004]. Retrieved from the Internet: <URL: http://www.redpaper.com/manageAccount.jsp?section=buy&target=buyScoop.jsp%3Fsco...>.

"About Us" [online], date unknown, RedPaper, LLC, [retrieved on May 17, 2004]. Retrieved from the Internet: <URL: http://www.redpaper.com/aboutUs.jsp>.

"Buy RedBucks" [online], date unknown, RedPaper, LLC, [retrieved on May 17, 2004]. Retrieved from the Internet: <URL: http://www.redpaper.com/purchase.jsp>.

"Welcome to My RedPaper" [online], date unknown, RedPaper, LLC, [retrieved on May 17, 2004]. Retrieved from the Internet: <URL: http://www.redpaper.com/userHome.jsp>.

"Can't Stop the Music" [online], date unknown, Guardian Unlimited, [retrieved on May 17, 2004]. Retrieved from the Internet: <URL: http://www.guardian.co.uk/online/story/0,3605,1171203,00.html>.

"Fees" [online], date unknown, PayPal, [retrieved on May 17, 2004]. Retrieved from the Internet: <URL: http://www.paypal.com/cgi-bin/webscr?cmd=display-fees-outside>.

Report International Search Repo and Written Opinion; PCT/US2004/21120; Jun. 29, 2006.

* cited by examiner

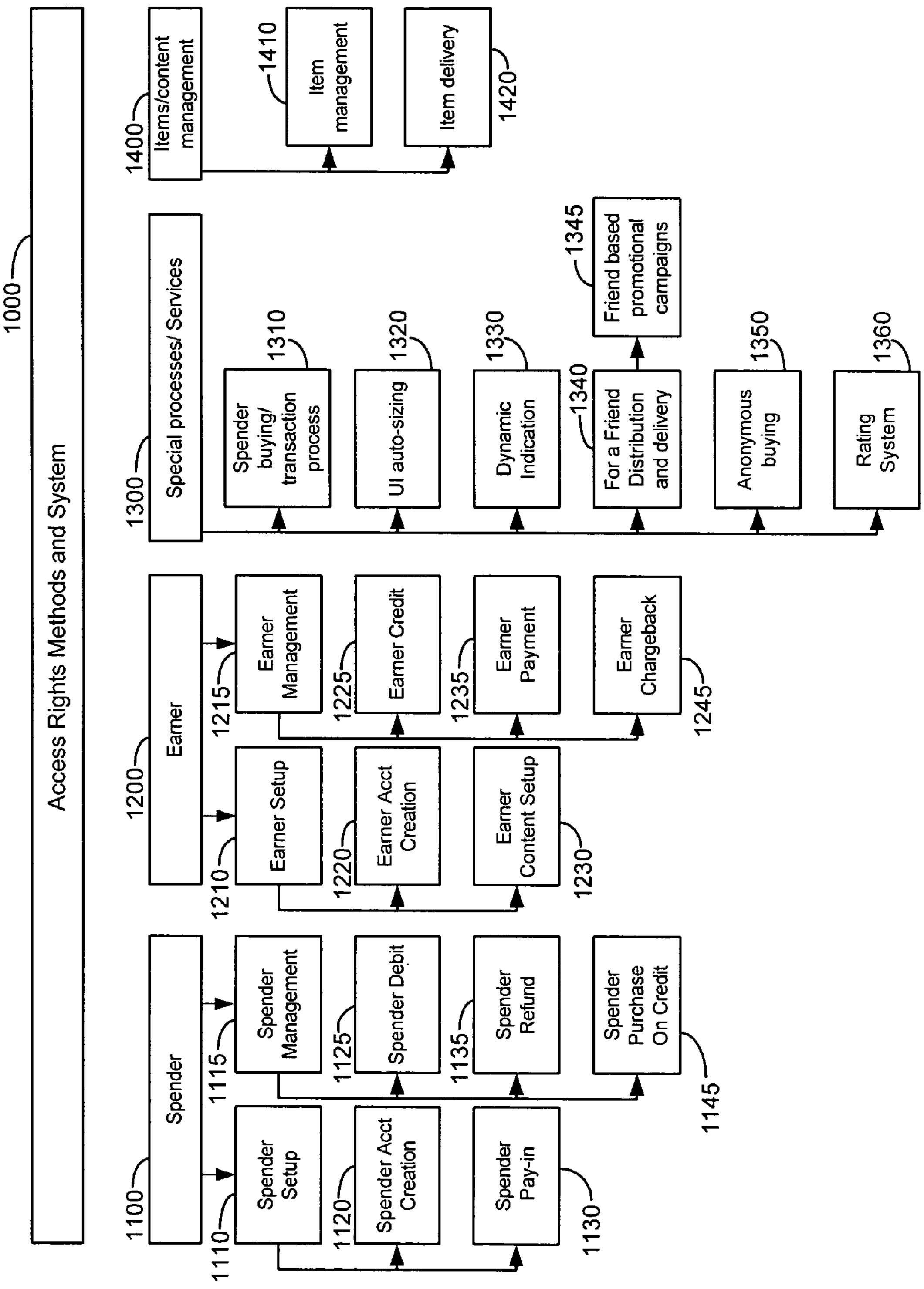
Figure 1 : Method and System Functional Overview

Figure 2A: Functional Division
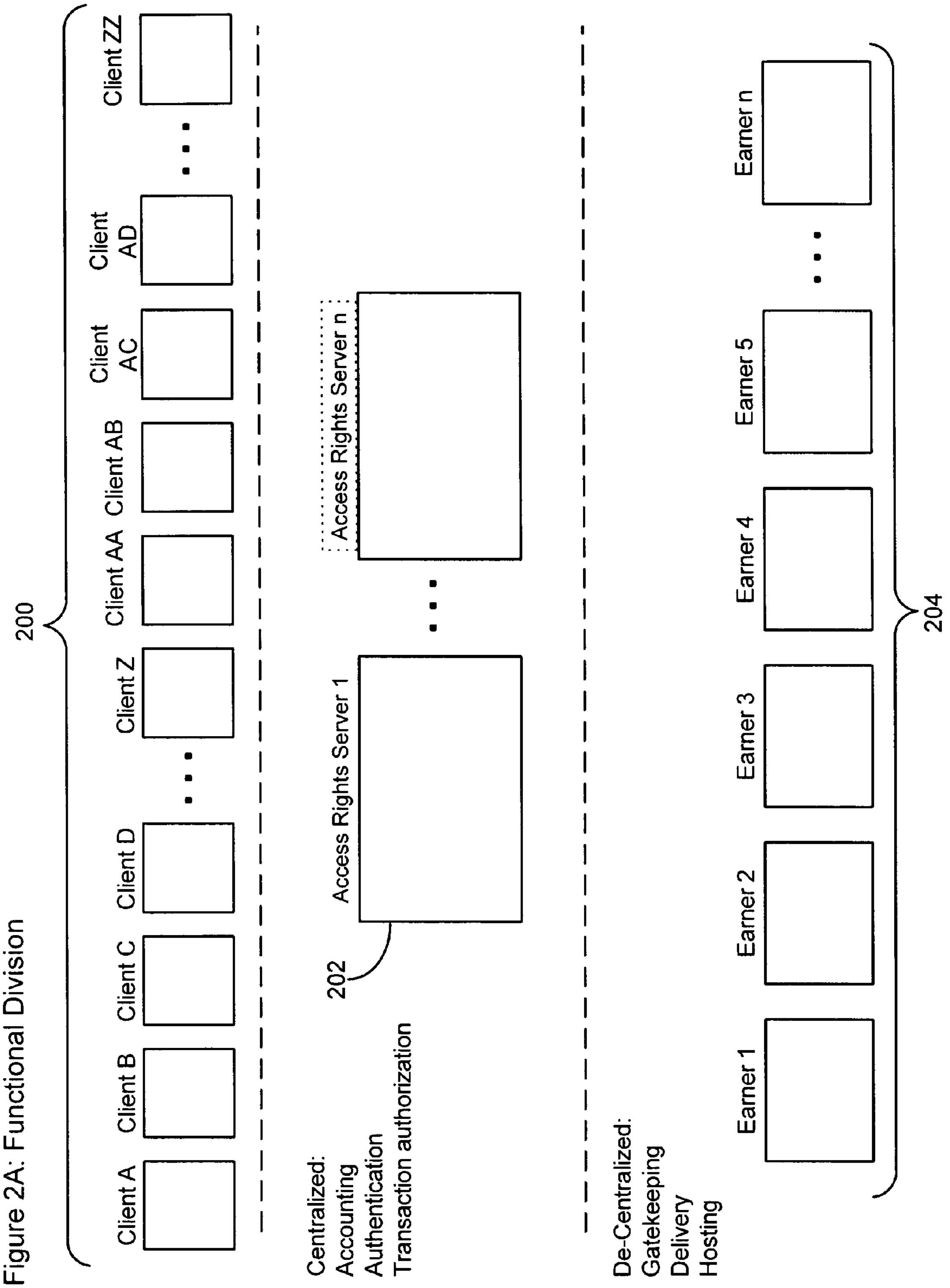

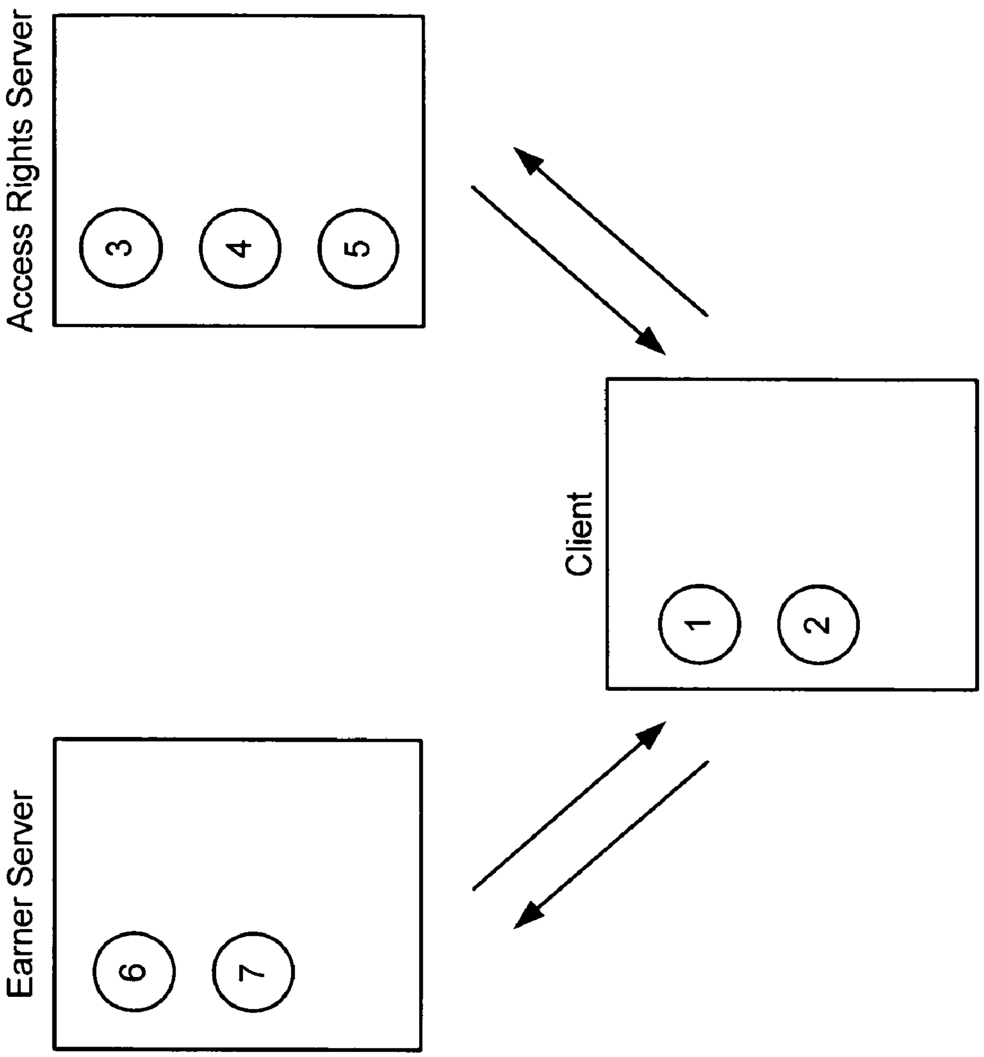
1. Display
2. Selection
3. Authenticate
4. Authorize
5. Issuance
6. Conversion
7. Delivery
Figure 2B: Operational Flows Figure 3A: Earner Setup Main
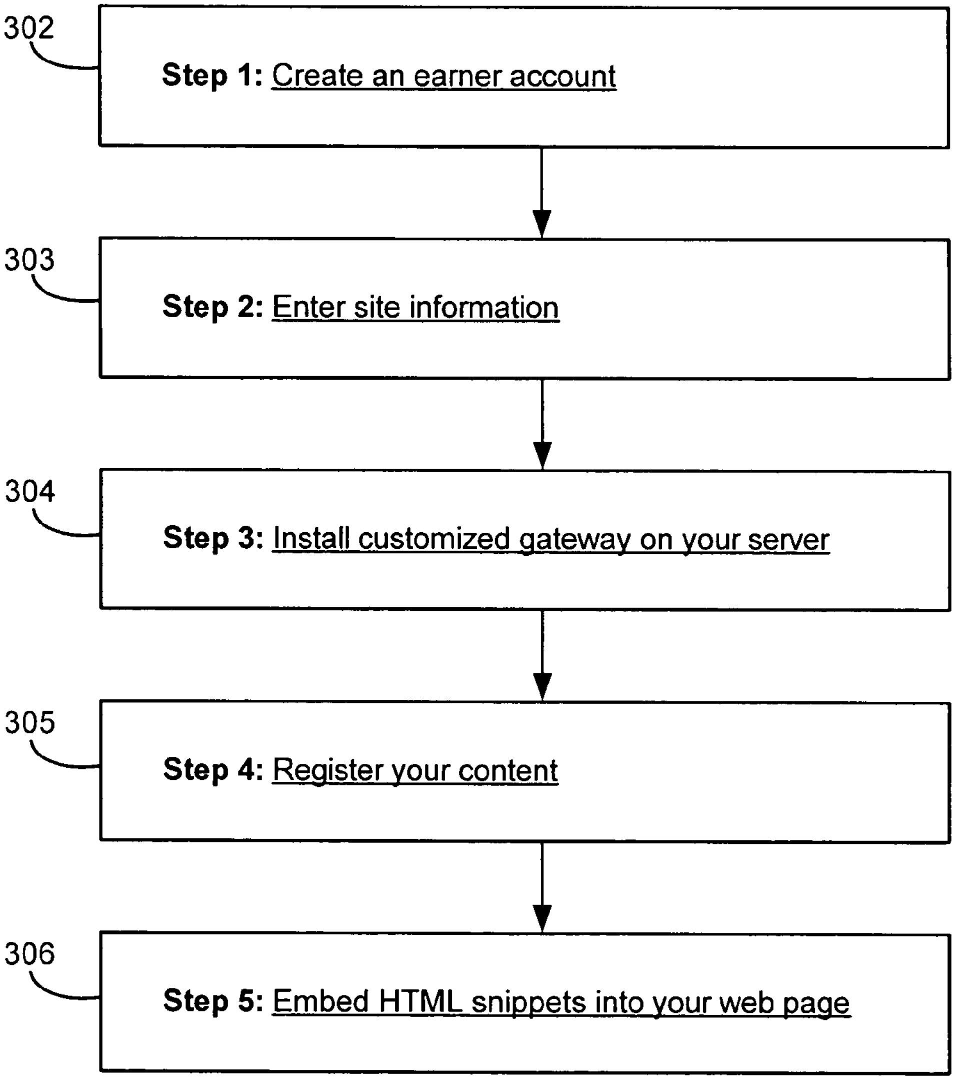

FIG. 3B: Create an Earner Account
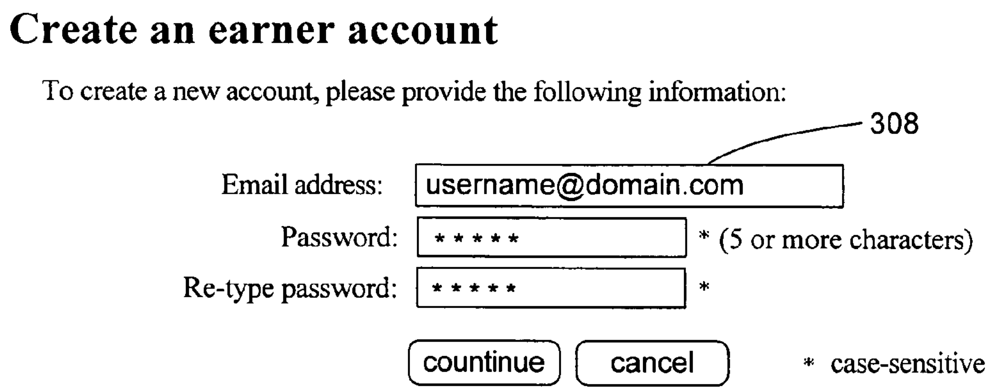
FIG. 3C: Retrieve basic site information
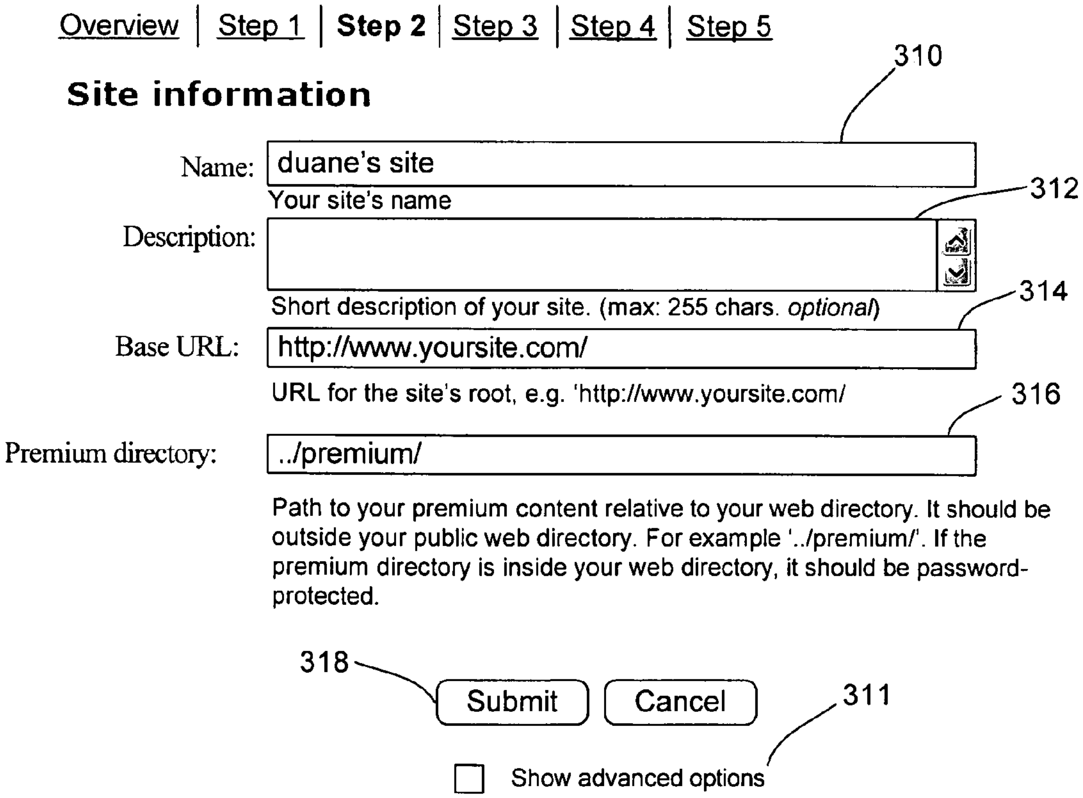

FIG. 3D: Retrieve basic site information

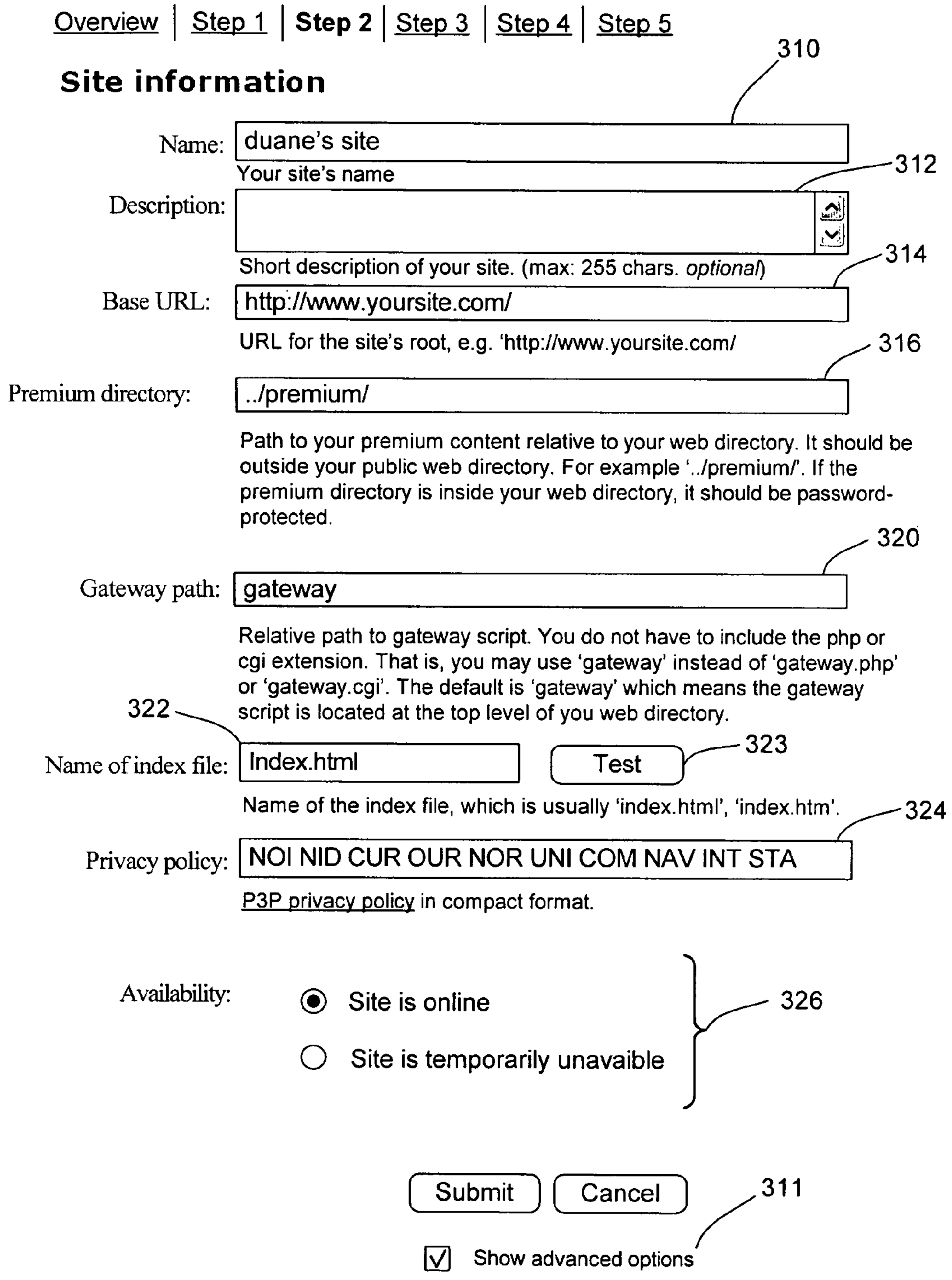

Overview | Step 1 | Step 2 | Step 3 | Step 4 | Step 5

Site information — 310

Name: [ duane's site ] — 312
Your site's name

Description: [                    ] — 314
Short description of your site. (max: 255 chars. *optional*)

Base URL: [ http://www.yoursite.com/ ] — 316
URL for the site's root, e.g. 'http://www.yoursite.com/'

Premium directory: [ ../premium/ ]
Path to your premium content relative to your web directory. It should be outside your public web directory. For example '../premium/'. If the premium directory is inside your web directory, it should be password-protected.
— 320

Gateway path: [ gateway ]
Relative path to gateway script. You do not have to include the php or cgi extension. That is, you may use 'gateway' instead of 'gateway.php' or 'gateway.cgi'. The default is 'gateway' which means the gateway script is located at the top level of you web directory.

322 — 323

Name of index file: [ Index.html ]  ( Test )
Name of the index file, which is usually 'index.html', 'index.htm'. — 324

Privacy policy: [ NOI NID CUR OUR NOR UNI COM NAV INT STA ]
P3P privacy policy in compact format.

Availability: ● Site is online
             ○ Site is temporarily unavaible
— 326

( Submit ) ( Cancel ) — 311

[✓] Show advanced options

FIG.3E Installation and Download

Overview | Step 1 | Step 2 | Step 3 | Step 4 | Step 5

330

Install customized gateway

Four versions of the gateway are available:

1. PHP script
   - Pros: Moderate flexibility and performance. Commonly available.
   - Cons: Cannot be used to sell CGI, php, or other dynamic content.

2. Perl CGI script
   - Pros: Most commonly available.
   - Cons: Cannot be used to sell CGI, PHP, or other dynamic content . Poor performance.

3. Apache mod_perl module
   - Pros: Most robust. Best performance. Supports dynamicaly generated conte nt.
   - Cons: Apache web servers only (so far). Complex to configure. Less com monly enabled.

4. ASP.NET module
   - Pros: Same capabilities as the mod_perl module. Supports other ASP.NET scripts.
   - Cons: IIS web servers only. Complex to configure.

You can download and install the one you want yourself, or you can use our installation assistant to install it for you automatically using FTP. After the installation, you can test the configuration.

FIG. 3F: Content Registration
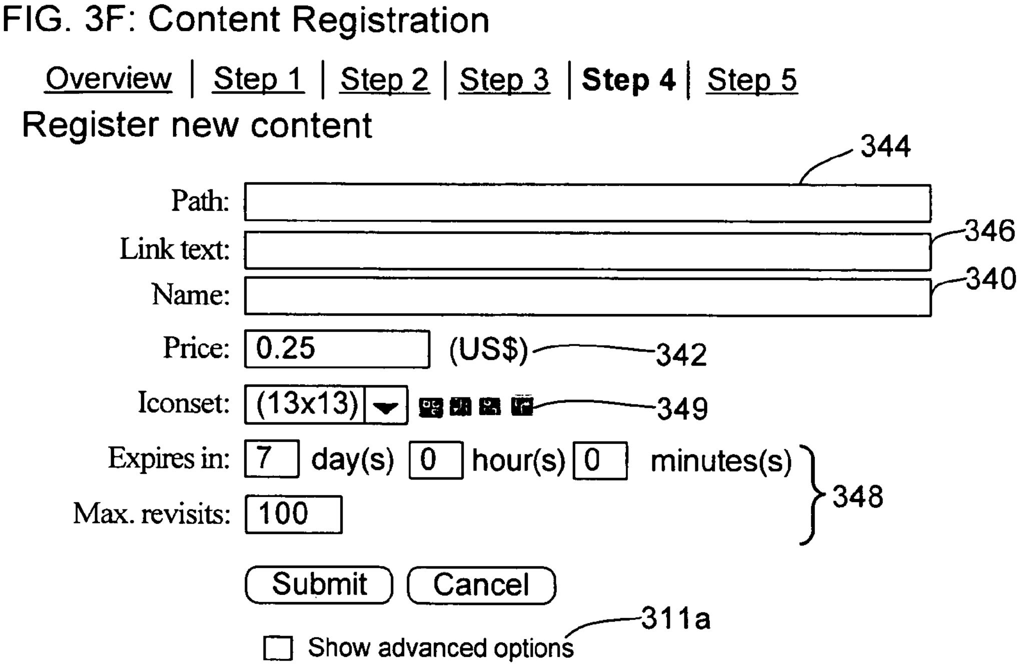
FIG. 3G: Content Registration
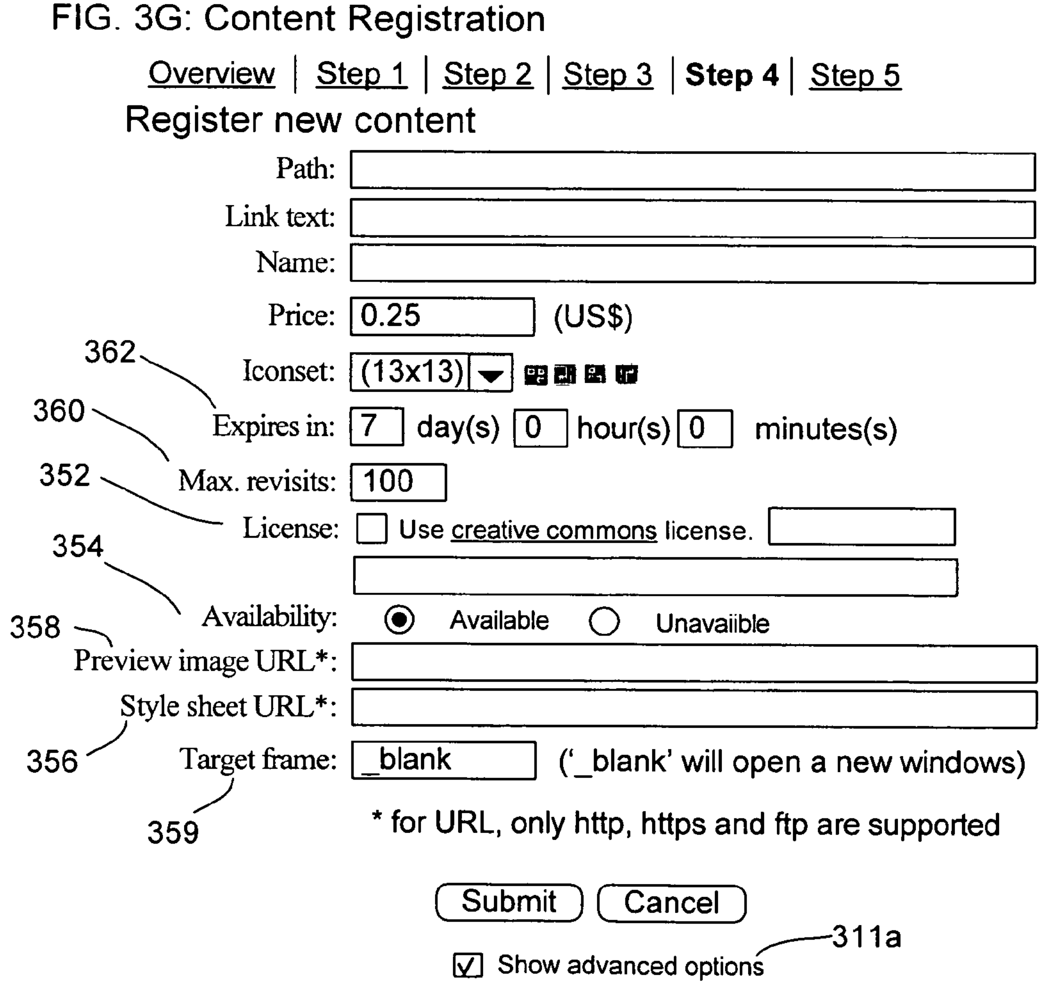

FIG. 3H: Content List

Overview | Step 1 | Step 2 | Step 3 | Step 4 | Step 5

Click on "Edit" for an item to retrieve the HTML snippet used to embed that item into a web page. Each web page containing BitPass-enabled items must also contain this HTML snippet inside the HEAD tag.

Content List

370

| No. | Path / Link text | Price | Expire | Edit/Del |
|---|---|---|---|---|
| NONE | | | | |

FIG. 3I: HTML snippet

Overview | Step 1 | Step 2 | Step 3 | Step 4 | Step 5 > Shared HTML snippet

380

```
<SCRIPT language=JavaScript
src='http://www.bitpass.com/lib/inline.js'></SCRIPT>
```

Figure 3J: Earner Payout
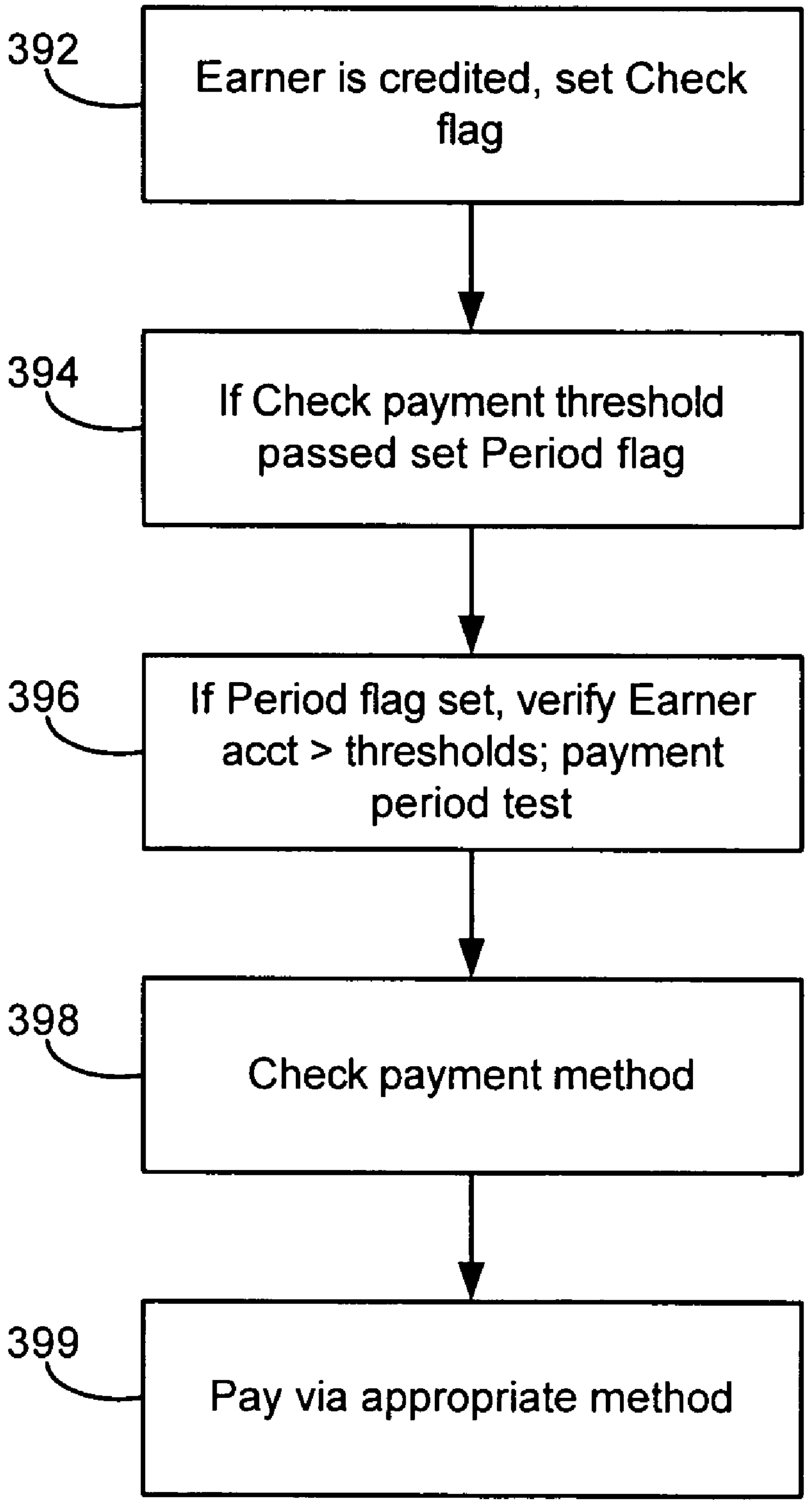

Figure 4A: Spender Sign-up Process
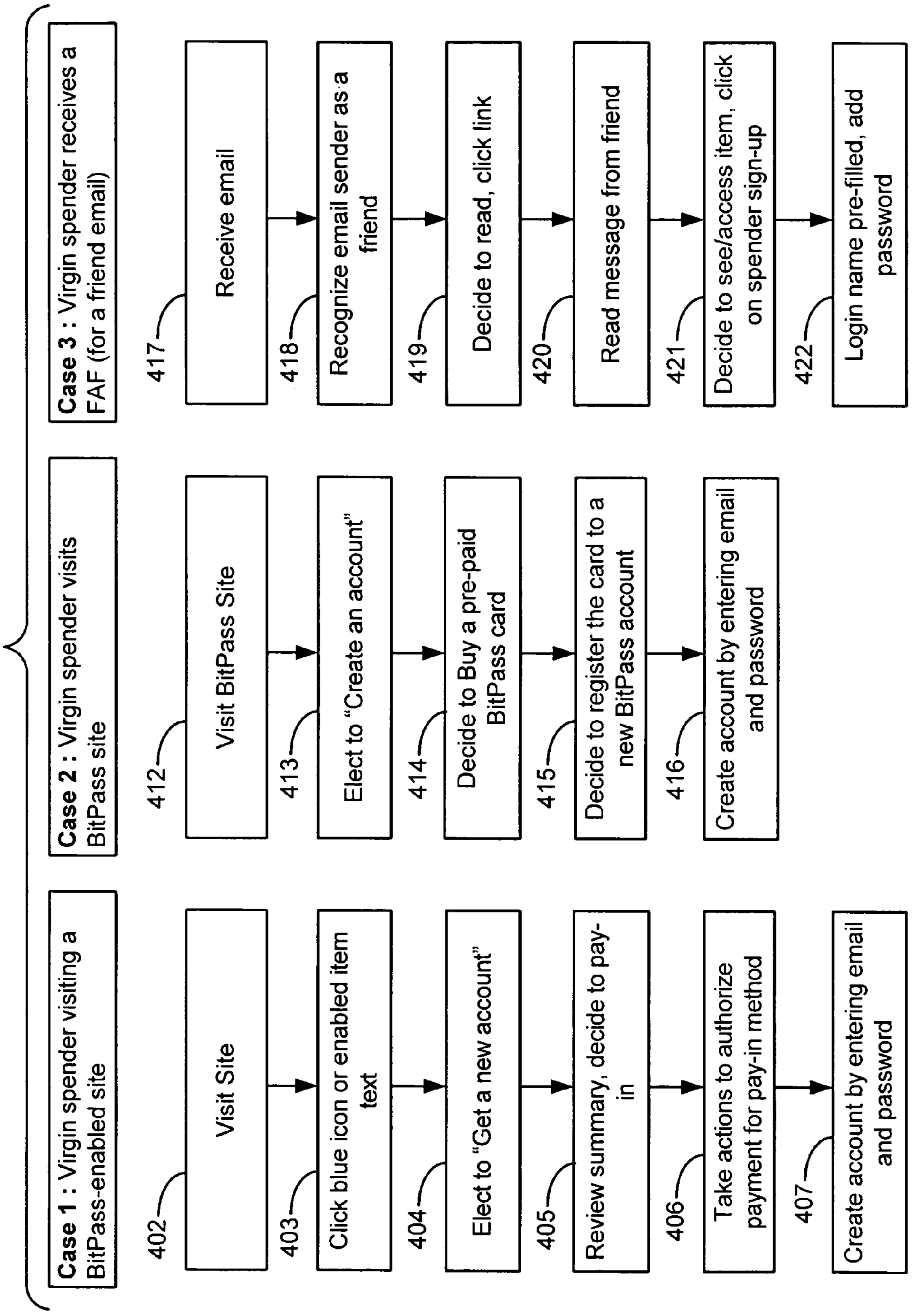

FIG. 4B: Virgin Spender visits a BitPass enabled site
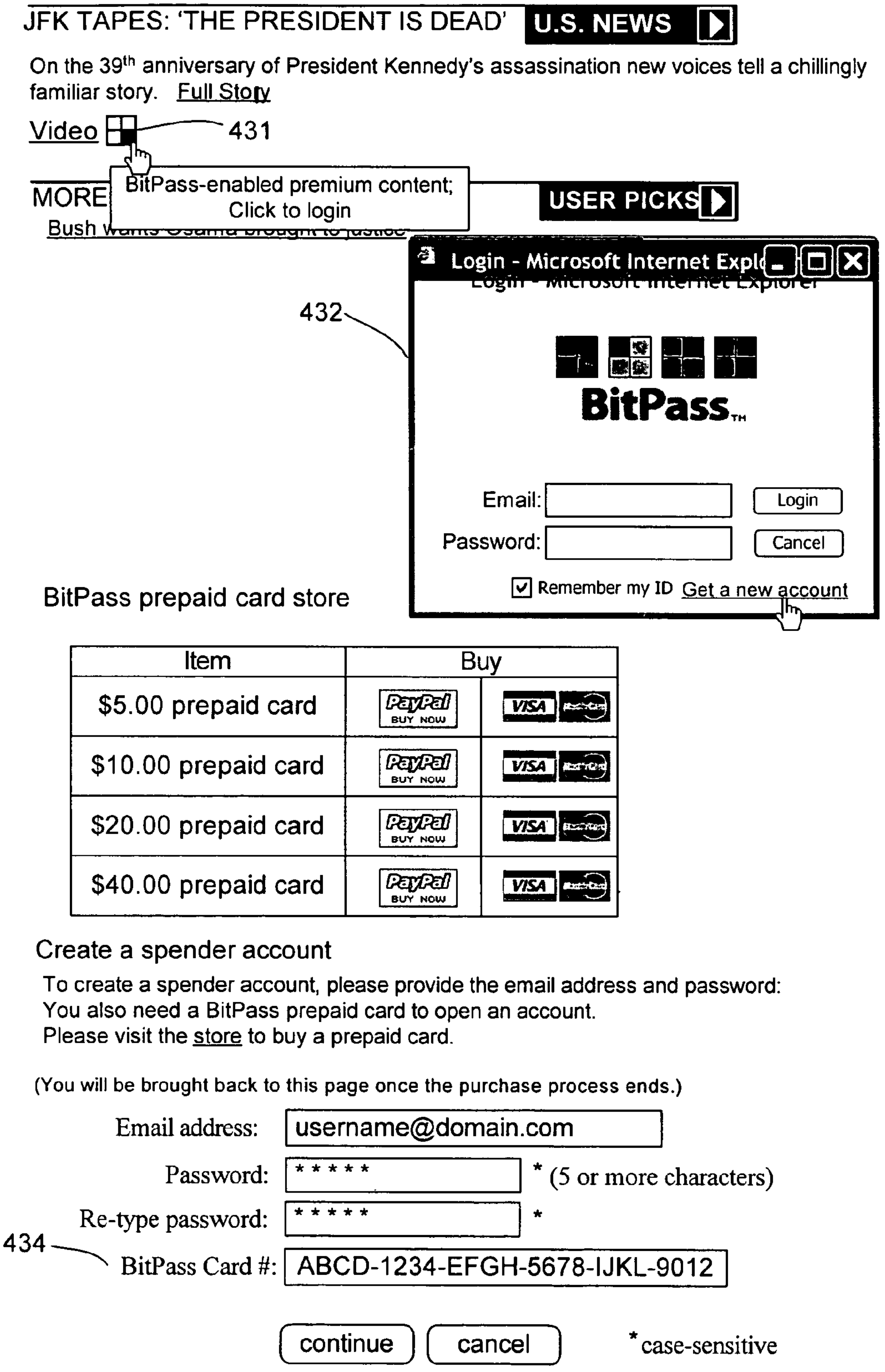

FIG. 4C: Virgin Spender visits a BitPass site

Spender sign-up process

Step 1: Buy a prepaid BitPass card
Step 2: Register the card to a new BitPass spender account

BitPass prepaid card store

436

| Item | Buy | |
|---|---|---|
| $5.00 prepaid card | PayPal BUY NOW | VISA |
| $10.00 prepaid card | PayPal BUY NOW | VISA |
| $20.00 prepaid card | PayPal BUY NOW | VISA |
| $40.00 prepaid card | PayPal BUY NOW | VISA |

Create a spender account

To create a spender account, please provide the email address and password:
You also need a BitPass prepaid card to open an account.
Please visit the store to buy a prepaid card.

(You will be brought back to this page once the purchase process ends.)

Email address: username@domain.com

Password: ***** * (5 or more characters)

Re-type password: ***** *

434 BitPass Card #: ABCD-1234-EFGH-5678-IJKL-9012 continue cancel *case-sensitive

FIG. 4D: User Preferences
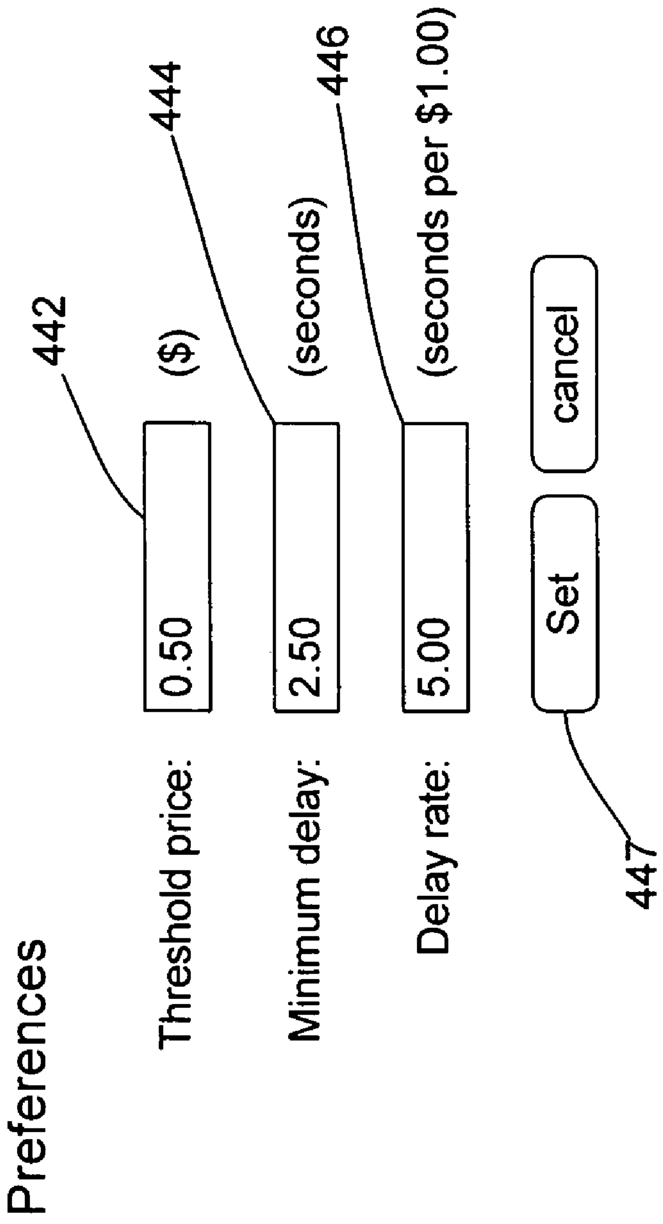

Figure 5A: Sender Pay-in
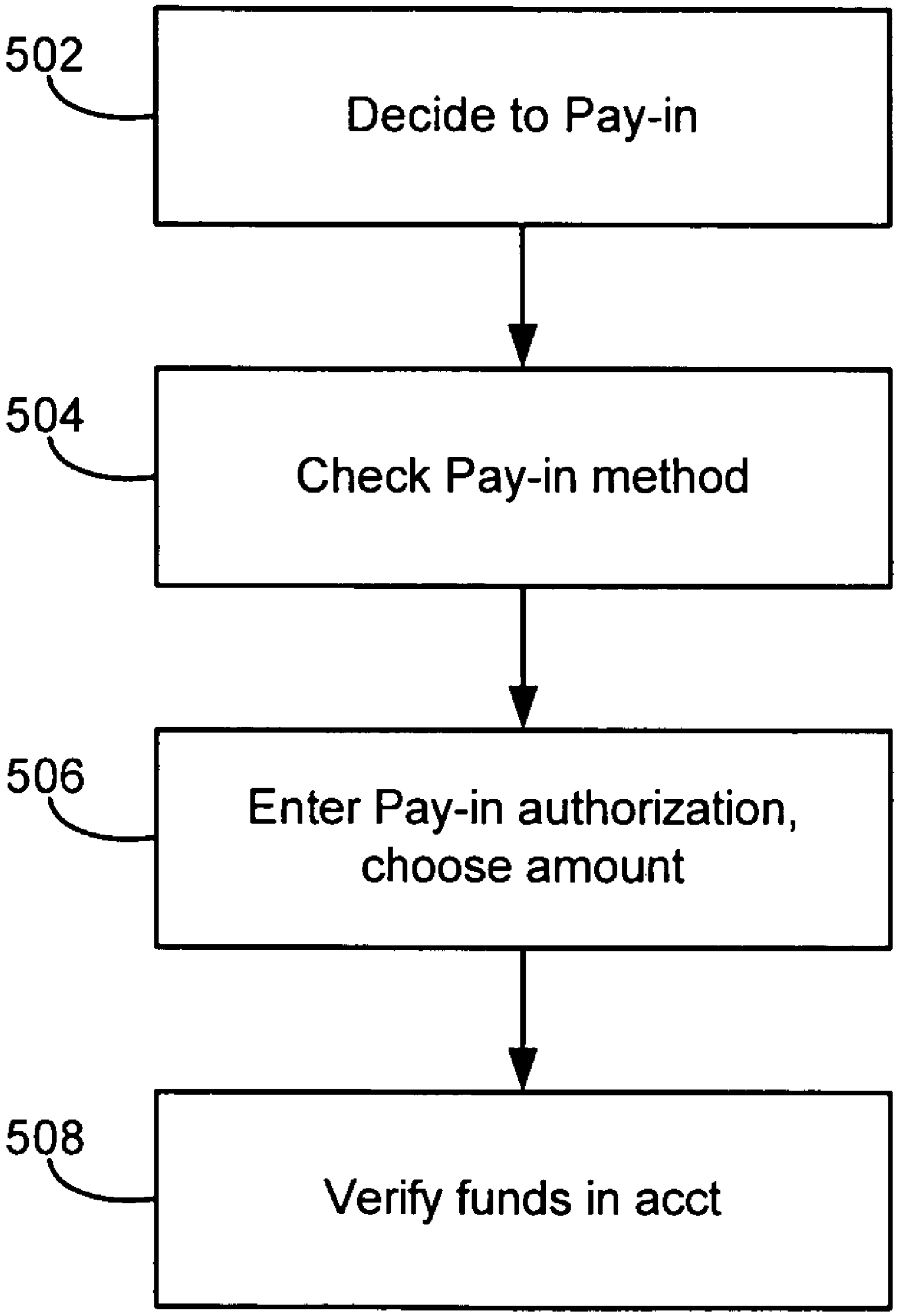

FIG. 5B: Spender Pay Examples
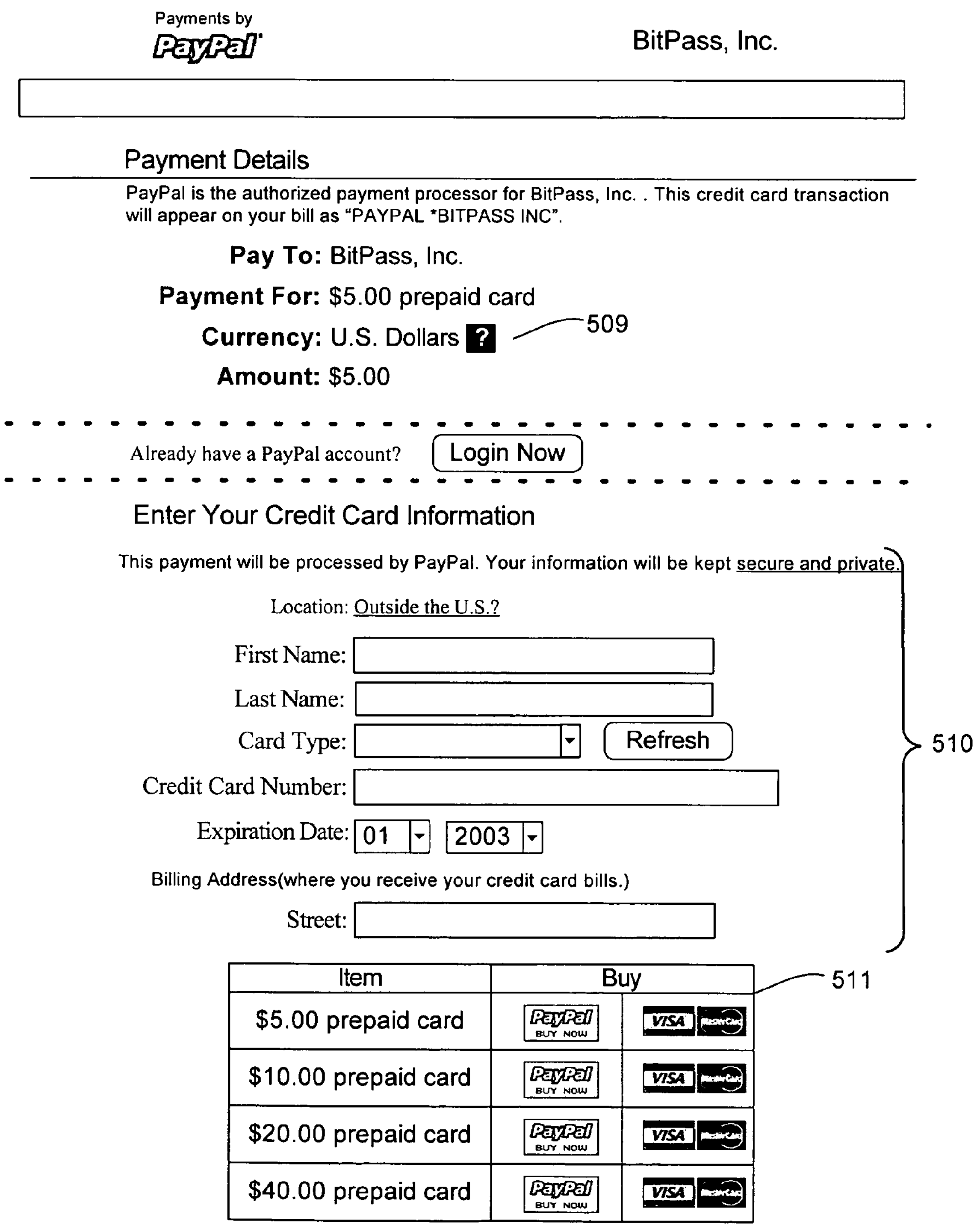

Figure 6A: Spender Purchase Process
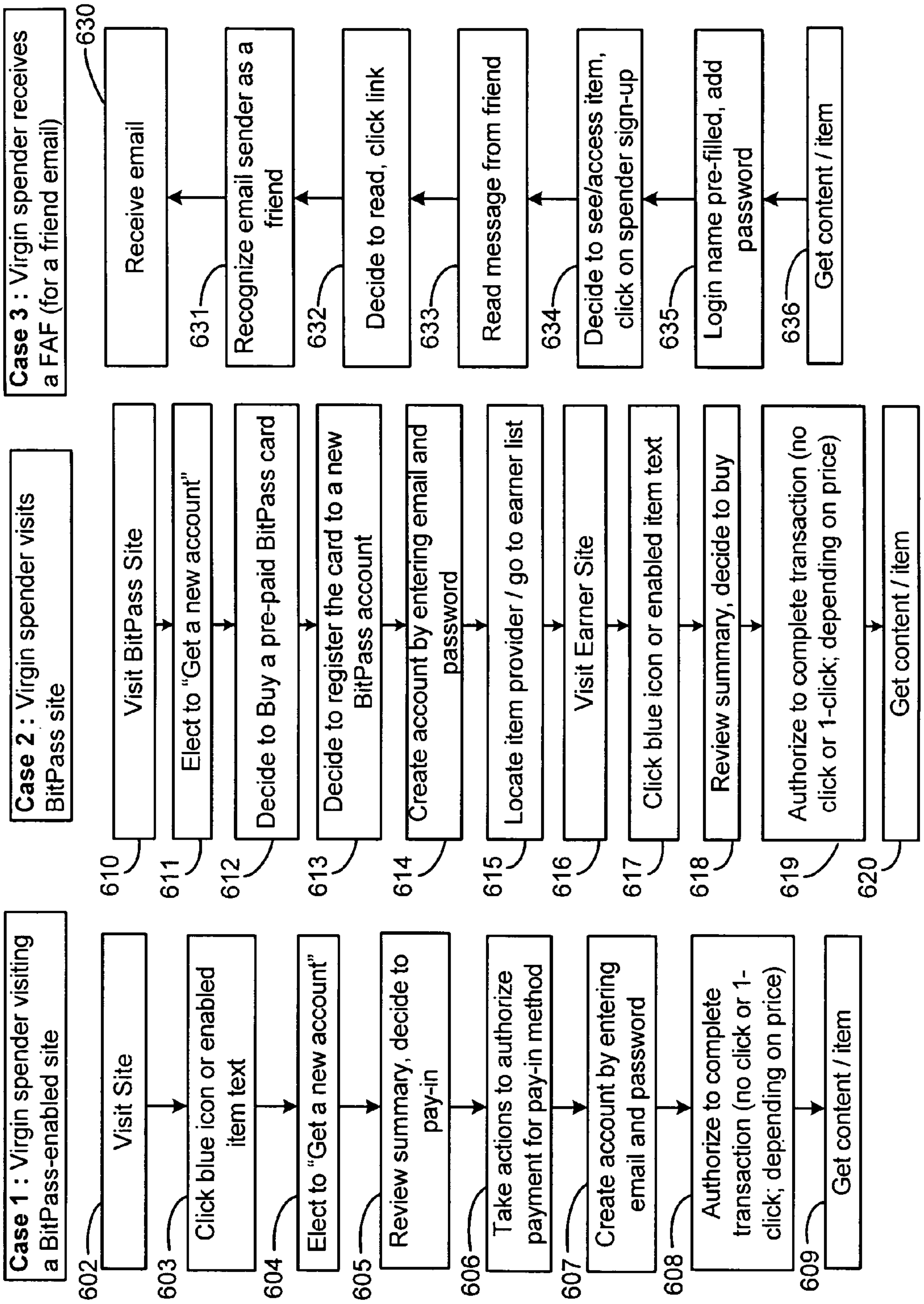

Figure 6B: Spender Purchase Process
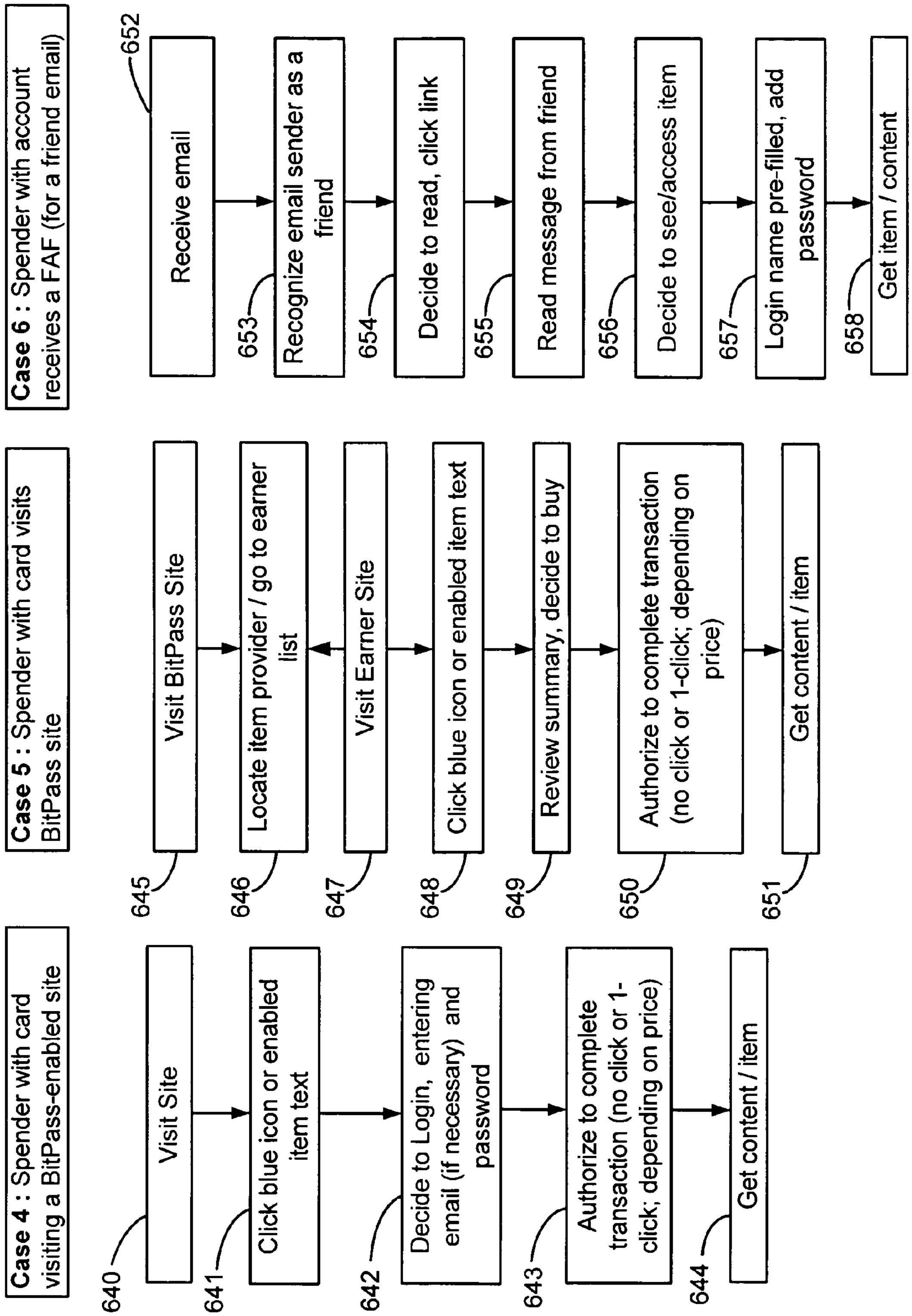

Transaction Protocol General Components

Indicator N

Indicator L

Indicator V

Initial Auto-sizing steps

Initial Auto-sizing steps

4. BitPass server returns JavaScript snippet.

FIG. 9C

HTML: Seller's domain (http://www.peerwide.com/basic.html)

```
<HTML>
<BODY>
Some text

 <SCRIPT type='text/javscript' >
 document writeln("<IFRAME name=ifrm id=ifrm                                      ");
 document writeln("<     src='http://www.bitpass.com/inlinetag/00000065/basic/  >  ");
 document writeln("</IFRAME>                                                      ");
 document writeln("<SCRIPT language=javascript type='text/javascript'>            ");
 document writeln("<! - -                                                         ");
 document writeln("function update()  { ...}                                      ");
 document writeln("update();                                                      ");
 document writeln("//- - >                                                        ");
 document writeln("</SCRIPT>                                                      ");
 document close();
 </SCRIPT>

Some other text
</BODY>
</HTML>
```

930

-User browser executes JavaScript snippet.

FIG. 9D

HTML: Seller's domain (http://www.peerwide.com/basic.html)

```
<HTML>
<BODY>
Some text
 <IFRAME name=ifrm id=ifrm src='http://www.bitpass.com/inlinetag/00000065/basic/'>
 </IFRAME>
<SCRIPT language=javascript type='text/javascript'>
<! - -
function update()  { ...};
update();
//- - >
 </SCRIPT>
Some other text
</BODY>
</HTML>
```

932

-User browser continues to interpret HTML, sourcing an indicator into the IFRAME
HTML: Seller's domain (http://www.peerwide.com/basic.html)

```
<HTML>
<BODY>
Some text
<IFRAME name=ifrm id=ifrm src='http://www.bitpass.com/inlinetag/00000065/basic/'>

    HTML: BitPass' domain(http://www.bitpass.com/inlinetag/ . . . )
    <HTML>
    <SCRIPT type='text/javscript'>
    function notify(width, height) { ... };
     </SCRIPT>
    <BODY>
940
    Some HTML code...

     <SCRIPT type='text/javscript'>
442  notify(width, height);
     </SCRIPT>

    </BODY>
    <IFRAME id=i frm2></IFRAME>
    </HTML>

</IFRAME>
<SCRIPT language=javascript type='text/javascript'>
<!—
function update() { ...}
update();
//- - >
 </SCRIPT>

Some other text

</BODY>
</HTML>
```

-User browser interprets HTML code and renders it. After rendering of HTML code completes, JavaScript function notify() is invoked, at which point the size of HTML rendering result is known.

FIG. 9E

JavaScript function loads another IFRAM.

5. JavaScript function notify() will load an URL from seller's web server into IFRAME. This request carries the size information back to the seller's web server.

HTML: Seller's domain (http://www.peerwide.com/basic.html)

```
<HTML>
<BODY>
Some text
<IFRAME name=ifrm id=ifrm src='http://www.bitpass.com/inlinetag/00000065/basic/'>

    HTML: BitPass' domain(http://www.bitpass.com/inlinetag/ . . . )
    <HTML>
    <SCRIPT type='text/javscript'>
    function notify(width, height) { ... };
     </SCRIPT>
    <BODY>

    Some HTML code...

    <SCRIPT type='text/javscript'>
    notify(width, height);
    </SCRIPT>

     <IFRAME  id=ifrm2 src='http://www.peerwide.com/gateway?w=xxx&h=yyy'>

     </IFRAME>

    </BODY>
    </HTML>
</IFRAME>
<SCRIPT language=javascript type='text/javascript'>
<!—
function update() { ...};
update();
//- - >
 </SCRIPT>

Some other text

</BODY>
</HTML>
```

Response from Earner Server Gateway

6. Response from the seller's server comes with a cookie which contains the size information, which in turn enable outer layer of HTML/JavaScript to extract the size information.

HTML: Seller's domain (http://www.peerwide.com/basic.html)

962

<HTML>
<BODY>
Some text

<IFRAME name=ifrm id=ifrm ~~src='http://www.bitpass.com/inlinetag/00000065/basic/'>~~

964 HTML: BitPass' domain

<HTML>
<SCRIPT type='text/javscript'>
function notify(width, height) { ... };
</SCRIPT>
<BODY>
...

<SCRIPT type='text/javscript'>
notify(width, height) { ... };
</SCRIPT>

963 <IFRAME id=ifrm2 ~~src='http://www.peerwide.com/gateway?w=xxx&h=yyy'>~~

965 HTTP response from seller's server

HTTP/ 1.1 200 OK
Server: Apache/1.3.27 (Unix)

960 Set-Cookie; size=xxx%3Ayyy; path=/; domain=www.peerwide.com

Content-Type: text/html xxx:yyy

</IFRAME>
</BODY>
</HTML>

</IFRAME>
970 <SCRIPT language=javascript type='text/javascript'>
<!—
function update() { ...};
update();
//- - >
</SCRIPT>

Some other text

</BODY>
</HTML>

-User browser continues to interpret the original HTML code.

FIG. 9G

Update mechanism to complete auto-size

7. User browser executes JavaScript function update( ), which resize the outer IFRAME based on the size information set in step 6.

HTML: Seller's domain (http://www.peerwide.com/basic.html)

<HTML>
<BODY>
Some text

<IFRAME name=ifrm id=ifrm ~~src='http://www.bitpass.com/inlinetag/00000065/basic/'>~~

HTML: BitPass' domain

<HTML>
<SCRIPT type='text/javscript'>
function notify(width, height) { ... };
</SCRIPT>
<BODY>

Some HTML code...

<SCRIPT type='text/javscript'>
notify(width, height) { ... };
</SCRIPT>
<IFRAME id=ifrm2 ~~src='http://www.peerwide.com/gateway?w=xxx&h=yyy'>~~

HTTP response from seller's server

HTTP/ 1.1 200 OK
Server: Apache/1.3.27 (Unix)
Set-Cookie; size=xxx%3Ayyy; path=/; domain=www.peerwide.com Content-Type: text/html xxx:yyy

</IFRAME>
</BODY>
</HTML>

</IFRAME>
<SCRIPT language=javascript type='text/javascript'>
<! - -
function update() {...}
update();
//- - >
970 </SCRIPT>

Some other text

</BODY>
</HTML>

Note: due to the multitasking nature of user browser, the invocation of JavaScript function update( ) can happen even before step 3, the update( ) function will be waiting for the cookie information arrives. The flow chart of update ( ) is given in the next page.

FIG. 9H

Update function flowchart

Transaction Protocol General Components

Purchase transaction flow – Selection Gateway (ARTS)

Earner Server Gateway Stage 10012 10013 10014

10010

10016

Item name: Scott McCloud's The Right Number Part Two
Price & duration: $0.25 for 300 days/16 visits
Site: http://www.scottmccloud.com/ [scottmccloud.com]

$0.25 will be deducted from your account once you click the "Proceed" button.
[Item info]

*Powered by*

BitPass™

Cancel  Proceed
———— 10015

Fig. 11A Free a friend link example 1102

More videos

Free for a friend

Fig. 11B Free a friend send example 1104 1106

Free for a friend

BitPass™

1107

Title : Card Switch Ad

Price: $0.00 = $0.05 (list price) - $0.05 (seller subsidy)

From: Joe BitPass ☐ Remember my name spendername@domain.com ☑ Send me a copy

To: your@friend.com, another@friend.com

Subject: Here's a great video

Message: Watch this video. It was so funny I paid for a copy. I think you'll like it too, and it will help us generate new ideas. Call me if you'd like to discuss 555-1212.

-Joe

Send Cancel

Fig. 11C Reciever email example

1111

From: Joe BitPass [sender@domain.com]
Watch this video. It was so funny I paid for a copy. I think you'll like it too, and it will help us generate new ideas. Call me if you'd like to discuss 555-1212.

-Joe

--------------------- Message form BitPass ---------------------

Joe BitPass has sent you a gift pass for access to the BitPass-enabled content entitled:

Card Switch Ad

To redeem your gift pass: 1113

1. If you have a BitPass spender account: click here or visit
https://www.bitpass.com/spend/account/addgift.html?code=s4$ff6WqKw8gUuox87RLX1

2. If you are new to BitPass: click here or visit
https://www.bitpass.com/spend/newaccnt/giftaccnt.html?code=s4$ff6WqKw8gUuox87RLX1

Thanks for using BitPass

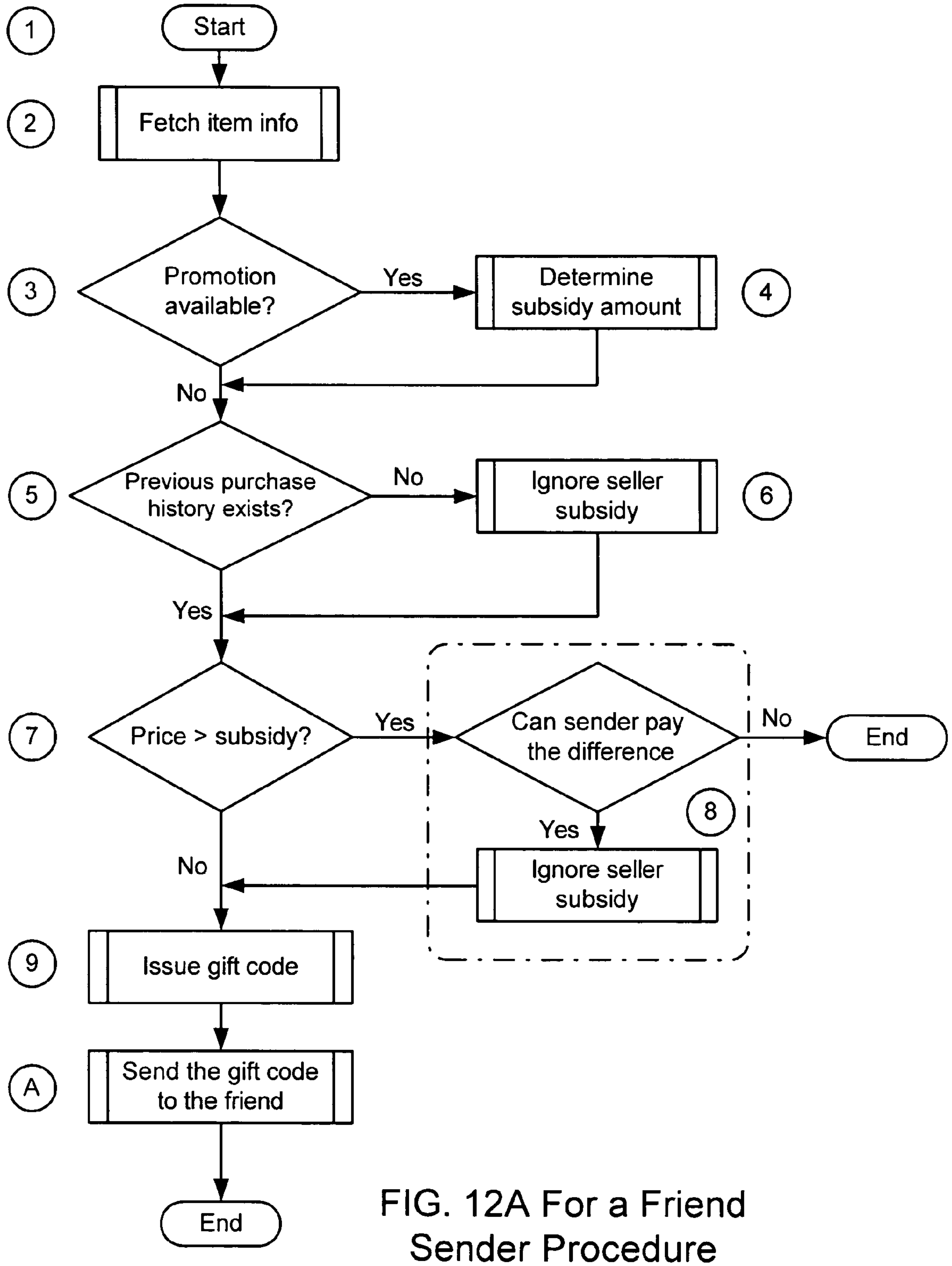
FIG. 12A For a Friend Sender Procedure

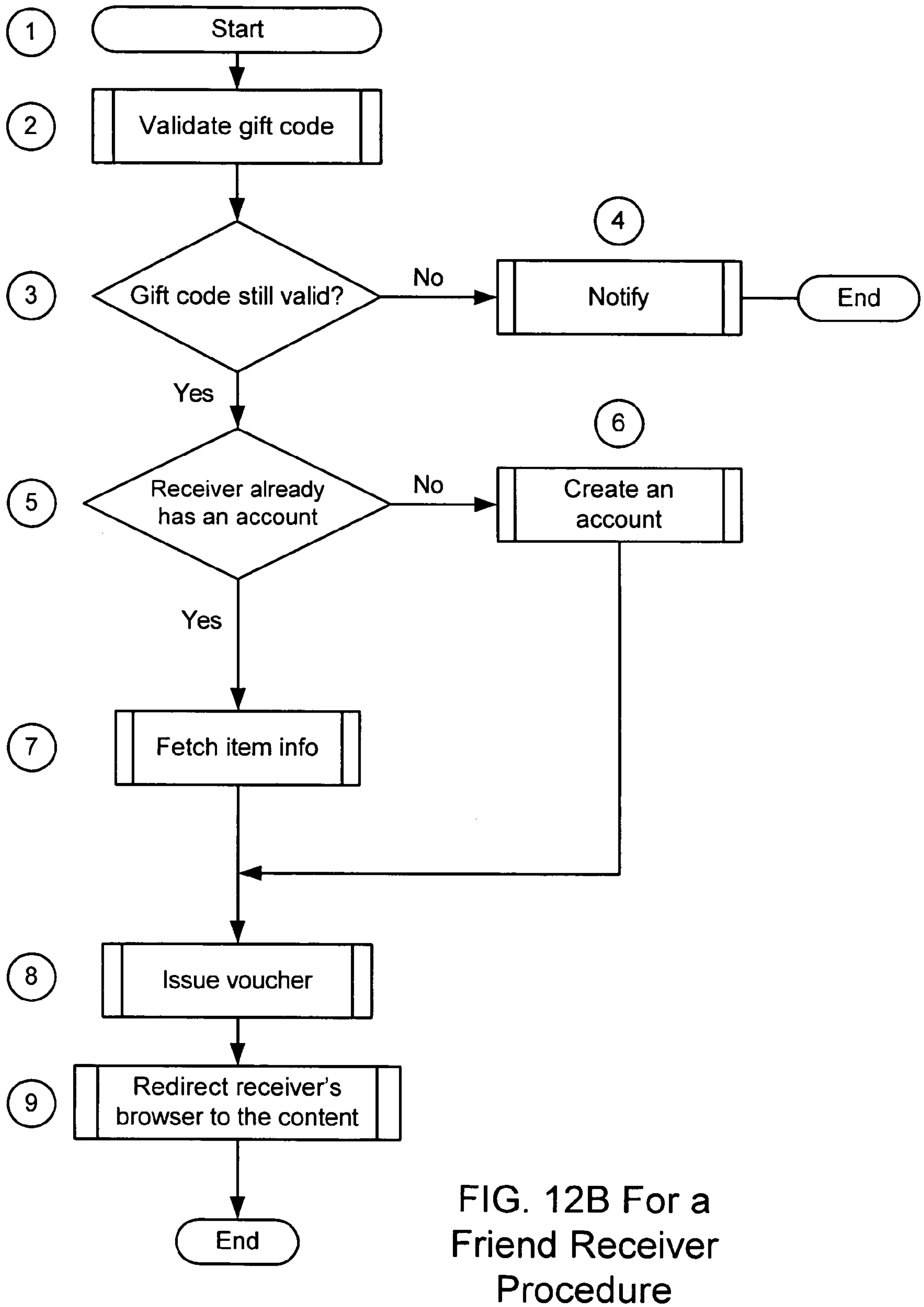
FIG. 12B For a Friend Receiver Procedure

1302 — 1303 — 1305

BitPass™

*Your pass to online commerce*
Spender sign-out | Earner sign-in

Share | Spend | ... | Learn

Exciting news

The easy way to buy and sell online content and services.
· How do I buy?
· How do I sell?

Special Offer
Click here for $35 worth of free content – music, photos, & more!

PIXELJUMP
ENTERTAINMENT MOBILIZED

Promotion time: BitPass wants to tell your friends about our FREE pass to a content bundle worth over $35. This offer expires June 30th, so tell your friends before it's too late. NEW!

Your first source for alternative mobile entertainment, featuring an expanding catalog of graphics, ringtones, comics and more for your cell phone. NEW!

· Animation & film
· Business
· Comics
· Education
· Games & crafts
· Mobile
· Music
· Non-profits
· Photography & digital art
· Prose & eBooks
· Radio
· Software
· Sports

Featured sites
· Music

MPERIA — Mperia is an online community for independent musicians and their fans.

· Prose & eBooks

Telltale Weekly — Audiobooks as low as 25 cents each, funding a free audio library.

· Digital content spurs micropayments resurgence (ZDnet news)
· Former Amex Chief Joins BitPass Board (Bank Systems & Technology)
· BitPass Secures $11.75 Million in Series B Funding From Worldview, Steamboat and RRE (VentureWire)
More...

· Photography & digital art

With a growing collection of over 100,000 royalty-free files, iStockphoto is a unique community of photographers and designers.

· Games & crafts

Flying Pig offers a unique range of animated models for you to cut out and make.

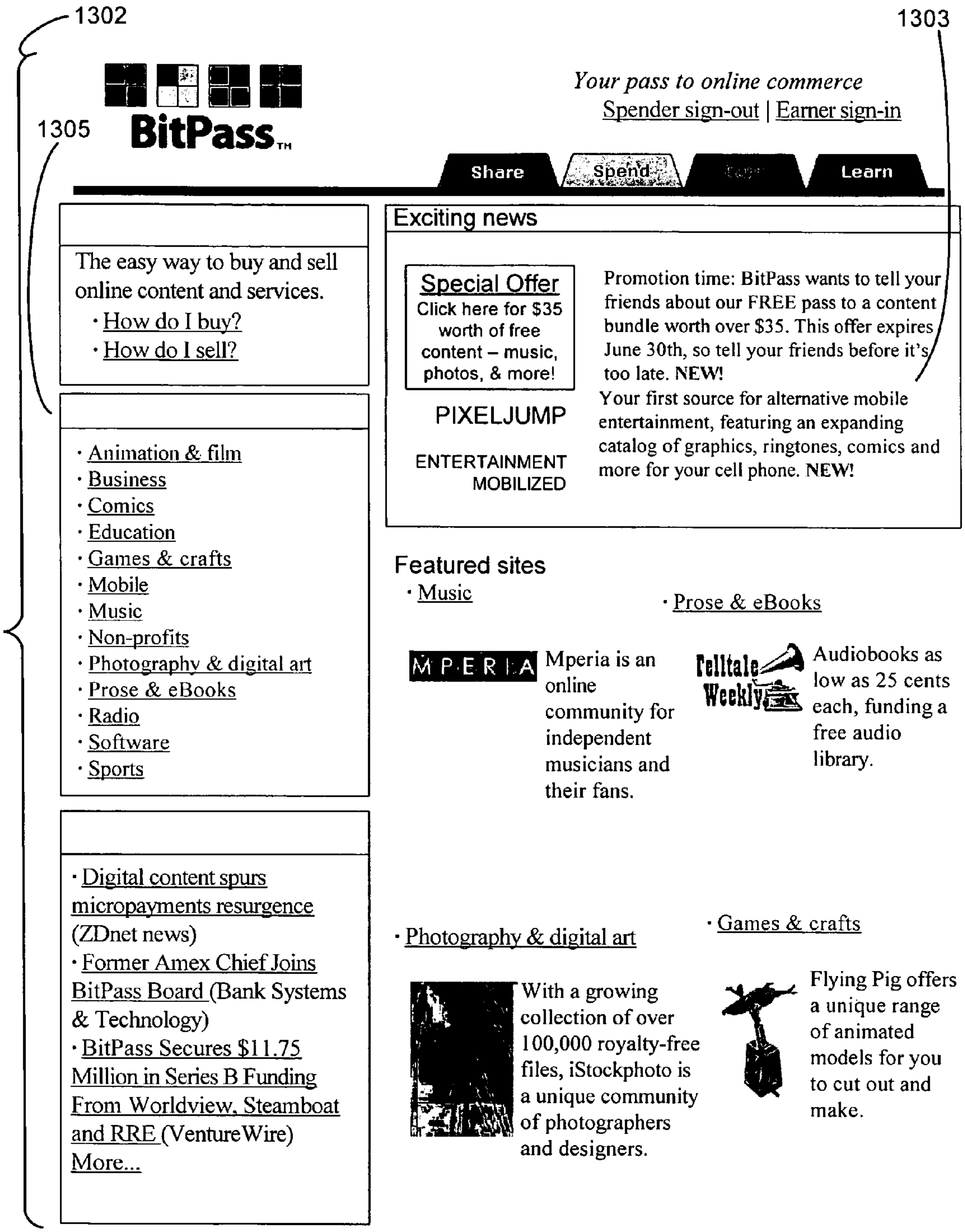

BitPass™

*Your pass to online commerce*
Spender sign-out | Earner sign-in

Share | Spend | Earn | Learn

- Sign up process
- Earner FAQs
- Recover your password
- Manage your account
- Earner support
- Earner sign-in

The easy way to charge for online content and services

- Easy
  - No programming required for installation or integration
  - Compatible with most web servers
  - Start accepting payments in as little as 30 minutes

- Affordable
  - No setup or monthly fees
  - 5-15% transaction fee

- Flexible
  - Charge as little as one cent
  - Support for dynamic content, including streaming, web services, and blogs
  - Support for pay-per-view and pay-per-period pricing models
  - Support for donations

Sign up now for your BitPass Earner account!

---

Learn | Share | Spend | Earn | Legal | Privacy | Contact us

Copyright 2004 BitPass, Inc. All rights reserved.

Entrust® Secured

1306

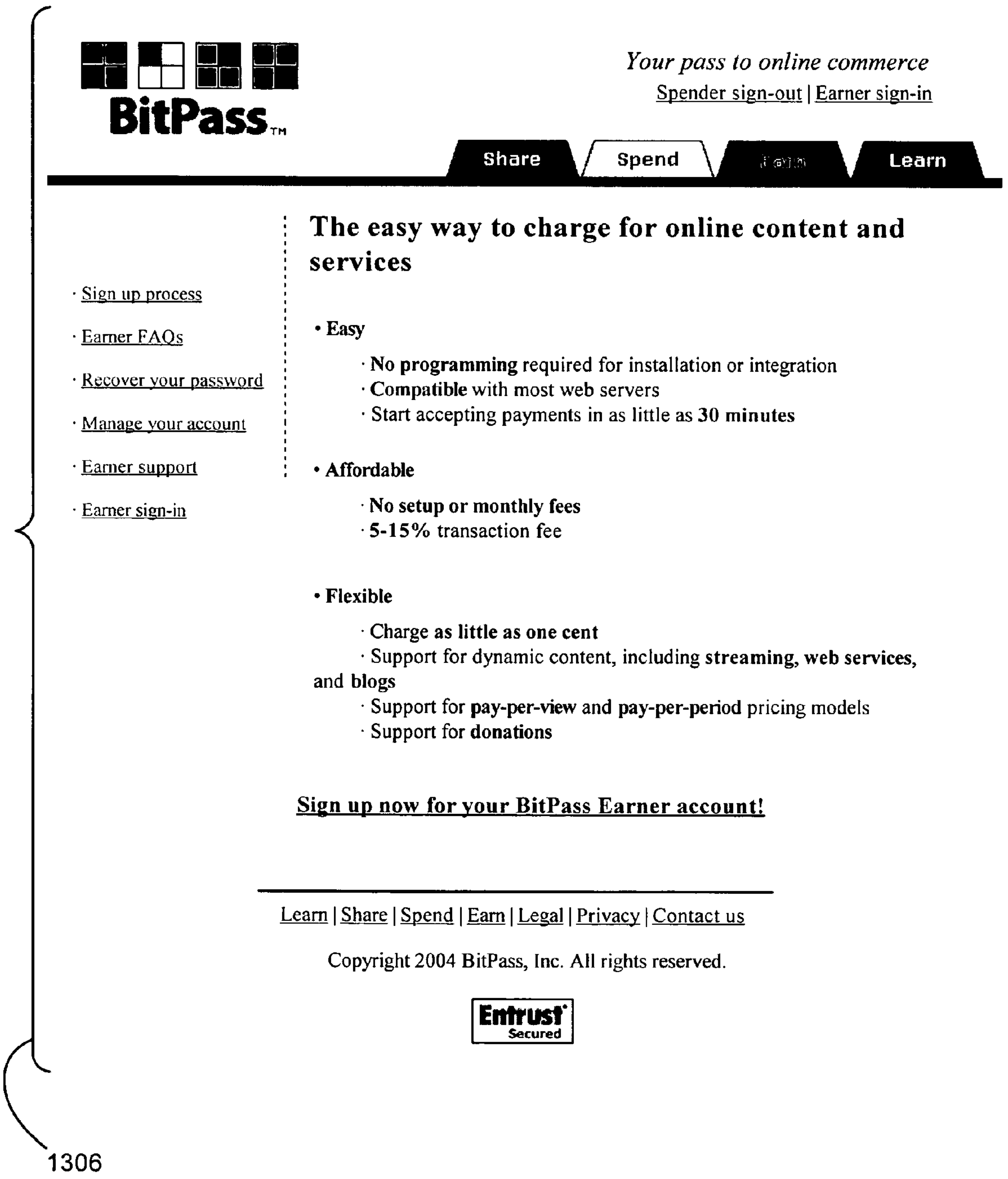

Garage
Technology Ventures℠

▸ Search ▸ Site Map ▸ Contact Us

▸ Home ▸ About Us ▸ Companies ▸ Investors ▸ Job Opportunities ▸ Portfolio ▸ News & Events

- Wise Guy
- Books & Articles
- Speeches
- Recipe

Speeches

You may be wondering why we're "selling" Guy's speeches. It's not for the money. It's because we recently invested in a company called BitPass that provides a micropayments system for online content. BitPass enables content providers to sell their PDFs, music, shareware, video, and web services "by the drink." So please "buy" one of these MP3s or PDFs to see how elegant the BitPass solution is. And if you ever see Guy, tell him that you bought one of his files, and he'll buy you a beer. Then you'll be net positive.

Problems, comments? Send an email to: webmaster@garage.com

MP3 Audio File

The below file is an MP3 recording of one of Guy's speeches. Most computers are configured to save the MP3 file to your disk. You can then play the MP3 file by opening the file. Instead, if your browser plays the MP3, you can usually use the controller that is displayed within the browser to save the file. ————1309

- Then and Now - MP3    $0.99, 8.5MB, 37 minutes
  Listen to Guy explain the differences in starting a company "then" and "now."

PDF Slideshows

1311 ⟨ Each of the below files contains a slideshow of about 10-15 slides. The slides contain the primary points in each of Guy's speeches. Each file is about 150KB. To view and print PDF files, you will need Adobe's Acrobat Reader. ————1309

- All Speeches    $2.50
  Purchase all PDF speeches.

- Trench Lessons    $0.10
  The most important lessons that Guy has learned thru his long and checkered business career.

- iClosed    $0.50
  Tactical tips to raising money in the most difficult of times.

- Silicon Valley 4.0    $0.10
  Guy's fearless predictions about the Next Big Thing in Silicon Valley.

- How to Drive Your Competition Crazy    $0.50
  A guerrilla manual to driving your competition up the wall.

- Lies of VCs    $0.10

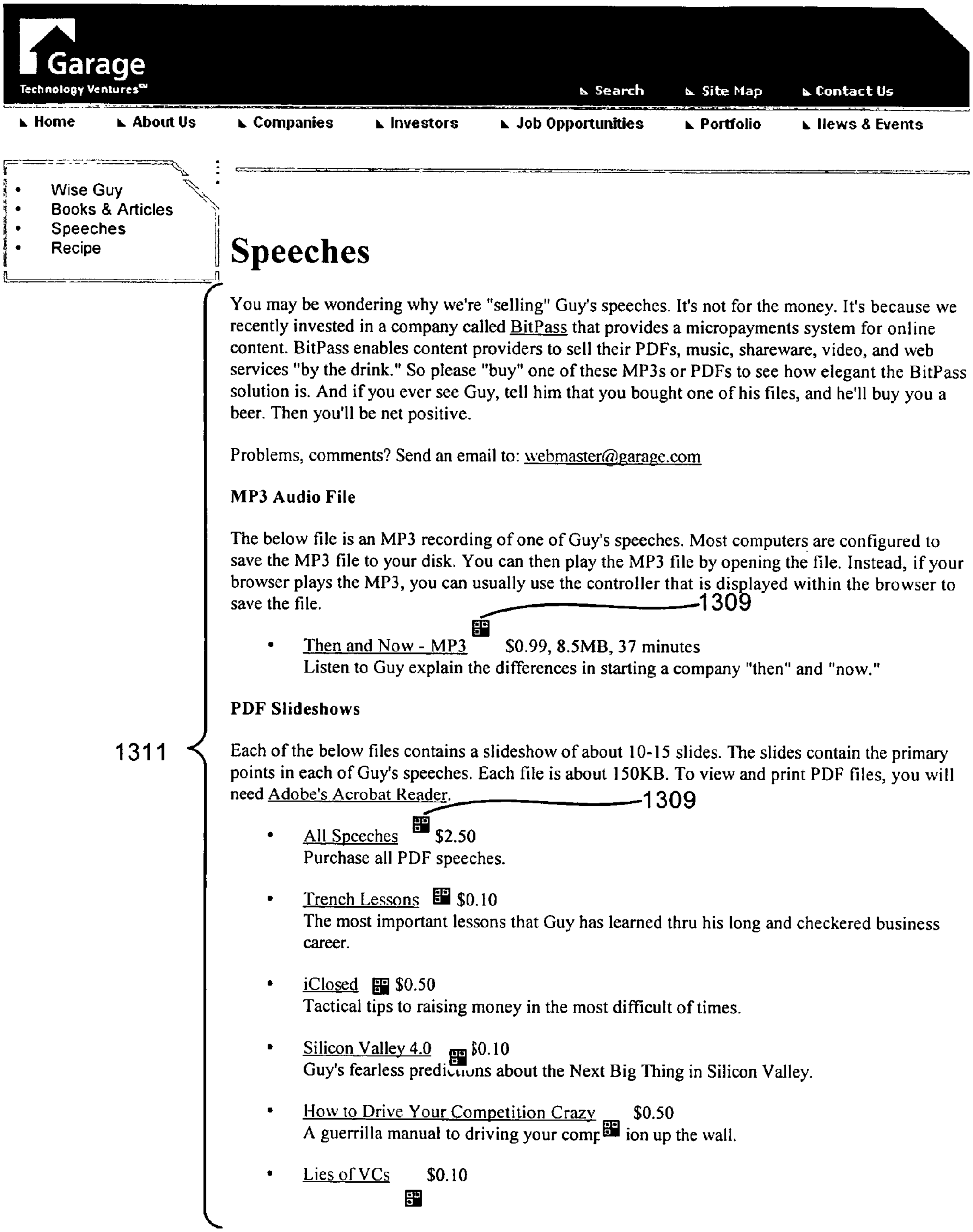

FIG. 13E

DYNAMIC INDICATOR FOR CONTEXT SENSITIVE REAL-TIME COMMUNICATIONS

RELATED APPLICATIONS

This application claims priority under 35 U.S.C. §119(e) to U.S. Provisional Application No. 60/483,843, filed Jun. 29, 2003, entitled "DYNAMIC INDICATOR FOR CONTEXT SENSITIVE REAL-TIME COMMUNICATIONS," which is herein incorporated by reference in its entirety.

BACKGROUND

The World Wide Web (WWW) is full of enormous amounts of content. Currently, artists and producers of web-based content must obtain payment for their content via charging advertisers or by charging subscriptions to their readers or users.

If artists or producers sell their web-based content in a non-web forum, they are required to work with numerous middlemen, all of whom take a portion of their profit. Ideally, artists and content producers should be able to post their content on the Web and make it easy to distribute the content while charging a reasonable amount of money to their users. Users should be able to access web-based content easily and should be able to pay small amounts of money to access web content.

SUMMARY OF THE INVENTION

The described embodiments of the present invention are implemented using the World Wide Web, although other implementations of the invention can be made without departing from the sprit and scope of the invention. For the purposes of this application, a "Spender" is a person who spends money in the system. A person may spend money to buy an item, spend money on a donation, etc. A Spender (sometimes called a buyer) will typically use client software to access content, where the client is typically a computing device that includes a display, which facilitates the transaction between a Spender and an Earner. An "Earner" (sometimes called a seller) is someone who provides items or content within the system for sale, trade, or acquisition in return for credit or money earned. In the described embodiments, an Earner's server may be anything, which serves content and/or includes an Earner gateway, which facilitates trusted third party interaction frequently used in the system, and may also be used to describe several servers or a server farm. In some embodiments, the Earner's server is included as a part of the server controlling content access.

Spenders are brought into the system via a Spender setup process that includes both account creation and a pay-in mechanism. Spender account maintenance is presumed as a requirement for Spender retention. Key aspects of Spenders are the ability to manage Spender transactions within the system, including but not limited to account pay-in (shown elsewhere), debit, refunds, and purchasing on credit. Spender debit mechanisms may implement standard accounting balance deduction processes or include additional waiting periods, thresholds, or processing steps as delineated by Spender preferences, security requirements, and financial institution requirements, or by Earner purchasing requirements.

In at least one embodiment of the present invention, money flows from outside the system to Spender accounts, and then to Earner accounts, then back out to Earner accounts outside of the system. In some embodiments, funds can only be withdrawn from Earner accounts. Funds move through the system from Spender to Earner in a carefully monitored and timed fashion.

Money flows into the described embodiments of the system via Spender accounts. The following paragraphs describe money flow in one embodiment of the invention. Spender accounts can be loaded with value from a variety of sources, including credit cards, bank accounts, and prepaid cards. In at least one embodiment, prepayment into a Spender account occurs with either a PayPal account or a credit card, although any suitable method of funding can be used.

DESCRIPTION OF THE FIGURES

FIG. 1 is a method and system functional overview showing logical blocks representing functions and processes implemented in an embodiment of the present invention.

FIG. 2*a* shows an example of division of work performed by elements of an Access Rights Distribution method and system.

FIG. 2*b* shows actions that happen in a communication process in a typical purchasing transaction.

FIG. 3*a* shows how Earners can start earning money from their content.

FIG. 3*b* shows an example of Earner account creation of FIG. 3*a*.

FIG. 3*c* shows an additional example Earner account creation of FIG. 3*a*.

FIG. 3*d* shows an example of an advanced form in Earner account creation of FIG. 3*a*.

FIG. 3*e* shows an embodiment in the Earner account creation of FIG. 3*a*.

FIGS. 3*f* and 3*g* show an embodiment in the Earner account creation of FIG. 3*a*.

FIG. 3*h* shows an embodiment of a content listing, where registered content information is displayed.

FIG. 3*i* shows an example of an HTML snippet in an embodiment in the Earner account creation of FIG. 3*a*.

FIG. 3*j* shows an example path whereby an Earner receives payment for goods or services purchased using the system.

FIG. 4*a* shows several conceptual paths of Spender signup.

FIG. 4*b* shows an embodiment where the Spender follows a Case 1 of FIG. 4*a*, and pays into the system to access content.

FIG. 4*c* shows an embodiment where the Spender follows a Case 2 of FIG. 4*a*, and pays into the system to access content.

FIG. 4*d* shows an embodiment in which Spenders have an ability to set and modify pricing thresholds and delay factors.

FIG. 5*a* shows an example path whereby a Spender pays into the system to fund his account.

FIG. 5*b* shows two possible pay-in mechanisms used by Spenders.

FIG. 6*a* shows several processes through which purchases may be made when Spenders are new to the system.

FIG. 6*b* shows several processes through which purchases may be made when Spenders already have an account in the system

FIG. 9*c* shows that returned Javascript is executed in a browser.

FIG. 9*d* includes additional externally sourced Javascript using an I-frame (IFRAME) in addition to other rendering code and Javascript functions.

FIG. 9*e* shows additional details of autosizing.

FIG. 9*f* shows how the rendered HTML from a first externally sourced Javascript, loads another URL into a second IFRAME.

FIG. 9*g* shows the response from the Earner server gateway includes a cookie with geometry sizing information, readable from the Earners domain.

FIG. 9*h* shows how a Javascript function is used to resize an outer IFRAME using the geometry information in the cookie set by the Earner server.

FIG. 11*a* shows a visual representation of implementing Free for a friend capabilities.

FIG. 11*b* shows an example send page in the Free for a friend process.

FIG. 11*c* shows an example email sent to the Receiver of the free for a friend request.

FIG. 12*a* shows an embodiment of the process involved when sending content free to a friend.

FIG. 12*b* begins after a Receiver, the friend in the for a friend naming, receives a gift code.

FIGS. 13*a*, 13*b*, 13*c*, and 13*d* show an example of a several pages (or partial pages) of a web site built in accordance with the present invention.

FIG. 13*e* shows an example of an Earner web page that contains snippets of HTML that allows a Spender to buy content from the web page.

DESCRIPTION OF PREFERRED EMBODIMENTS

Figure 7A:
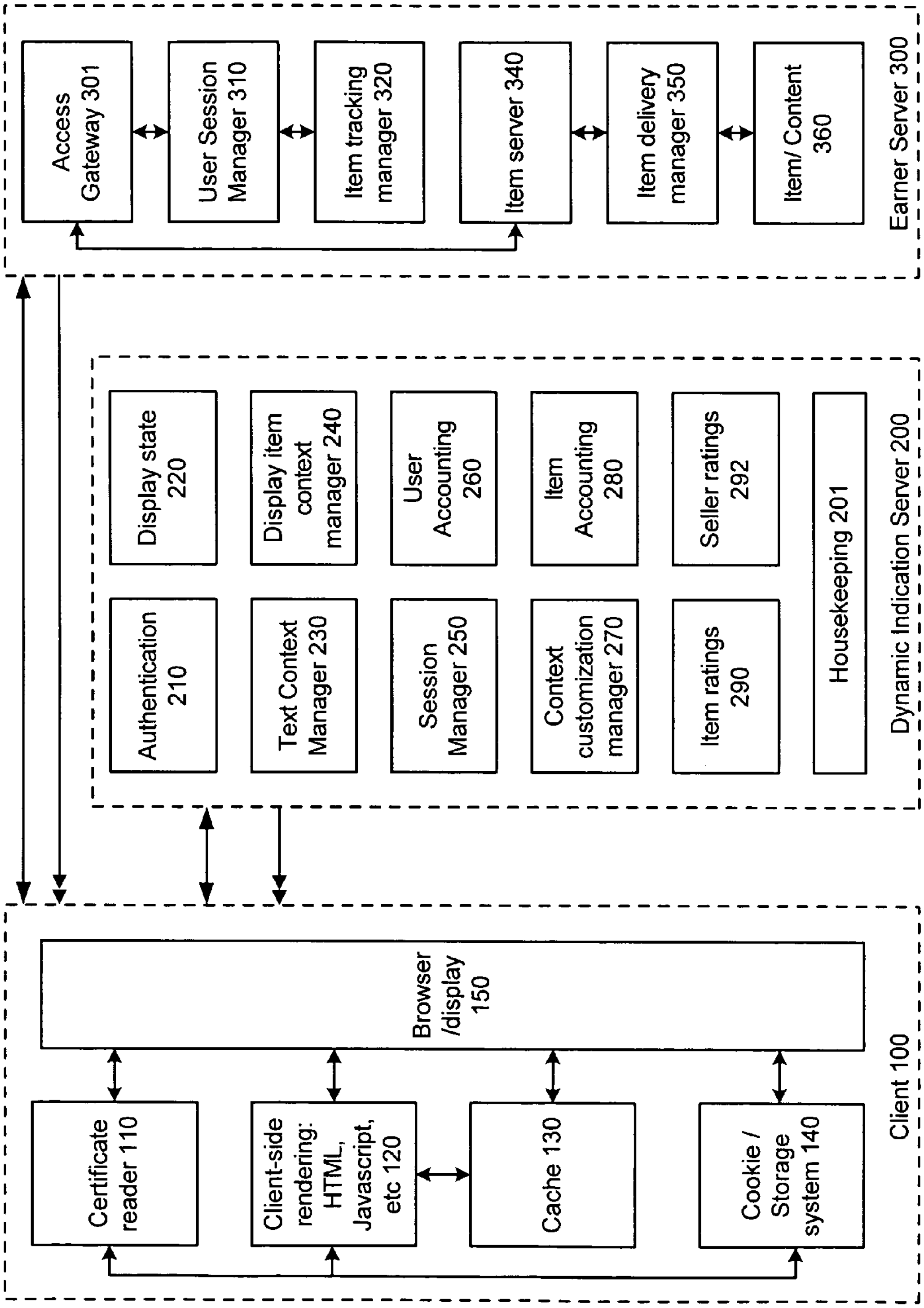
FIG. 7*a* shows three main elements in a system block diagram implementing an embodiment of the present invention.

FIG. 1 is a method and system functional overview showing logical blocks representing functions and processes implemented in an embodiment of the present invention. The block organization and structure are meant to provide information and are not intended to limit the scope of invention or application. As such, Special Processes/Services 1300 and Items/content Management 1400 and their sub-functions, which appear as separate functional areas in the figure, may include, incorporate, or cooperate with functions or processes listed under Spender 1100 or Earner 1200 in certain embodiments. Similarly, in certain embodiments, Spender 1100 or Earner 1200 may incorporate functionality shown as occurring in other areas of the figure.

The described embodiments are implemented using the World Wide Web, although other implementations of the invention can be made without departing from the sprit and scope of the invention. A spender and/or an earner, for example, might access the Web using a computer, a web-enabled mobile telephone, a web-enabled PDA, a handheld data unit, a personal communication device, a data processing system built into his clothes, house, or person, or some similar device.

For the purposes of this application, a "Spender" is a person who spends money in the system. A person may spend money to buy an item, spend money on a donation, etc. A Spender (sometimes also called a buyer) will typically use client software to access content, where the client is typically a computing device that includes a display, which facilitates the transaction between a Spender and an Earner. An "Earner" (sometimes also called a seller) is someone who provides items or content within the system for sale, trade, or acquisition in return for credit or money earned. In the described embodiments, an Earner's server may be anything, which serves content and/or includes an Earner gateway, which facilitates trusted third party interaction frequently used in the system, and may also be used to describe several servers or a server farm. In some embodiments, the Earner's server is included as a part of the server controlling content access.

"Sender" typically refers to a Spender who is using the "Free for a friend" function. A Sender is the person who is sending the free access to content to another Spender. A "Receiver" is the person who receives the gift code providing free access to content sent by the Sender. A "Redeemer" is the person who redeems the gift code, but does not necessarily have to be the Receiver, at least in some embodiments.

Spenders preferably are brought into the system via a Spender setup process 1110 that includes both account creation 1120 and a pay-in mechanism 1130. Spender account maintenance is presumed as a requirement for Spender retention. Key aspects of Spenders are the ability to manage Spender transactions 1115 within the system, including but not limited to account pay-in (shown elsewhere), debit 1125, refunds 1135, and purchasing on credit 1145. Spender debit mechanisms may implement standard accounting balance deduction processes or include additional waiting periods, thresholds, or processing steps as delineated by Spender preferences, security requirements, and financial institution requirements, or by Earner purchasing requirements.

Spender refunds 1135 are processed as credits to the Spender's card restoring credit for a single transaction, multiple transactions, or the entire card. Spender refunds may be implemented based on automatic policies that occur in real-time or batches or a refund may be analyzed on a case by case basis, with or without the assistance of a purchase policy or purchase pattern filters, as discussed at a later point in more detail. In various embodiments, automatic policies may implement blanket thresholds for issuing refunds based on absolute amount, percentage amount, or other thresholds, with actions taken based on the same policies or supplemented by additional inputs such as customer service contact frequency or load, escalation, or other situational factors.

While it is important that prepaid mechanisms are available, the ability to purchase items on credit enhances and facilitates a Spender's purchasing power. Special terms and conditions may be created for purchasing on credit that may duplicate those of typical financial credit instruments or include new methods enabled by the system. In one embodiment, an implementation of purchasing on credit 1145 introduces additional flow of money and business model dynamics. The introduction of credit expands Spender purchasing options while increasing the risk of the system to unpaid charges. Likewise, the use of credit changes the information acquisition phase, requiring more personal information. Certain embodiments allow credit based buying as one or more of an enhancement in purchasing capabilities and as a potential reward for Spenders with specific purchase histories or reputation characteristics.

Certain types of Spenders are granted "loans" within the system where their account balance is bumped up to cover a certain amount of purchases if necessary. Qualifying Spenders pay interest on these "loans."

Earners preferably are entered into the system a setup procedure 1210 in a simple step-by-step process split whereby information gathering, download, and installation can be implemented as being combined with or separated from steps of content setup. Earners have associated processes of account credit for purchases by Spenders, Payment to Earners based on specified criteria, as well as charge-backs for product returns, product problems, or other customer service issues.

Earners preferably are credited 1225 in the system using standard accounts payable and accounts receivable book entries 1220. Basic Earner crediting processes may be enhanced by the addition of promotional pricing, revenue sharing, and levels of service indices that may modify the final crediting process beyond the current implementation.

Earner chargeback 1245 is based on standard accounting principals and ties into the Earner credit, Earner payment, and other Earner processes as well as the Spender debit and Refund processes. Chargeback as well as general purchase processes may be impacted at the front end user interface or back end monitoring based on the Refund requests and chargeback activities of Earners and Sellers.

Item and content management 1410 are closely related to Earners, however they may be dealt with separately. In some embodiments, at least some Earners directly distribute their own content, or they may act as resellers, paid referrers to content, or as virtual owners who pay third parties to store and/or manage the distribution. Similarly, the actual delivery 1420 is tied to the arrangement and logistics of the Earners, who, for example, may use a distributed media delivery system based on nearest server fastest delivery algorithms.

Just as Items and content management 1400 may be deeply intertwined with Earners, the described embodiments of the invention also employ special processes and services that impact the user experience of Earners and Spenders, facilitate content selection and delivery, enhance or influence buying patterns, or enhance privacy. Such processes and services include, but are not limited to buying transaction processes, user interface auto-sizing 1320, dynamic indication in the user interface 1330, for a friend content management 1340, 1345, anonymous buying 1350, and rating systems for content, Earners, and Spenders 1360.

Special processes and services provide unique advantages to the system. These processes and services include, but are not limited to new Spender buying/transaction processes 1310, dynamic indication of information to the Spender (dynamic indication) 1330, user interface readability and presentation enhancement via auto-sizing of page content (auto-size) 1320, Free for a friend (FFAF) and Buy for a friend (BFAF) distribution and marketing capabilities 1340, 1345, anonymous buying 1350, and rating systems 1360.

New Spender buying/transaction processes, dynamic indication, auto-size, and BFAF/FFAF are covered under separate figures, while preferred implementations of anonymous buying and rating system are summarized in this section. Anonymous buying 1350 allows money to be paid into the system and used by a person who does not have to identify himself to the Earner/Seller. In at least one described embodiment, the system does know the identity of an anonymous Spender but does not pass that identity to the Earners. The described embodiment extends this metaphor to online purchases, where the card may be used to store a cash value for use in purchasing online goods and services and for purchasing physical goods and services in the future. in certain embodiments, a right to purchase anonymously us represented by a digital code, physical card, or other appropriate representation. The card may, for example, operate under the same assumption that the code or physical card may be valid and have some discreet value.

Rating systems have been used in the past for rating goods or merchants who sell goods. The ratings system 1360 of the described embodiments allows rating goods at the purchase point and allows rating of Spenders. Similarly, all three ratings: Spender, Earner, and content, may be used independently or in combination to create ratings profiles using linear or more complicated algorithms for expressed ratings. In some embodiments, these ratings can then be tied to the dynamic indication capabilities to affect tooltips or other visual presentations about Spenders, Earners, or content. Likewise, ratings can be directed as inputs into automatic or manual policies affecting actions taken on behalf of or against Spender, Earners, or content.

In at least one embodiment of the present invention, money flows from outside the system to Spender accounts, and then to Earner accounts, then back out to Earner accounts outside of the system. In some embodiments, funds can only be withdrawn from Earner accounts. Funds move through the system from Spender to Earner in a carefully monitored and timed fashion.

Money flows into the described embodiments of the system via Spender accounts. The following paragraphs describe money flow in one embodiment of the invention. Spender accounts can be loaded with value from a variety of sources, including credit cards, bank accounts, and prepaid cards. In at least one embodiment, prepayment into a Spender account occurs with either a PayPal account or a credit card, although any suitable method of funding can be used.

When a Spender purchases access to an item of content that has been enabled (funded), funds, if available, are transferred from the Spender's account to the Earner's pre-settlement balance. Funds arriving in the Earner's pre-settlement balance flow into the Earner's post-settlement balance after a period of 30 days and after transaction fees or other associated fees have been applied. For example, $1 arrives in the pre-settlement balance on day 0. On day 30, ($1 minus a transaction fee of, for example, 15 cents) (i.e., 85 cents) is moved to the post-settlement balance.

Funds in the Earner's post-settlement balance preferably can be withdrawn by the Earner either manually or automatically.

The separation of Spender and Earner accounts in at least one embodiment causes the flow of funds to be unidirectional, enabling the focused application of limited risk management resources to Earner accounts, which are typically far fewer in number than Spender accounts. A delay of, for example, 30-days, before funds received by a Earner can be withdrawn reduces the rate at which potentially fraudulently obtained funds can flow through the system and allows time for fraud detection and pre-emptive refunds to credit cards thereby reducing chargeback risk for the merchant of record. The delay in gaining access to funds sent from Spender to Earner makes person-to-person payment systems that offer real-time access to funds a comparatively attractive target for money launderers. The delay in the settlement of funds results in Spenders not having to pay cash advance service fees to their credit card issuers. In one embodiment, the minimum prepayment is $3, mainly because the only pay-in method supported by that embodiment is with credit cards, which has a higher cost of funds. Other embodiments use a lower minimum prepayment, for example, if credit card transaction fees drop and/or Spenders choose to pay-in using the Automatic Clearinghouse Network (ACH) from their respective bank accounts.

In one embodiment, a fee structure involves charging 15% for items priced from $0.01 to $5.00 and 5%+$0.50 for items priced higher than $5.00. This embodiment preferably charges neither a startup fee nor a recurring monthly fee, although other embodiments may charge one or both, or additional appropriate fees.

Additional fees may be applied in the future for purchases that result from a promotional efforts of affiliates or resellers. The transaction fee itself would stay the same, but there would be an additional promotional service fee. The promotional fee might be a function of the item sale price, just like the transaction fee.

Current embodiments do not currently charge any fees outside transaction fees. Other embodiments may charge additional fees.

Figure 13B:
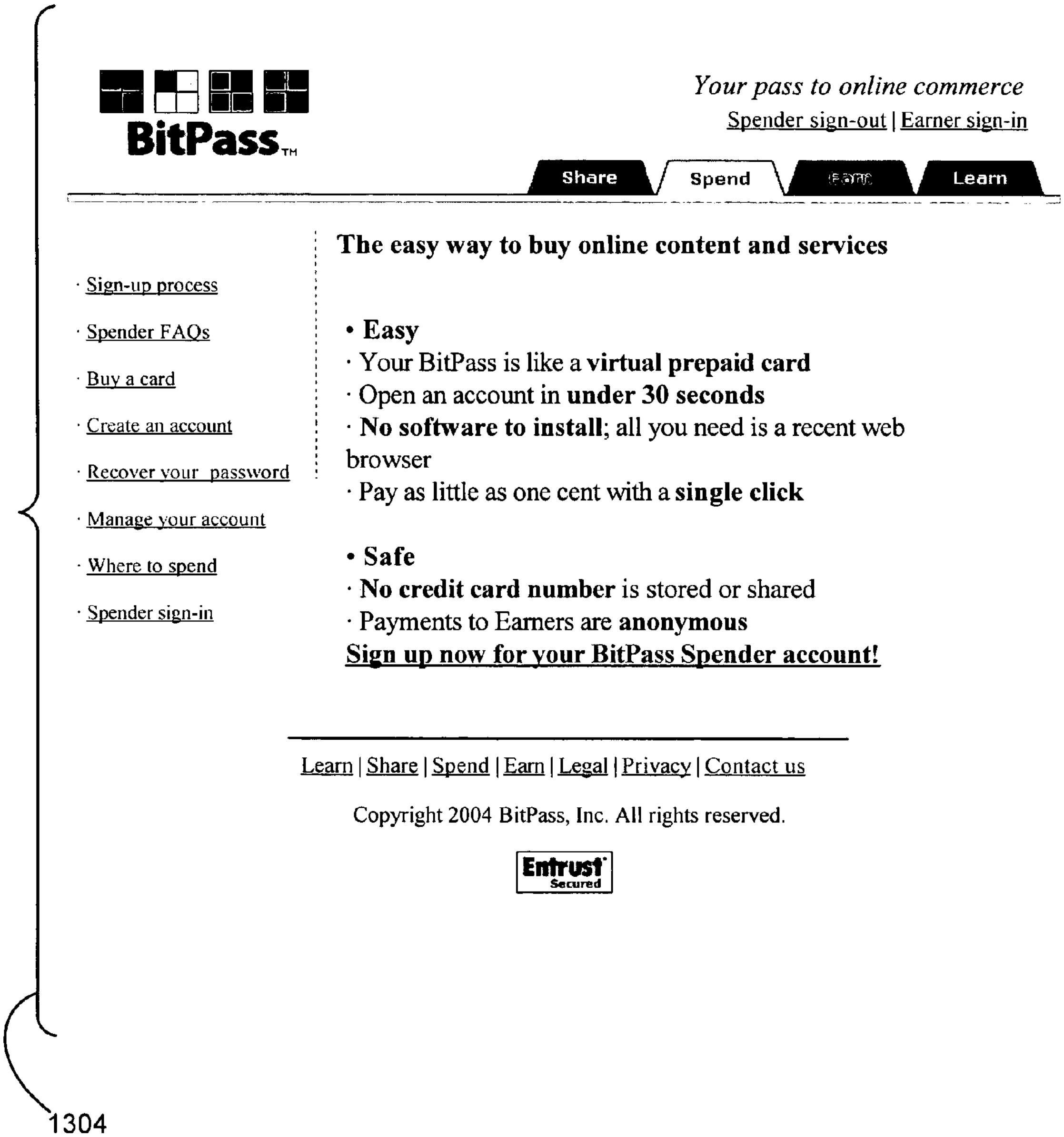

FIGS. 13*a*, 13*b*, 13*c*, and 13*d* show an example of a several pages (or partial pages) of a web site built in accordance with the present invention. FIG. 13*a* shows an example home page 1302, containing a promotion 1303 (allowing a user to send an email about the site). A lefthand column contains an example listing 1305 of the types of content offered by Earners (animation & film, Business, Comics, Education, Games & Crafts, Mobile telephone data such as ringtones, music, non-profit information and products, photography, prose and eBook content, Internet and satellite radio, software, and sports-related content). It should be understood that this list 1305 is only an example and other types of content can also be offered in accordance with the present invention.

FIG. 13*b* shows an example of a web page 1304 directed to potential Spenders.

FIG. 13*c* shows an example of a web page 1306 directed to potential Earners.

Figure 13D:
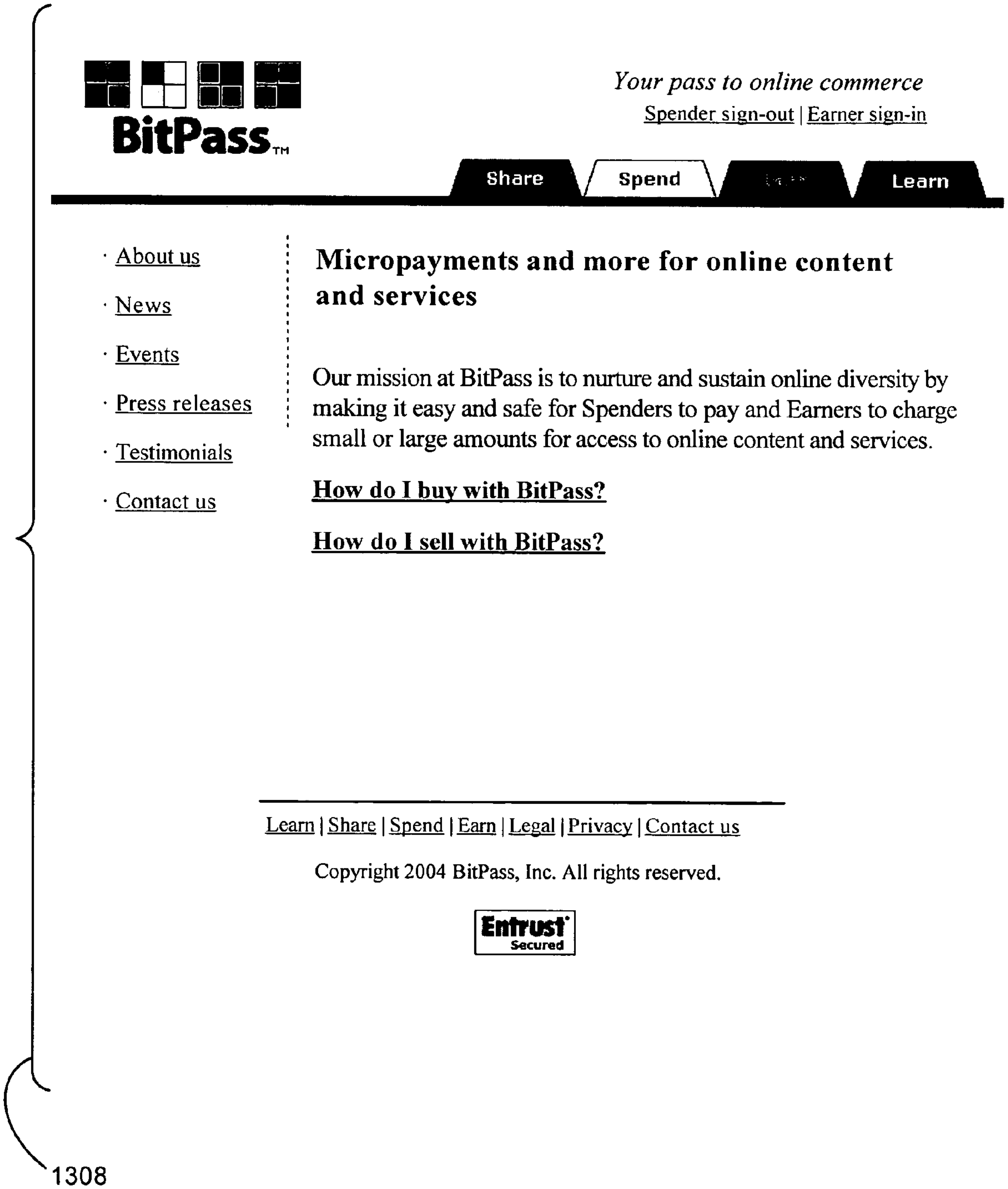

FIG. 13*d* shows an example of a web page 1308 designed to answer a potential user's questions about payments in accordance with the described embodiment of the invention.

FIG. 13*e* shows an example of an Earner web page 1311 that contains snippets of HTML causing displays 1309 that allows a Spender to buy content from the web page.

FIG. 2*a*, Functional division, shows division of work performed by elements of the Access Rights Distribution method and system 1000 of FIG. 1. The elements in this system include Clients 200, at least one Access Rights Transaction Server 202, and Earner Servers 204.

In the described embodiment, content gatekeeping, delivery, and hosting are decentralized while accounting, authentication, and transaction authorization are centralized. While the elements may be shown as single entities, they may function as single entities, partnered entities, or as part of a larger whole. For example, an Access Rights Transaction Server 202 may provide access rights for single or-multiple earners, or it may work in tandem with another Access Rights Server for load balancing, bandwidth, security, or other reasons. Similarly, an Earner server 204 may reside on a computing device by itself or with other Earner servers, or functions performed by Earner servers may reside on multiple computing devices for performance, bandwidth, security, or other reasons.

FIG. 2*b*: Operational flows, shows where actions happen in the communication process in a typical purchasing transaction, where the following purchasing steps are executed (as shown in circles on the figure):

1. Display
2. Selection
3. Authenticate
4. Authorize
5. Issuance
6. Conversion
7. Delivery In an embodiment of the invention, Display on the Client 1 represents a web page sent to a Spender's Client where content is delivered by an Earner Server and an Access Rights Transaction Server. A Spender Selects 2 premium content on the web page on the Client, where the premium content link is served up by the Access Rights Transaction Server. Authentication 3 and Authorization 4 of the Spender, Item, and funds preferably is performed by the Access Rights Transaction Server, where a voucher is issued 5 for the content to the Client.

The client submits the voucher to the Earner server, who converts 6 the voucher to a pass, which then allows delivery 7 to the client of the premium content.

FIG. 2*b* is not intended to limit the scope of invention, as functions of authentication and authorization also occur at the Earner Server, though typically for delivery preparation of content in the shown embodiment. As expected and indicated earlier in FIG. 2*a*, the decentralized gatekeeping by Earner servers 204 must generally include forms of authentication and authorization. However, these forms can be less robust than those functions as performed by the Access Rights Transaction Server 204.

FIG. 3*a* is a flow chart showing an Earner sign-up process. FIG. 3*a* shows how Earners in one embodiment can start earning money from their content in just five functional steps:

Step 1 (302): Create an earner account. In this step, the Earner chooses an earner ID and a password. The Earner has preferably asked for an email address in case an Earner forgets his password or he needs to be notified of changes to the service.

Step 2 (303): Enter site information. In this step, we obtain basic information about the Earner's site, such as the domain name of Earner's server and in what directory his premium content is located.

Step 3 (304): Install customized gateway on your server. In this step, a site-specific gateway script (based on the information the Earner provided) preferably is generated that needs to be installed on the Earner's server to control access. An Earner can install the script (by manually downloading and uploading it to an Earner server) or we can help install it for an Earner via FTP, Telnet, SSH, or other mechanism. The gateway code (executable, binary, object, script, etc) assists in providing functionality described in the auto-sizing discussion covered in other figures. Once step 3 (304) is completed, an Earner has completed a minimal number of necessary setup procedures. Steps 4 (305) and 5 (306), which follow, describe preparations steps for identifying and providing access to actual items.

Step 4 (305): The earner registers his your content. In this step, we ask Earners where specific premium content is located, how much they want to charge for access, and how long they want to grant access once a purchase is made.

Step 5 (306): The Earner embeds HTML snippets into his web pages. In this step, snippets of HTML are provided that Earners will need to embed in his or her web page(s), one for each item they are selling. Earners will also need to embed one additional snippet of HTML at the top of each web page that contains a enabled item. Steps 1 through 3 only have to be completed once. Thereafter, Step 4 and 5 can be repeated as needed. An example of a web page containing a snippet of code is shown in FIG. 13*e*. Here, the snippet of HTML displays section 1309 (among others) on the web site.

FIG. 3*b*: Create an Earner Account, shows an example of the first step of Earner account creation 302. Minimal identifying information 308 is required in the form of username and password. In this embodiment, an email address is used as a username identifier.

FIG. 3*c*: Retrieve basic site information, shows an example of the basic form of step 2 (303) (enter site information) in Earner account creation. In the described embodiment, information requested includes a site name 310 or handle for reference; a brief description 312 used for identification, searching, ordering, classifying, or processing of Earner's information; a base URL 314 to identify the logical location of an Earner's server; and a premium directory 316, which represents the relative location of items or content on the Earner's server. When this information is entered, the Earner presses Submit 318 as is known in the user interface art.

FIG. 3*d*: Retrieve advanced site information, shows an example of the advanced form of step 2 in Earner account creation. This page preferably is displayed if the user selects option 311 in FIG. 3*c*. Additional sample information requested includes a gateway path 320 to identify the logical location of the gateway script on an Earner's server; the index file name 322 (including a test button 323); Privacy policy information for the Earner's site 324, and site availability information 326.

The information gathered in FIG. 3*c* and/or FIG. 3*d* is used to auto-generate a download file. The information is extracted, parsed, and/or manipulated after which it is compiled, built, or inserted into the appropriate locations for the download file. This auto-generation simplifies the installation process for Earners, facilitating rapid setup and installation and leading to faster adoption.

FIG. 3*e*: Installation and Download, shows an embodiment 330 of step 3 in the Earner account creation. Downloads are available for gateway code to be installed on the Earner's server or servers, where the Earner may choose from several choices in terms of technology. Additional downloads will be available to support other development environments beyond those stated in the figure. As part of the selection process, pros and cons are presented for each download.

FIGS. 3*f* and 3*g*: Content Registration, shows an embodiment of step 4 in Earner account creation. Each content item has a name 340, price 342, location (path) 344, visual representation (link text) 346, with expiration time and revisit count 348. Status Icons 349 are selectable. IN this embodiment, the earner sets the size and appearance of the Icons. The colors of the icons are controlled as described in later paragraphs.

In FIG. 3*g*, advanced features 311*a* may be tied to the content. Advanced features include, but are not limited to license selection 352 (for example, the well-known Creative Commons license), availability notation 354, style sheets 356 image URLs 358, and target frames 359. The number of allowed Maximum Revisits 360 limits the number of time content may be revisited free of charge, while Expiration 362 provides a flat time period for access. Content registration may also be performed via bulk upload, using delimited files, spreadsheets, XML parsed data, or other methods. Content registration can occur before, during, or after content is available on the Earner Server, however content upload before content registration is suggested to minimize dead links or missing files.

FIG. 3*h*: Content List, shows an embodiment of a content listing, where registered content information is displayed. Displayed information 370 includes, but is not limited to content name, location (path), link text, price, expiration date, and index. Individual content access may be edited or deleted, or the modifications can be performed in bulk.

FIG. 3*i*, containing an example of an HTML snippet, shows an embodiment of step 5 in Earner account creation. An HTML snippet 380 is embedded into a webpage from where the content may be purchased. A snippet is inserted at the top of each web page that contains an enabled item in addition to a snipped used for each item. The snippet assists in providing communication between an Earner's server, the gateway, and a client. Specific HTML may vary by required implementation, however, the snippet facilitates item identification, user identification, text auto-sizing, and dynamic indication.

FIG. 3*j*: Earner Payout, shows an example path whereby an Earner receives payment for goods or services purchased using the system. Several concepts are important to this process; these include Earner credit for purchases 392, Earner credit activity flags 394, Earner payment threshold 396, payment period testing 396, payment methods 398, and actual payment execution 399. Checking of activity determines if an Earner account should even be reviewed for possible payment, whereas a threshold check determines if enough credit has accrued to warrant a payment. Order of operations can be modified for efficiency, speed, or other reasons, with the end result yielding payment if a threshold has been passed, a certain amount of time has passed, or both. Other factors may determine Earner payout in other embodiments and the description herein is not meant to replace, limit, or exclude any payment conditions.

FIG. 4*a*. Spender sign-up process, shows several conceptual paths of Spender sign-up. Other embodiments and implementations of Spender sign-up may occur with the end result being a Spender able to purchase from Earners using a trusted third party access rights management system. The basic cases show how a Spender, new to-the system, or Virgin Spender, can create an account for use in the system. These cases include but are not limited to: Case 1: Virgin spender visiting an enabled site (402-407), Case 2: Virgin spender visits central site (such as shown in FIG. 13*a* etc.) (412-416), Case 3: Virgin spender receives a FAF (4AF, for a friend email) (417-422). FAF (For a Friend) is an innovation in the system where Spenders or Earners may choose to distribute content to other Spenders (discussed in later figures).

In each case, the fundamental action is the election to create an account, whereby username and password are used to reserve an account for the Spender. Order of information request or acquisition as well as the entry points into the system may vary. Pay-in can occur independently or during the Spender account creation process. A Spender account with credit, allows the spender to purchase access to content depending on the amount of credit.

FIG. 4*b* Virgin Spender visits an enabled site, shows an embodiment where the Spender follows Case 1 of FIG. 4*a*, Spender account sign-up, and pays into the system to access the content. Here, the user clicks on icon 431 and is prompted to sign up for an account 432. Example screen shots of the pay-in process are shown, including the association of the paid card to the Spender 432/434. Association between Spender and the card can be performed as shown, however, the figure is not meant to limit the ways that the association can be created. In fact, the association can be created without explicit pay-in.

FIG. 4*c* Virgin Spender visits BitPass site, shows an embodiment where the Spender follows Case 2 of FIG. 4*a*, Spender account sign-up, and pays into the system to access the content. Example screen shots of the pay-in process are shown, including the association of the paid card td the Spender. Association between Spender and BitPass card can be performed as shown, however, the figure is not meant to limit the ways that the association can be created. In fact, the association can be created without explicit pay-in. here, the user clicks to buy a virtual card using UI 436. The resulting "card#" is associate with the user at UI 434.

Free for a friend activity is explained in more detail later, where a Receiver may create an account by following a link in an email sent to the Receiver when he/she receives prepaid content acknowledgement in an email. The sign-up process is very similar to those show in FIGS. 4*b* and 4*c*, with an example email which leads to the sign-up shown in FIG. 11*c*.

FIG. 4*d*: User Preferences: Spenders have the ability to set and modify pricing thresholds 442 and delay factors 444. In some embodiments, pricing thresholds can be used for buying without confirmation for a frictionless process or so called "0 click" if the price if below a certain threshold. An upper threshold can be used to set a "2 click" limit, providing warning to a Spender that a purchase price is above the threshold. Similarly, in some embodiments, delays and delay rates 446 can be used to give the Spender a chance to cancel, with the time to cancel affected by the delay rate. In one embodiment, the delay is linearly associated with cost, with a delay of one (1) second per $1 or as determined by the Spender preferences.

FIG. 5*a*: Spender Pay-in, shows an example path whereby a Spender pays into the system to fund his account. Pay-in 502 can be accomplished through several methods 504 including, but not limited to PayPal, credit card, cash, check, EFT (electronic funds transfer). The result of pay-in is the creation or addition of funds useable on a BitPass card for purchasing items or access rights using the system. Authorization and authentication 506 can vary and should be based on secure methods to minimize fraudulent pay-ins to the system. The system verifies that the Spender has the funds in his account 508.

FIG. 5*b*: Spender Pay-in examples, shows two possible pay-in mechanisms, showing PayPal and Credit card. Pay-in can use US Dollars 509 or any other currencies that are accepted by BitPass, its Earners, or associated financial institutions. The Spender enters his credit card information (or other information identifying a source of funds) and decides how much he would like to initially put in his account 511.

FIG. 6*a*: Spender Purchase Process, shows several processes through which purchases may be made. Spenders in FIG. 6*a* are new to the system, while Spenders in FIG. 6*b*: already have an account in the system. The spending purchase process may or may not start at an Earners premium content, may or may not include FAF (for a friend) links, and may or may not include an indicator system. In all cases, however, the Spender must have a valid account and password. Content, in each case, is accessed based on the content registry of the Earner delivering the content (described in the Earner setup section and FIG. 3*a*).

Once a Spender has a valid account, the Spender may use that account or create new accounts to purchase content. A Spender with a valid account can then purchase content from a single or multiple Earners in any given time period. A logged in Spender may also purchase items from different sites without any additional logins.

For example, a new Spender may visit 602 a BitPass enabled site (content-enabled site) for the first time (case 1, FIG. 6*a*) where they click 603 to buy content, create an account 604, 605, 606, 607, login 608, and get content 609. If they go to another content-enabled site (case 4, FIG. 6*b*) and click to buy content, they may get the content (no additional clicks) directly or with a simple click to authorize depending on the Spender preferences for waiting period, threshold, or other customizable parameters to control to Spending experience. Thus a single sign-on mechanism is allowed, whereby Spenders need only sign-on once and can buy from multiple Earners who may host their services or content on the same or different domains.

In various embodiment, single sign-on is enabled through cookies, a third party, a trusted third party or other methods, including the gateway implementation on the Earners' Server or servers working in conjunction with Access Rights Transaction Servers.

FIG. 7*a* shows three main elements in a system block diagram implementing an embodiment of the present invention. A Client 100 contains several components including a browser or display interface 150, a certificate or security subsystem 110, a client-side rendering module 120 for enabling the display of such things as HTML, JavaScript, VBScript, or others not specifically mentioned, a caching mechanism 130, and a cookie or local storage based tracking mechanism 140. In the implementation of the invention, certificate reader 110 provides a mechanism for ensuring and managing secure communication between the Client 100 and other elements not of the Client 100 classification. Client side rendering 120 provides an internal module to render or prepare for display the data, which is presented through 150. Cache 130, which is optional, provides typical caching properties, which may speed up the operation of data access capabilities of the Client 100. 140 provides a local storage mechanism, temporary or permanent, that can be used or facilitate communication with or track general or specific actions of the Client 100, acting independent of or in conjunction with certificate reader 110.

A Dynamic Indication server 200 performs a dynamic indication functions as part of an Access Rights Transaction Server as discussed in earlier figures, and may function as an integrated component or a separate communicating component in an overall system. The dynamic indication server 200 contains several components including an authorization/authentication module 210, text based context indicator manager 230, a display state manager 220, an icon or visual display state context manager 230, a session manager 250, a user accounting module 260, a context customization manager 270, item accounting 280 and cataloging module, an item and seller rating module 290, and a general housekeeping module 201 for operations not performed by the other modules but still required by the invention. The modules interact with each other and with external modules of other elements in the invention and the functions are more specifically described in other figures. Other implementations of the invention may divide the modules into different functional units without departing form the spirit of the invention.

An Earner server 300 contains several components including an Access Rights Gateway 301, a user session manager 310, an item/content voucher manager 360, a product/item delivery server 350, a product/item manager 310, and an item tracking manager 320. Item server 340 manages the serving function, handling the handshaking and administrative tasks involved in the serving of the item. Item delivery manager 350 typically works at lower level than session manager 310 managing specific items or structures of items including directories or other organization systems. Item content manager 360 represents the items themselves, either physically, logically, addressed or some other mechanism allowing the items to be delivered directly or indirectly. The modules interact with each other and with external modules of other elements in the invention and the functions are more specifically described in other figures.

Figure 7B:
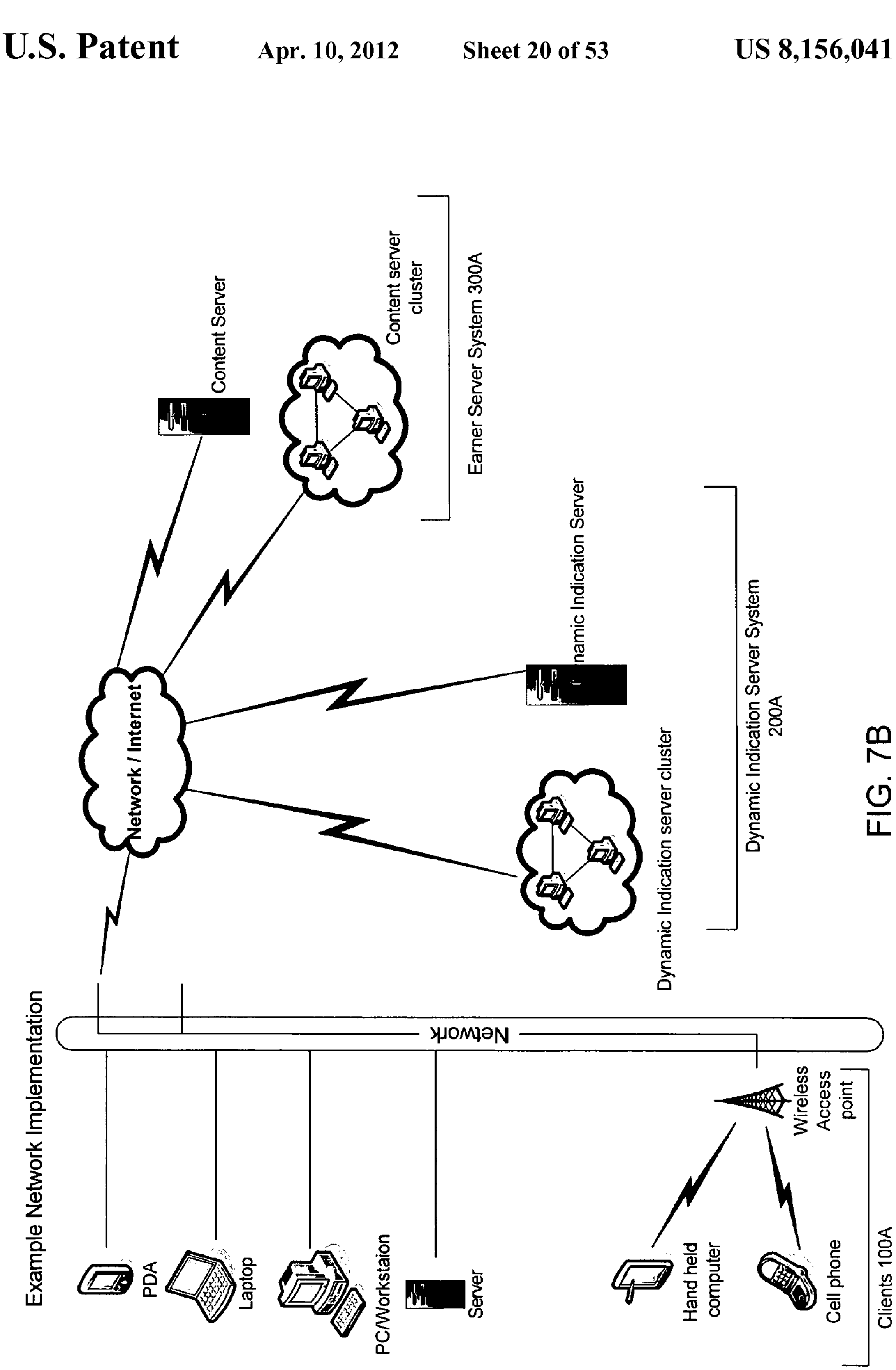
FIG. 7*b* shows three main elements at the system level in a network environment used in one embodiment of the invention.

FIG. 7*b* shows three main elements at the system level in a possible network environment. Clients 100A in a preferred embodiment include web browsers on computing devices connected through wired and/or wireless networks to the other elements. Dynamic Indication Server System 200A can reside on one or more servers including a server cluster and are connected to the other elements of the content access and distribution system through wired or wireless networks playing in important role in the Access Rights Transaction Server System. Earner server system 300A can reside on one or more servers including a server cluster and are connected to the other elements of the access rights and distribution system through wired or wireless networks.

FIGS. 7*c* through 7*j* show example implementation of the invention using a web browser, where dynamic indication is used to communicate additional information to the user. In a preferred embodiment, the color of icon 710 has the following meanings. Color coding icon 710 allows a user to immediately understand whether he can access a particular content item.

=Blue=Premium content indicator. Not logged in.

Red=Not cheap. Above your threshold price.

Yellow=Cheap. At or below your threshold price.

Green=Free. Already purchased content.

Figure 7C:
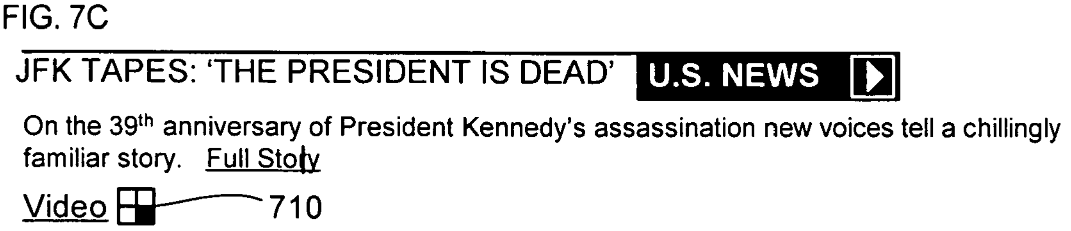
FIGS. 7*c*-7*j* show example implementations of the invention using a web browser, where dynamic indication is used to communicate additional information to the Spender.

FIG. 7*c* shows an example generalized presentation of an indication mechanism. Specifically in this screenshot, dynamic indication is shown as part of a webpage where the text and icon are displayed (in blue because they are premium content in this example and the user is not logged in). Dynamic indication is available from the text and icon, however the contextual information is not shown until some event happens.

Figure 7D:
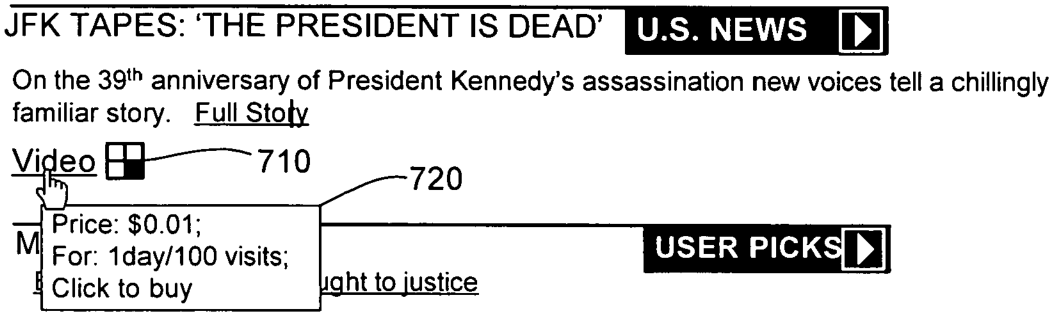

FIG. 7*d*: Example generalized presentation of indication mechanism where context is associated with a text link. In this screenshot, the event of a mouse-over over the text shown causes dynamic indication text 720 associated with the text to be shown. This context shows the price, length of time a purchase is valid, and instructions ("click to buy").

Figure 7E:
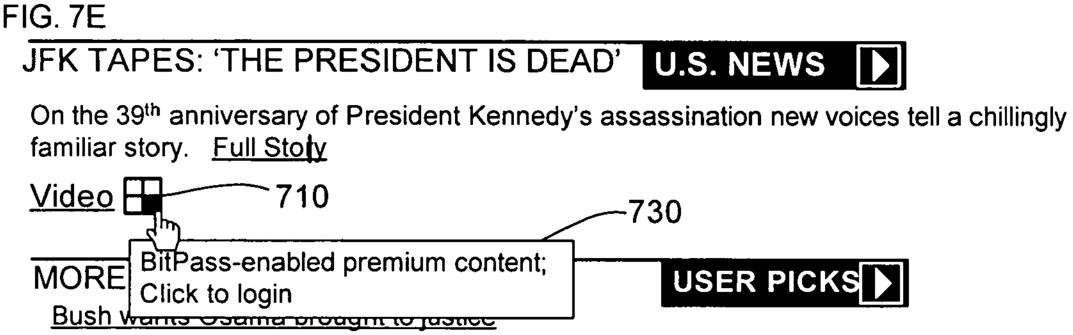

FIG. 7*e*: Example generalized presentation of indication mechanism where context is associated with graphic indicator. In this screenshot, the event of a mouse-over over the icon 710 causes dynamic content 730 to be shown in the proper context. This context describes how the item to be accessed is premium content and that additional context will not be available until the user logs in.

Figure 7F:
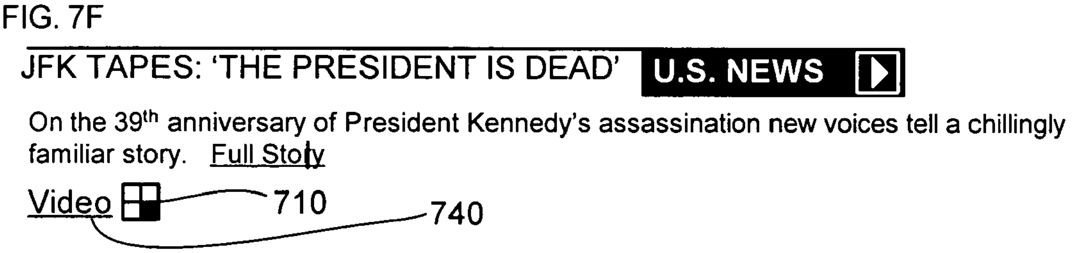

FIG. 7*f*: Example generalized presentation of indication mechanism where context is associated with graphic indicator and a change of state. In this screenshot, the icon has changed color from blue to yellow without a screen refresh. The login context is shown in the color and orientation of the color in the icon since yellow indicates that the Spender can afford the content and it is not over his threshold (which was set by him in this example).

Figure 7G:
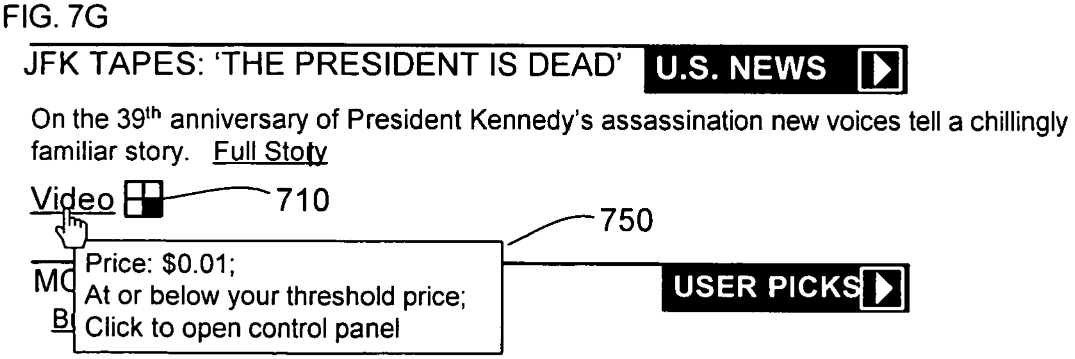

FIG. 7*g*: Example generalized presentation of indication mechanism where context is associated with graphic indicator and displayed with a change of state. In this screenshot, the event of a mouse-over over the text shown causes dynamic indication text 750 associated with the text to be shown. This context shows the price, relationship of threshold to price, and suggested actions. This dynamic indication mechanism is showing login status (yellow color of icon) as well as contextual text related to the item.

Figure 7H:
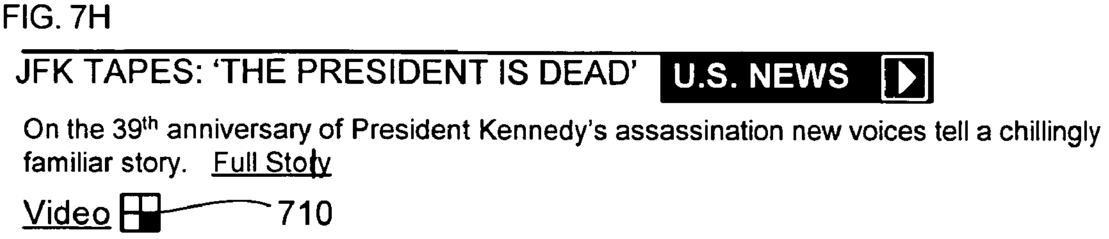

FIG. 7*h*: Example generalized presentation of indication mechanism where context is associated with a graphic indicator and displayed with a change of state. In this screenshot, the icon 710 has changed color to green without a screen refresh because the user has logged in. The login context is shown in the color and orientation of the color in the icon.

Figure 7I:
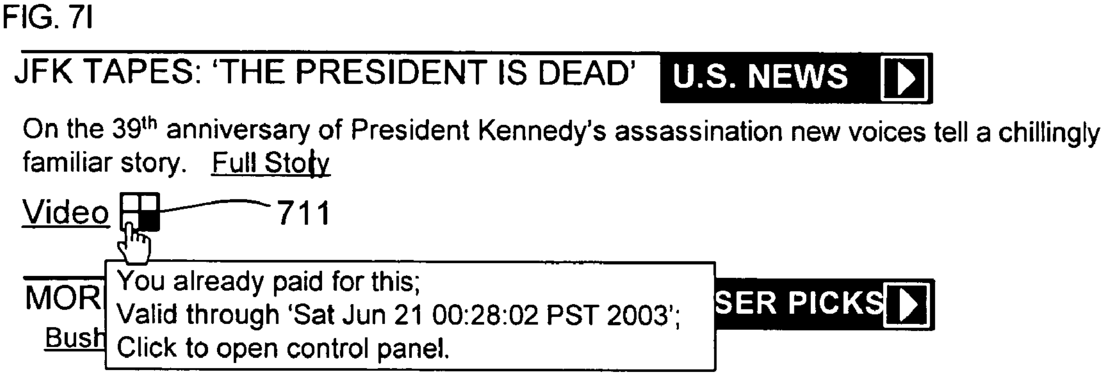

FIG. 7*i*: Example generalized presentation of indication mechanism where context is associated with a graphic indicator. In this screenshot, the event of a mouse-over over the icon 710 causes dynamic content to be shown in the proper context. This context describes how the item has already been accessed and how long the user has valid access to the item.

Figure 7J:
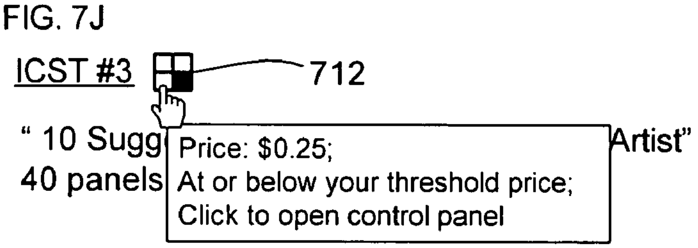

FIG. 7*j*: Example generalized presentation of indication mechanism where context is associated with a graphic indicator. In this screenshot, the event of a mouse-over over the icon 710 causes dynamic content to be shown in the proper context. The login context is shown in the color and orientation of the color in the icon (Red in this case). This context describes how the item to be accessed has a price higher than the threshold, thereby allowing for intervention in the buying process.

The discussion in FIGS. 8*a*-8*d* presume that the dynamic indication icon starts in the blue color for a preferred embodiment, where the icons and dynamic indication text operate within an I-frame on a web page.

Figure 8A:
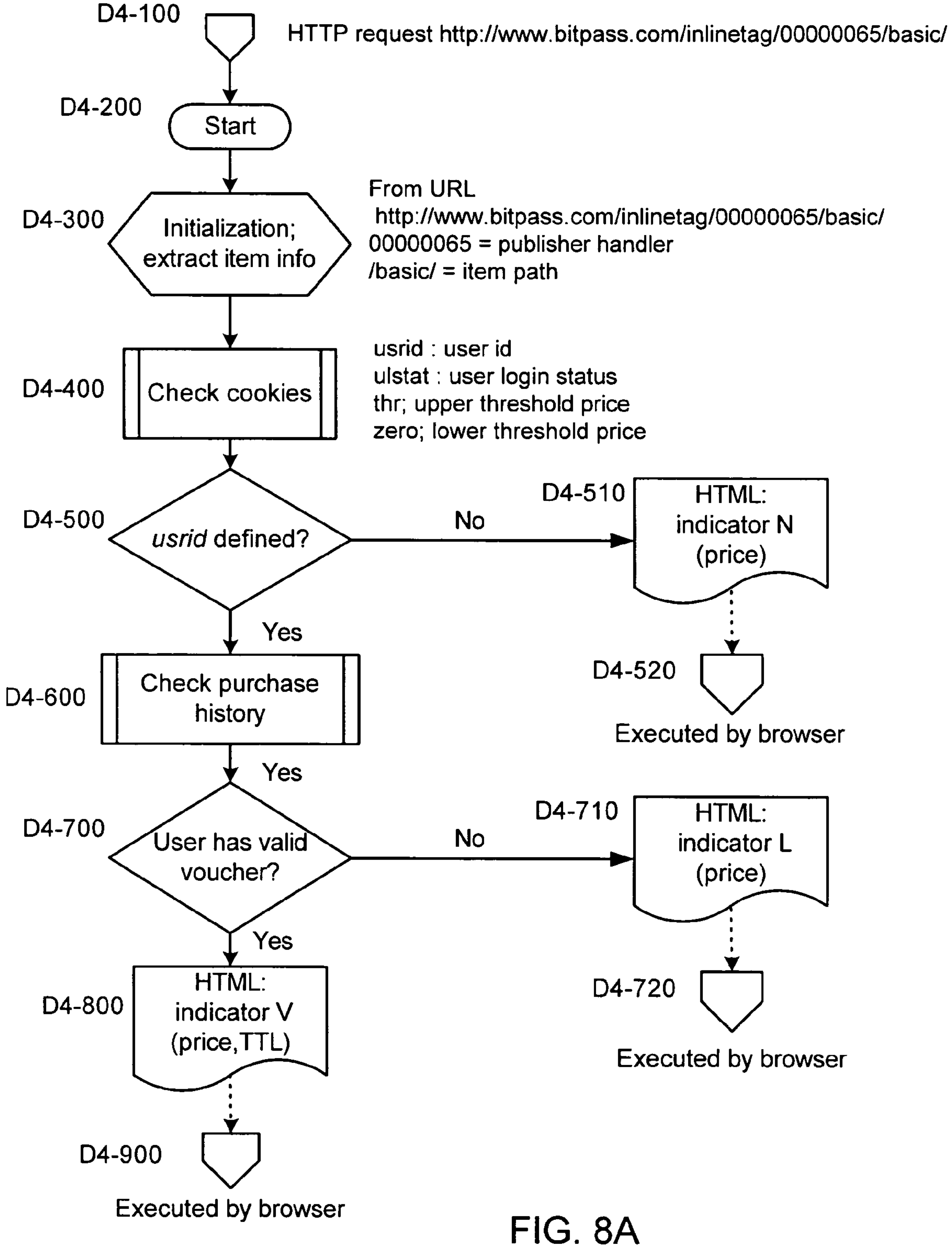
FIG. 8*a* is a flow chart of operational steps for implementing an embodiment of the present invention.

FIG. 8*a* is a flow chart of operational steps for implementing an embodiment of the present invention. The dynamic indication change process is effected depending on specific states described in this figure. At D4-100, a user has elected to review items that may be purchased, and initiating a dynamic display cycle D4-200. In a preferred embodiment, D4-100 represents a HTTP request (for example, http://www.bitpass/com/inlinetag/00000065/basic) that generates a page where the indicators are displayed.

D4-300 shows item information is extracted when the item review information is passed to the client. In a preferred embodiment, the item information is passed via the URL or other HTTP mechanism. This item information is extracted from the item catalog and includes item ID and other information.

D4-400 shows user information is extracted from a client computing device where information such as user id, user login status, upper price threshold, and lower price threshold may have been provided to the client through earlier communication. In a preferred embodiment, the user information is extracted from cookies that contain the user related information. Any number of cookies can be used, although 4 independent cookies may provide programmatic efficiencies. In such a case, one cookie could be used for user id (usrid), user login status (ulstat), upper threshold (thr), and lower threshold (zero) respectively.

D4-500 checks to see if a user id exists in the user information, continuing to D4-510 if none is found. In a preferred embodiment, the browser checks if usrid information exists from the cookie and/or if usrid is valid. If none is found, D4-510 represents a condition where no cookie is set or a valid cookie has not been found. Continue to D4-520 to process the condition D4-510.

D4-600 takes the user information and retrieves relevant user information, including user purchase history. In a preferred embodiment, a valid usrid allows for a database search of the purchases by usrid and compares that to the item under review.

D4-700 checks for authorization that may have been passed to the client computing device before the current review cycle, directing the following action depending on the existence of prior authorization. In a preferred embodiment, the prior authorization is the form of cookie, token, or voucher, which generically or explicitly allows for access to additional information about the item or to the item itself. D4-710 is entered if no valid authorization has been found. Item information including item price (price) is passed along with user information for further processing in D4-720.

D4-800 is entered if proper authorization for the item is found, where the authorization is found to include key information such as item price and access expiration. This information is passed along to D4-900 for continued processing. In a preferred embodiment, item price (price) and access expiration date (TTL) are extracted from the voucher for use in D4-900.

Figure 8B:
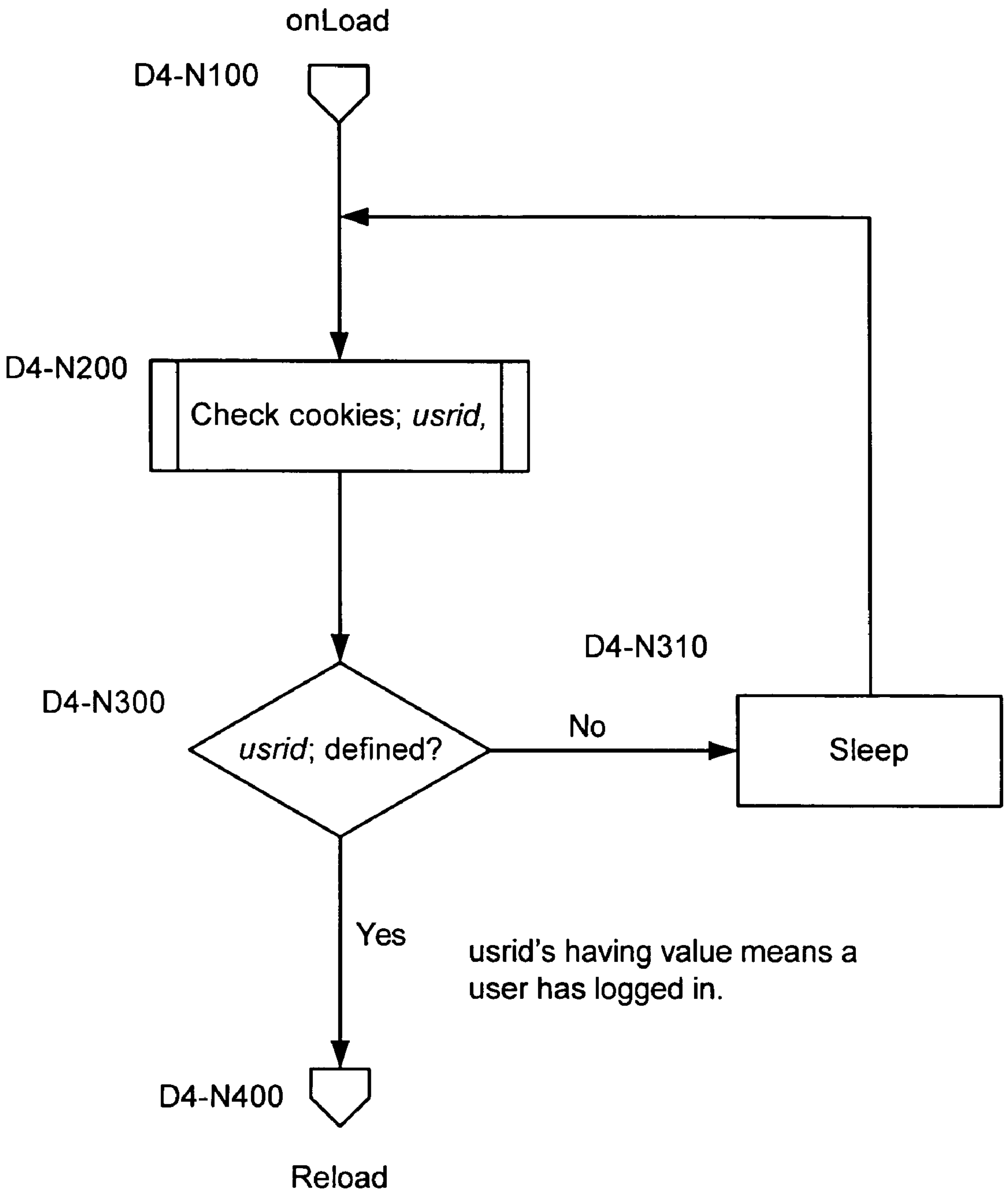
FIG. 8*b* is a flow chart of operational steps for implementing an embodiment of the present invention after valid user information has not been found.

FIG. 8*b* is a flow chart of operational steps for implementing an embodiment of the present invention continuing from D4-520 after valid user information has not been found. The processing loop functions to check for valid user information in the context of reviewing item information for potential future purchase.

D4-N100 represents the information load process on the client computing device. In a preferred embodiment, D4-N100 represents an onload HTTP event for the dynamic indication content.

D4-N200 represents a check for valid user information, where valid information would exist if a user has successfully logged in or gained access to the system in the past, leaving appropriate markers of the users actions. In a preferred embodiment, cookies are checked for valid usrid information.

D4-N300 evaluates if valid user information was found, sending the process to D4-N310 if valid user information was not found which contains a wait state before future processing. In a preferred embodiment if a valid usrid is not found in browser cookies, processing directed to D4-310, which programmatically inserts a waiting or Sleep period.

D4-N400 is entered only if valid user information has been found. This occurs when a user has logged in or gained access to the system. In a preferred embodiment, D4-N400 is reached after a user has logged in and a valid cookie is set for that user. The I-frame containing the dynamic indicator icon and text is reloaded.

Figure 8C:
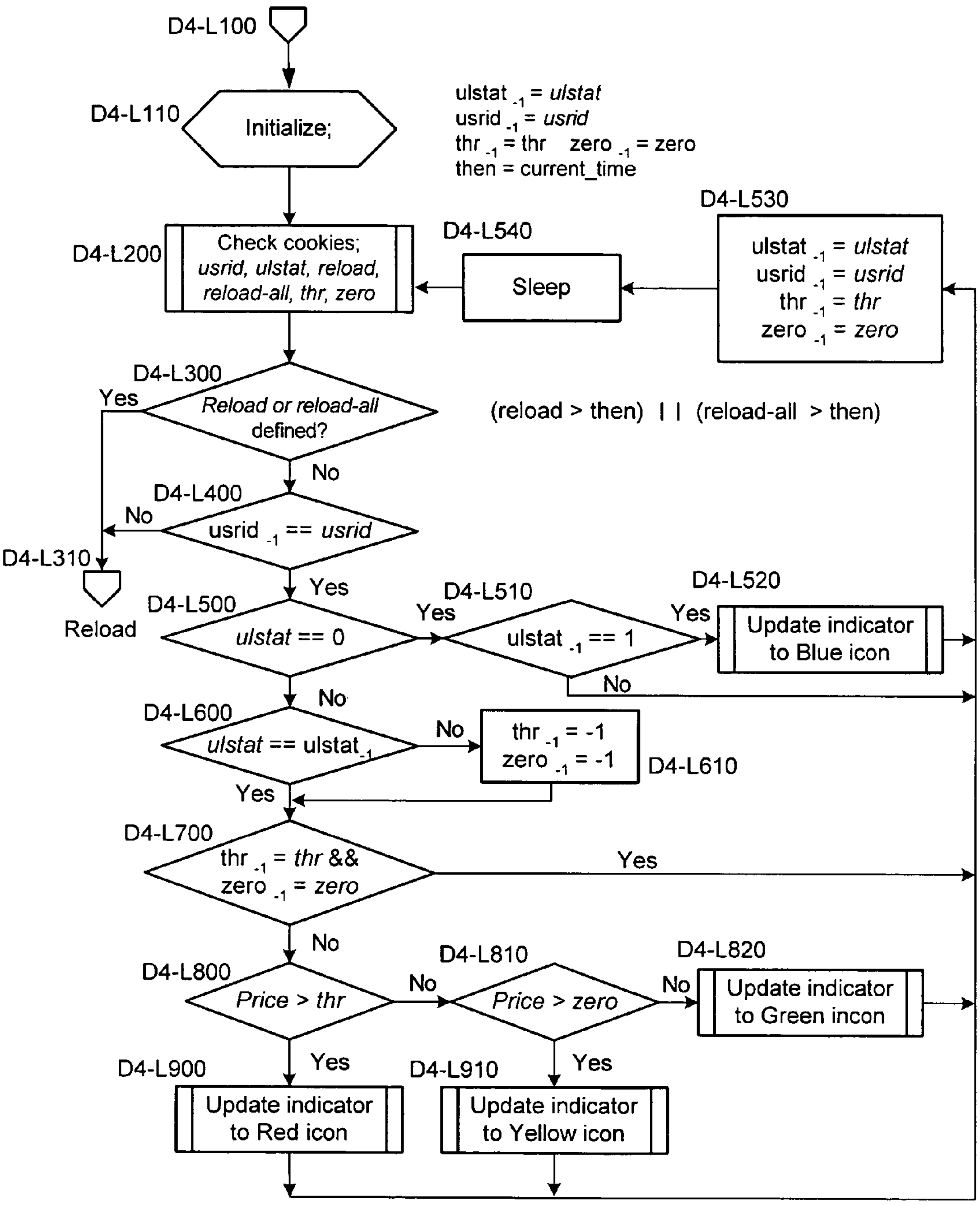
FIG. 8*c* is a flow chart of operational steps for implementing an embodiment of the present invention after a validated user was found who did not have a valid voucher for access to the item being reviewed.

FIG. 8C is a flow chart of operational steps for implementing an embodiment of the present invention continuing from D4-720 after a validated user was found who did not have a valid voucher for access to the item being reviewed.

D4-L100 represents the information load process on the computing device under the conditions satisfied for D4-720. In a preferred embodiment, D4-L100 represents an onLoad HTTP event for the dynamic indication content.

D4-L110 follows D4-L100 where state variables are initialized to enable comparisons that affect the dynamic indication mechanism. Variables include, but are not limited to, user login status, user id, current time, and voucher validity period including previous state variables for each. For initialization purposes, previous state variables are assigned the same value as current state variables. Also, price thresholds are extracted for the user based on the user ID. In a preferred embodiment, usrid and ulstat are extracted from cookies and assigned to usrid-1 and ulstat-1, which are used to represent previous states for usrid and ulstat respectively. Variables thr and zero are used to represent high and low thresholds, although other thresholds or stratifications could be used if necessary for specialized processing. In practice, any variable names may be used, but should be chosen for consistency and ease of association to operational states.

D4-L200 serves to check user information locally stored on the client computing device which can serve as event directors in the processing of dynamic indication display.

D4-L300 checks to see if a reload flag is set to cause a reload action D4-L310. The reload flag may indicate single (reload) or group (reload) all execution when control is passed to D4-L310. In a preferred embodiment, reload and reload-all are enabled through cookies, providing control mechanisms in two ways. In the first mechanism, the existence of the reload or reload-all cookies may trigger the reload or reload-all action reloading a single or all dynamic indicators via I-frame. In the second mechanism, the reload or reload-all cookies may include expiration or execution times, causing a reload through D4-L310 when the reload or reload all time value is greater than the current time value (then).

D4-L400 tests to see if there has been a change in the user, and if true, control is sent to D4-L310 for a reload. In a preferred embodiment, the variable usrid is extracted from a cookie is compared to previous state variable usrid-1. If usrid does not equal usrid-1, then a reload event is called D4-310.

D4-L500 is reached if the user has not changed. The user login status is checked to see if the user is currently logged in or not. If the user is not logged in control is passed to D4-L510 to check if there was a change of state where the user has logged out since the last check of the login status. If the user has recently logged out as determined by D4-L510, then D4-L520 is called to update the indicator to indicate the new status of "not logged in". Control is then sent to D4-L520. In a preferred embodiment, user login status (ulstat) is check for logged out status 0, which turns control to D4-L510 if true. D4-L510 then compares ulstat with ulstat-1 to check if there was a change in login status (if ulstat-1 is a 1, or logged in during the previous cycle). If the ulstat-1 is indeed 1, a state change has occurred, the user has recently logged out, and the indicator must be changed to reflect this in D4-L520. In D4-L520, the indicator is updated to Blue, to reflect the not logged in state.

D4-L530 acts as a reset mechanism, where previous state variables are set to current state variables, and previous thresholds are set to current thresholds. In a preferred embodiment, ulstat-1 is set to ulstat, usrid-1 is set to usrid, thr-1 is set to thr, and zero-1 is set to zero.

D4-L540 contains a waiting period before future processing at D4-L200. In a preferred embodiment, D4-L540 programmatically inserts a waiting or Sleep period.

D4-L600 is reached if the test D4-L500 returned-value that the user is currently logged in. D4-L600 tests to see if the current logged in status is new by checking the previous state variable for the login status. If the check reveals that the user has recently changed during the current cycle from logged out (previous state) to logged in (current state), the D4-L610 is invoked to reset the user threshold values, returning control to D4-L700. In a preferred embodiment, the comparison of user login status is performed by testing if ulstat equals ulstat-1, with a false condition causing thr and zero to be reset to values of −1.

D4-L700 tests if the threshold values for the user have changed during the cycle. If they have not, control is passed to D4-L530. In a preferred embodiment, thr and thr-1 (previous state of thr) are compared and zero and zero-1 (previous state of zero) are compared. If both comparisons indicate the values have not changed, then control is passed to D4-L530.

D4-L800 is entered if the threshold values are found to differ from previous state versions of the same threshold values. D4-L800 tests if the item price exceed the user high price threshold for the user. If so, control is passed to D4-L900. In a preferred embodiment, item price (price) has been extracted based on D4-400 and is tested against thr. If price is greater than thr, then control passes to D4-L900.

D4-L810 is entered if the comparison of the item price and user high price threshold indicates that the price is below the user high price threshold. D4-L810 then tests the item price against the user low price threshold. If the item price is above the user low price threshold, control passes to D4-910. In a preferred embodiment, D4-810 tests if price is greater than zero, with a true result passing control to •D4-L910.

D4-820 is entered if the item price is below the user low price threshold. D4-L820 updates the indicator to reflect that the item is below the low price threshold. In a preferred embodiment, the D4-L820 updates the indicator to green, which may be interpreted several ways. Green may indicate that the item has low perceived value, that the item is essentially free, or that the item has been viewed before. The color green interpretation of indicators simply represents the below threshold state and can yield to subjective interpretation. It is not the attempt of the inventors to permanently affix an indicator color to a limited single meaning.

Figure 8D:
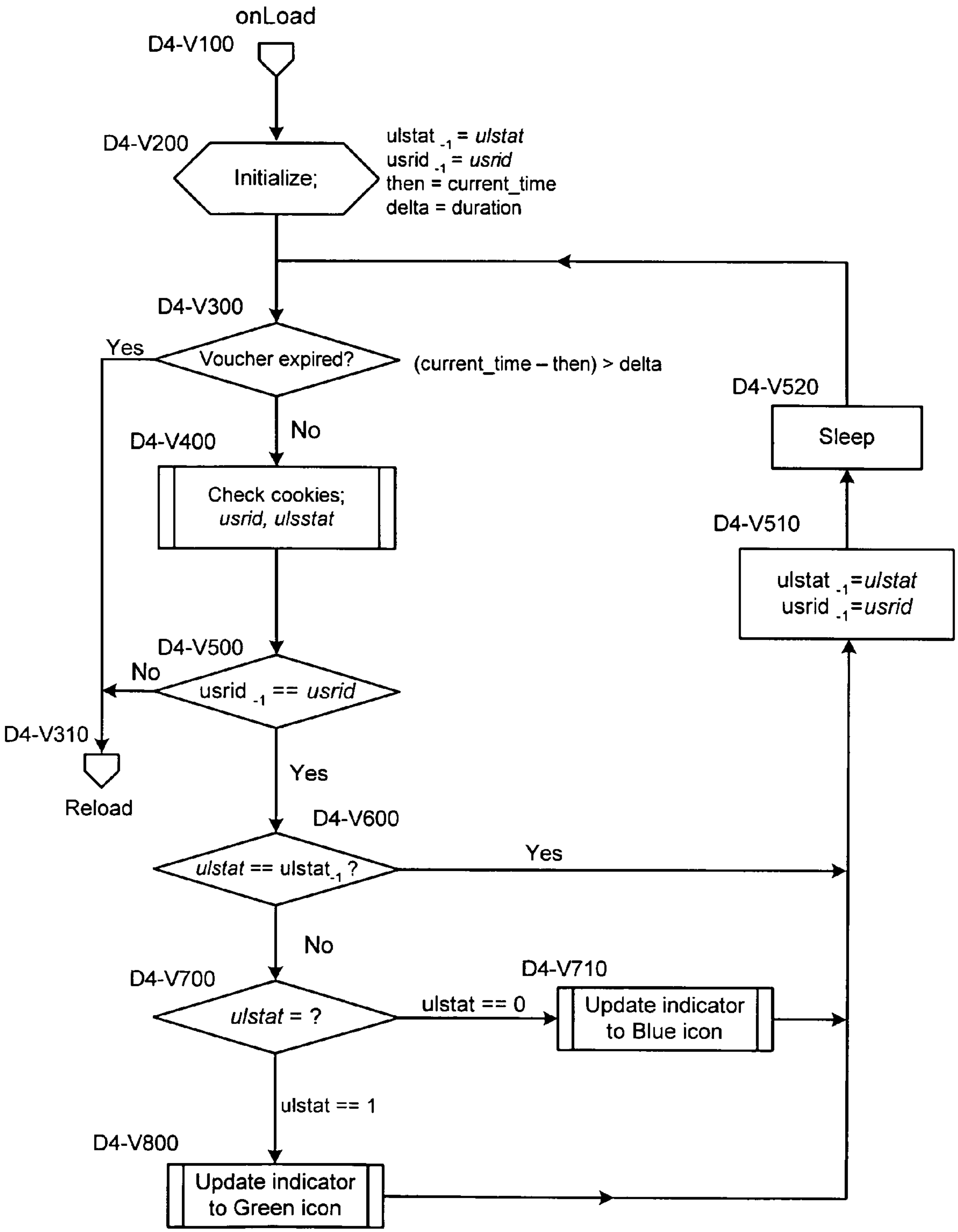
FIG. 8*d* is a flow chart of operational steps for implementing an embodiment of the present invention after a validated user was found to have a current voucher for access to the item being reviewed.

FIG. 8*d* is a flow chart of operational steps for implementing an embodiment of the present invention continuing from D4-900 after a validated user was found to have a current voucher for access to the item being reviewed.

D4-V100 represents the information load process on the computing device under the conditions satisfied for D4-900. In a preferred embodiment, D4-V100 represents an onLoad HTTP event for the dynamic indication content.

D4-V200 follows D4-V100 where state variables are initialized to enable comparisons that affect the dynamic indication mechanism. Variables include, but are not limited to user login status, user id, current time, and voucher validity period including previous state variables for each. For initialization purposes, previous state variables are assigned the same value as current state variables. In a preferred embodiment, usrid and ulstat are extracted from cookies and assigned to usrid-1 and ulstat-1, which are used to represent previous states for usrid and ulstat respectively. In practice, any variable names may be used, but should be chosen for consistency and ease of association to operational states.

D4-V300 follows initialization step D4-V200, where the voucher for access to item is tested for expiration by comparing the current time with the previous state variable for current time (then). If the then variable subtracted from current time yields a value greater than time to live (TTL) of the voucher, the voucher has expired, causing a reload D4-430.

If the voucher has not expired, then the user information is extracted from the client computing device for future testing to see if any information has changed D4-V400. In a preferred embodiment, user information is extracted from a cookie or cookies yielding usrid and ulstat.

D4-V500 tests the user information to see if the most recently extracted user ID has changed since the last test. If there has been a change, processing moves to D4-V310. In a preferred embodiment, usrid is compared to usrid-1, and if not equal, a Reload event is invoked.

D4-V600 tests the user information if there has been no change in the user ID to see if the most recently extracted user login status has changed since the last test. If there is no change, processing is moved to D4-V510, where the previous state variables are set to the current state variables before a waiting period is introduced in D4-V520. In a preferred embodiment, ulstat is tested against ulstat-1, and if equal, ulstat-1 is set to ulstat and usrid-1 is set to usrid before wait states or a Sleep period and finally a return to D4-V300.

If there has been a change in the user login status, D4-V700 is entered, where the current user login status is evaluated. If the user login status has changed to a current status of logged in, then D4-V800 where the dynamic indicator is changed to indicate logged in status. If the user login status has changed to a current status of logged out, then D4-V710 where the dynamic indicator is changed to indicate logged out status. After the indicator is changed, processing moves to D4-V510 and D4-520 respectively continue looping and waiting for additional changes.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this description.

Figure 9A:
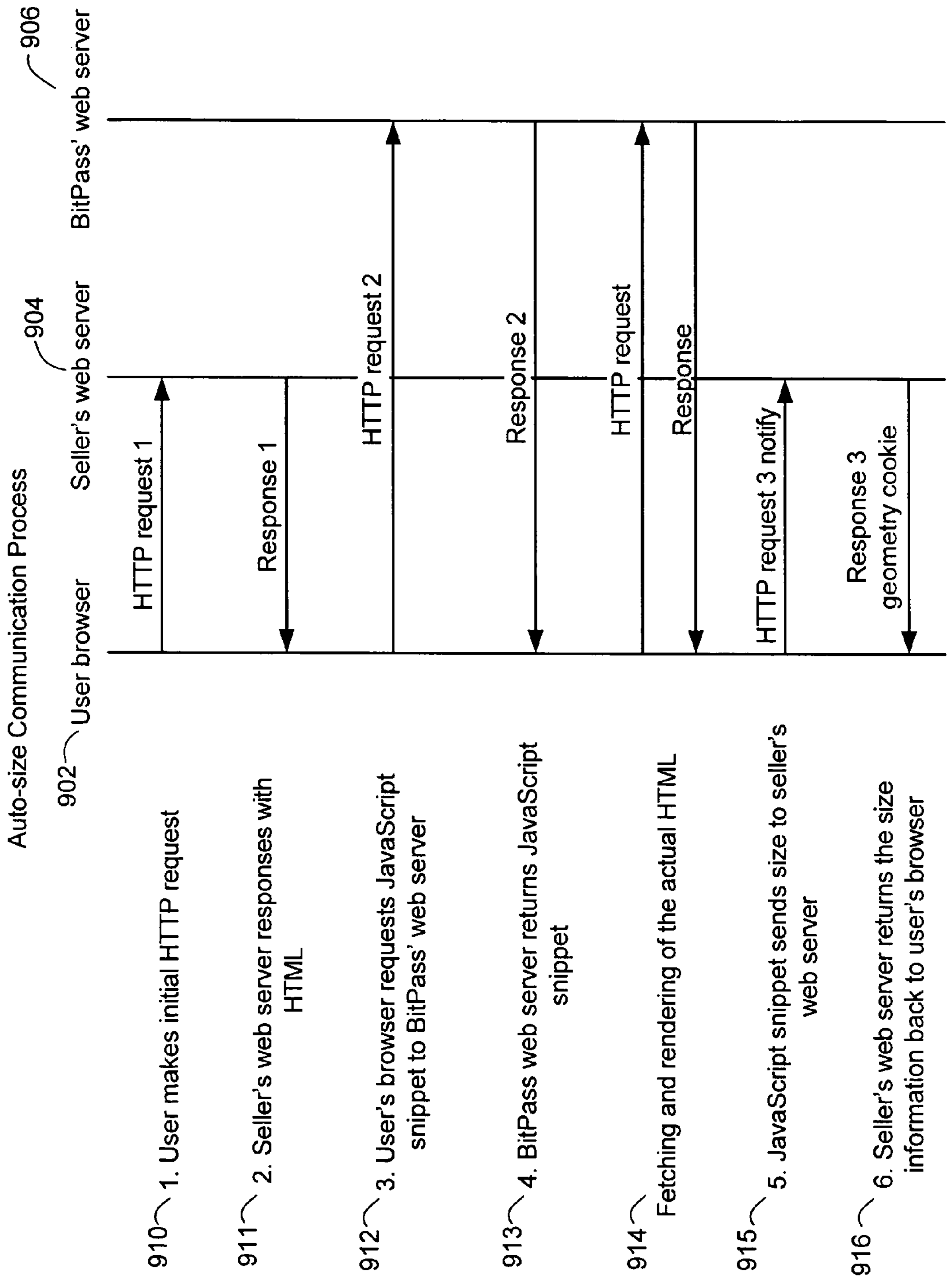
FIG. 9*a* shows an overview of steps involved in the process of auto-sizing browser content.

FIG. 9*a*: Autosize Communication Process, shows an overview of steps involved in the process of auto-sizing browser content. In the figures herein, certain visual conventions are applied to illustrate points. Highlighted text is used to draw focus to the text in the figure being discussed. Strikethrough text is used to represent code that has been expanded or replaced by the code immediately following. Indented and/or outlined text blocks preceded by text starting with "HTML:" are used to represent expanded code that replaces strikethrough text.

The auto-size concept refers to the process of attempting to automatically change the formatting of content to best fit the viewed size of a content-enabled link and dynamic indication icon, both pieces of dynamic content provided by a third party for display within the Earner's web page. The auto-size process may operate in its entirety or auto-adapt to the capabilities of the display hardware and software as permitted by auto-sensing technology used to implement it.

The steps of FIG. 9*a* show an embodiment of a process using standard web technology communicating over HTTP protocol. Messages are sent and received between a User' browser 902 on a Client machine, a Seller/Earner's web server 904, and a content web server 406 Seller/Earner's web server 904 may be implemented as a single server or multiple servers, including implementations on a web farm. Web server 906 may be implemented as a single server or multiple servers, including implementations on a web farm.

The figure shows the basic action of the process is the request 910 of a web page by the user from the Earner, causes a web page to be sent 911. The sent web page includes HTML code that requests Javascript snippets from a BitPass server 912. The returned 913 snippet fetches HTML 914 to render content provided by a BitPass server and additional requests 915 via Javascript for the Sender's web server to resize the content provided by BitPass server. The Earner's web server returns 916 a size or geometry cookie which is used in the final rendering calculations.

Figure 9B:
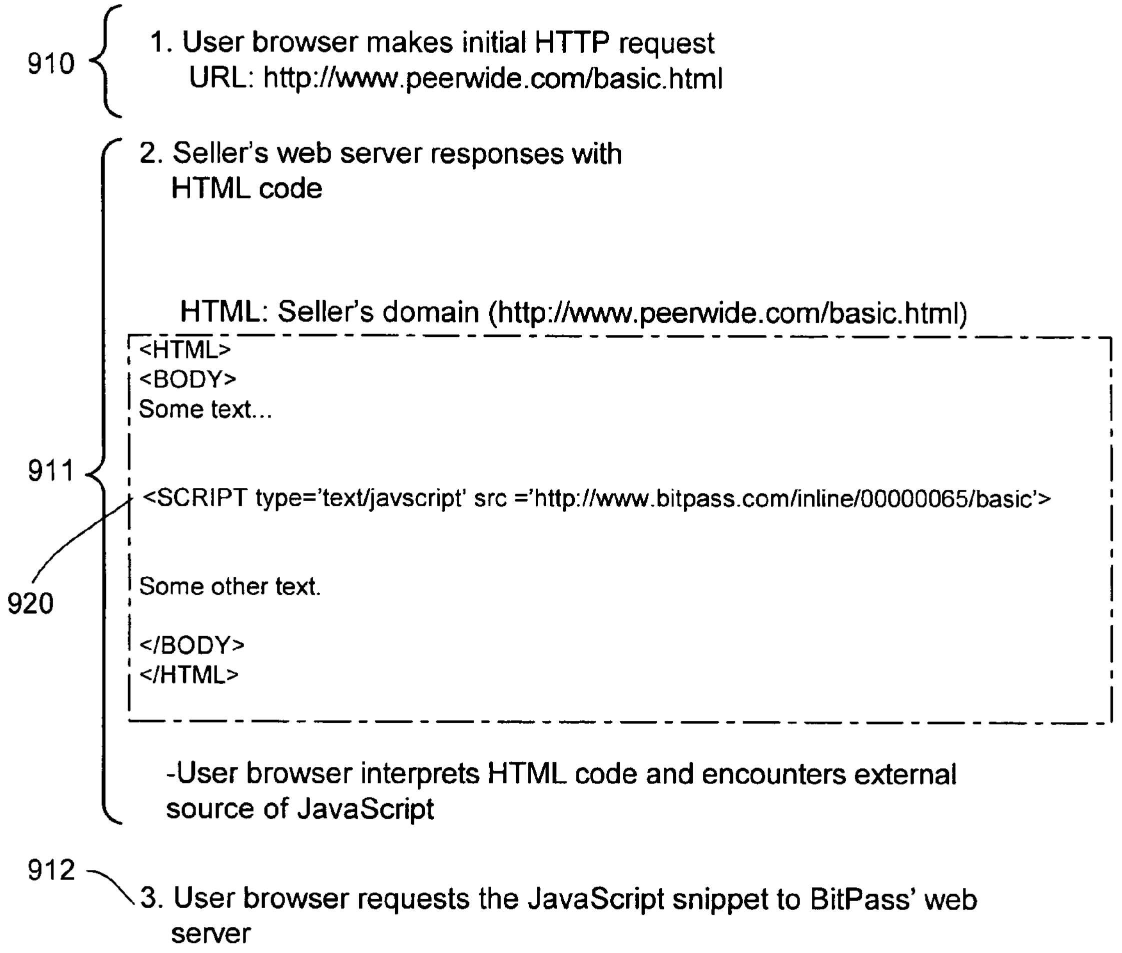
FIG. 9*b* shows example URL and HTML code that includes external Javascript that must be fetched.

FIG. 9*b*: Details of Initial auto-sizing 910/911/912 of FIG. 9*a*, shows example URL and HTML code 920 that identifies external Javascript that must be fetched.

FIGS. 9*c* and 9*d*: Details of Externally sourced Javascript from steps 913/914 of FIG. 9*a*, shows that returned Javascript is executed in the browser. In the example, the Javascript 930 reads as follows:

```
<SCRIPT type='text/javascript'
document writeln("<IFRAME name=ifrm id=ifrm                        ")
document writeln("      src='http://www.bitpass.com/inlinetag/     ")
00000065/basic/">
document writeln("</IFRAME>                                        ")
document writeln("<SCRIPT language=javascript type='text/          ")
javascript'>
document writeln("<!—                                              ")
document writeln("function update ( ) { ... };                     ")
document writeln("update( );                                       ")
document writeln("//→                                              ")
document writeln("</SCRIPT>                                        ")
document close( );
</SCRIPT>
```

FIG. 9*d* includes additional externally sourced Javascript using an I-frame (IFRAME) 932 in addition to other rendering code and Javascript functions.

FIG. 9*e* shows additional details of autosizing. The user browser 902 interprets HTML code and renders it. After rendering of HTML code completes, JavaScrtipt function notify( ) is invoked, at which point the size of HTML rendering result is known.

FIG. 9*f*: Javascript function loads another IFRAME 950, shows how the rendered HTML from the first externally sourced Javascript, loads another URL into the second IFRAME (id=ifrm2) 952 which is sourced to the Earners server, on a gateway installed there. As in earlier figures, the strikethrough text is replaced by the indented code (in the outlined text block in this case) that is sourced from the bitpass domain.

FIG. 9*g*: Response from Earner server gateway 904, shows the response from the Earner server gateway includes a cookie 960 with geometry sizing information, readable from the Earners domain. As in earlier figures, the strikethrough text is replaced by the indented code (in the outlined text block in this case) that is sourced from the bitpass domain. In this figure, there are two strikethroughs 962, 963 and two replacement text blocks 964, 965.

FIG. 9*h*: Update used to complete auto-size, shows how a Javascript function update 970 is used to resize the outer IFRAME using the geometry information in the cookie set by the Earner server 904.

Figure 9I:
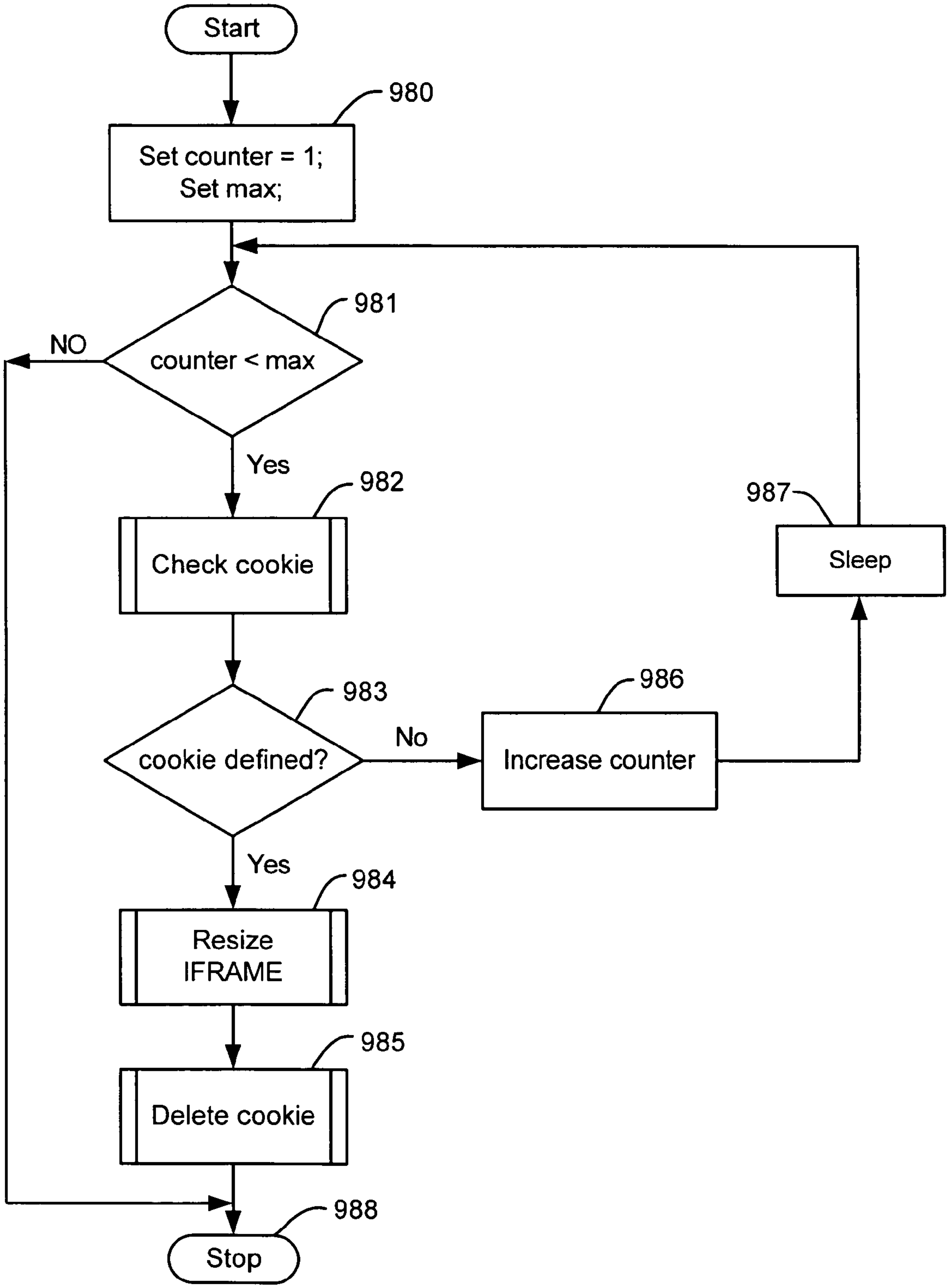
FIG. 9*i* shows an operation of a JavaScript function as it polls internally for a change of geometry cookie.

FIG. 9*i*: Update function flowchart, shows the operation of a javascript function 'update' 970 as it polls internally 982 for a change of geometry cookie. If a geometry cookie is found 983, then the function will resize the IFRAME 984, if no cookie is found, the function sleeps 987 and loops 986, until a specified number of loops 981 is reached, whereby it exits 988.

The auto-size process has been shown in an embodiment using Javascript to assist with rendering content provided by a third party. Other scripting and/or programmatic implementations may be used to provide the auto-sizing capability. In the use of standard web browser technology, the shown embodiment uses IFRAMEs to provide resizeable capability, however, the security model does not allow untrusted third parties to take control of a web page or affect overall page rendering. The introduction of a trusted third party, in the form of an Earner server gateway, provides a mechanism where information can be communicated with and utilized by the Earner's web server to dynamically interact and render third party content.

The elements of the content access distribution system in accordance with the invention can essentially be divided into three distinct components: Client component 100, distribution transaction server component 200 (also called Access Rights Transaction Server), and Earner server component 300, as illustrated in Figures.

The system allows a Spender to request and distribute access to content that he/she has deemed valuable or worth at distribution. The Client 100 typically will access content using technology known as a web browser, which has the ability to render web pages including text, graphics, and other objects or content not included under the definition of text or graphics. The Earner Server 300 refers to the logical representation of a server that contains content that the Earner sells or distributes. The Earner server 300 may reside on a physical server the Earner owns, on a content distribution network, media server, or anywhere else. The Distribution Transaction server 200 refers to the logical representation of a server that contains software: object code, executable code, binary code, etc; used to manage the distribution related transactions of the content access of the invention. The Distribution Transaction server 300 may reside on a single physical server, multiple servers, on a content distribution network, media server, or anywhere else.

Figure 10A:
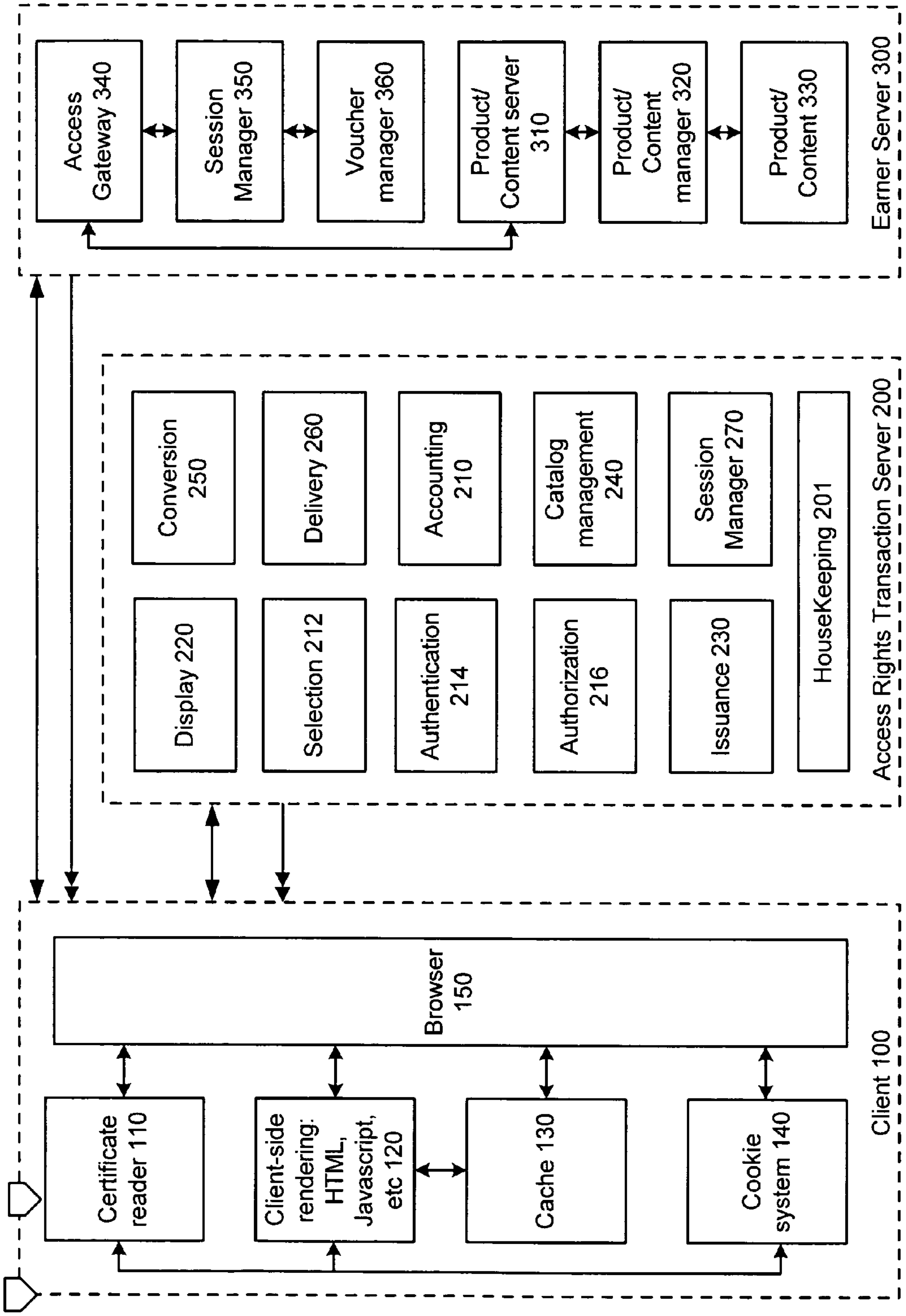
FIG. 10*a* shows three main elements in a system block diagram implementing an embodiment of the present invention.

FIG. 10*a* shows three main elements in a system block diagram implementing an embodiment of the present invention. The Client 100 contains several components including a browser or display interface 150, a certificate or security subsystem 110, a client-side rendering module 120 for enabling the display of such things as HTML, JavaScript, VBScript, or others not specifically mentioned, a caching mechanism 130 (optional), and a cookie or local storage based tracking mechanism 140. In the described embodiment of the invention, certificate reader 110 provides a mechanism for ensuring and managing secure communication between the Client 100 and other elements not of the Client 100 classification. Client side rendering 120 provides an internal module to render or prepare for display the data, which is presented through 150. Cache 130 provides typical caching properties, which may speed up the operation of data access capabilities of the Client 100. Cookie System 140 provides a local storage mechanism, temporary or permanent, that can be used or facilitate communication with or track general or specific actions of the Client 100, acting independent of or in conjunction with certificate reader 110.

The Access Rights Transaction server 200 contains several components including a display and geometry calculation engine 220, an item selection processing module 212, an authentication module 214, and authorization module 216, an access rights issuance module 230, an access rights conversion module 250, an access rights for content delivery module 260, a general system accounting module 210, a catalog management module 240, a session management module 270, and general housekeeping module 201 for operations not performed by the other modules but still required by the invention. The modules interact with each other and with external modules of other elements in the invention and the functions are more specifically described in other figures.

The Earner server 300 contains several components including an Access Rights Gateway 340, a session manager 350, a voucher manager 360, a product/item server 310, a product/item manager 320, and a product/item system 330. Access gateway 340 enables the validation and issuance of approved access rights leading to the delivery of an item to the user. Session manager 350 manages session information for an embodiment of the present invention to track validity and timeliness of the sessions and access to the system or items. Voucher manager 360 works with session manager 350 in the validation of vouchers in the invention as well as the issuance and validation of item passes before item delivery. Product/Content server 310 manages the serving function, handling the handshaking and administrative tasks involved in the serving of the item. Product/Content manager 320 typically works at lower level than Product/Content server 310 managing specific items or structures of items including directories or other organization systems. Product/Content manager 320 represents the items themselves, either physically, logically, addressed or some other mechanism allowing the items to be delivered directly or indirectly. The modules interact with each other and with external modules of other elements in the invention and the functions are more specifically described in other figures.

Figure 10B:
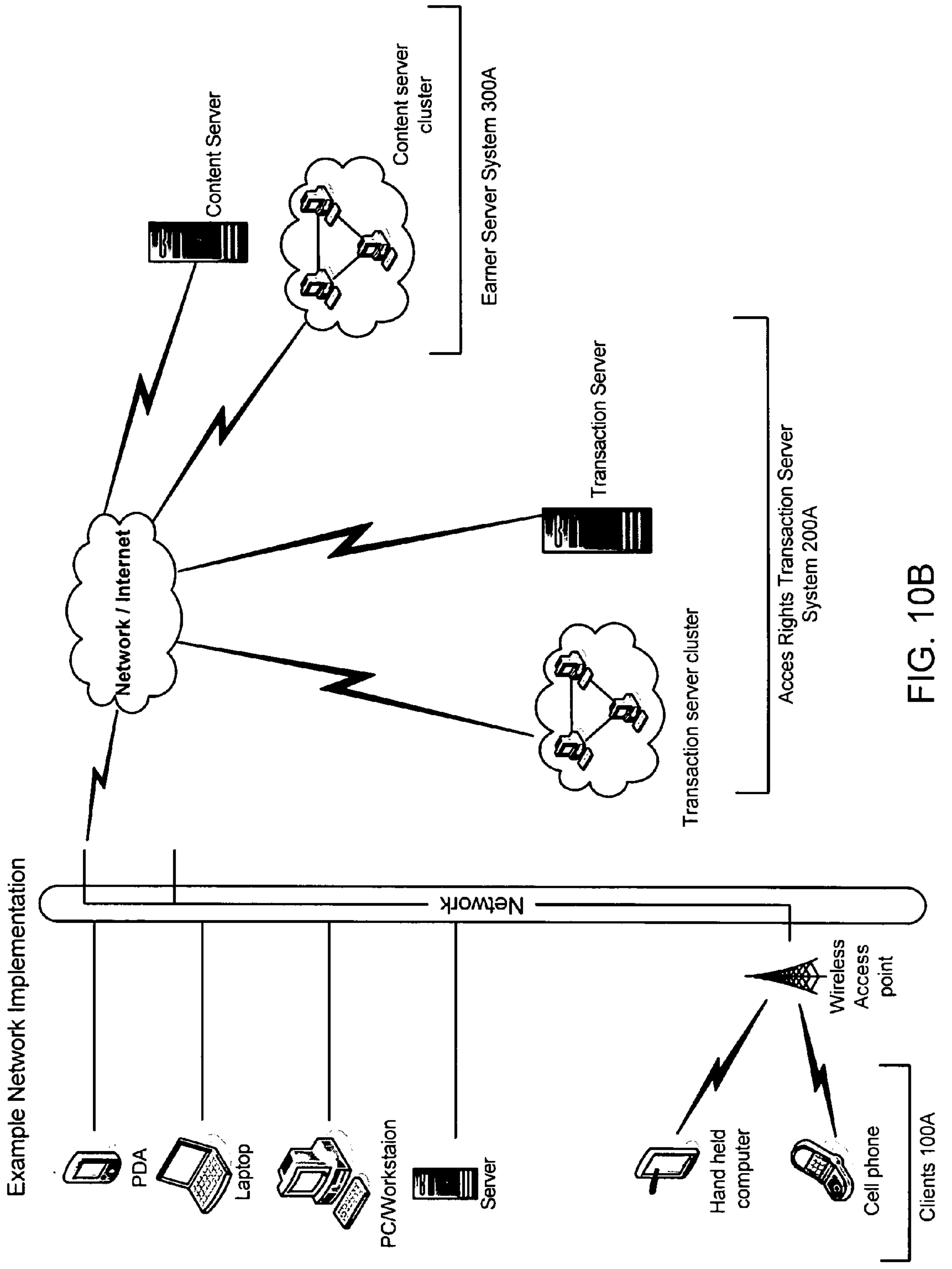
FIG. 10*b* shows three main elements at the system level in an network environment used by an embodiment of the present invention.

FIG. 10*b* shows three main elements at the system level in a possible network environment. Clients 100A in a preferred embodiment include web browsers on computing devices connected through wired and wireless networks to the other elements. Access Rights Transaction server 200A can reside on one or more servers including a server cluster and are connected to the other elements of the content access and distribution system through wired or wireless networks. Earner server system 300A can reside on one or more servers including a server cluster and are connected to the other elements of the access rights and distribution system through wired or wireless networks.

Figure 10C:
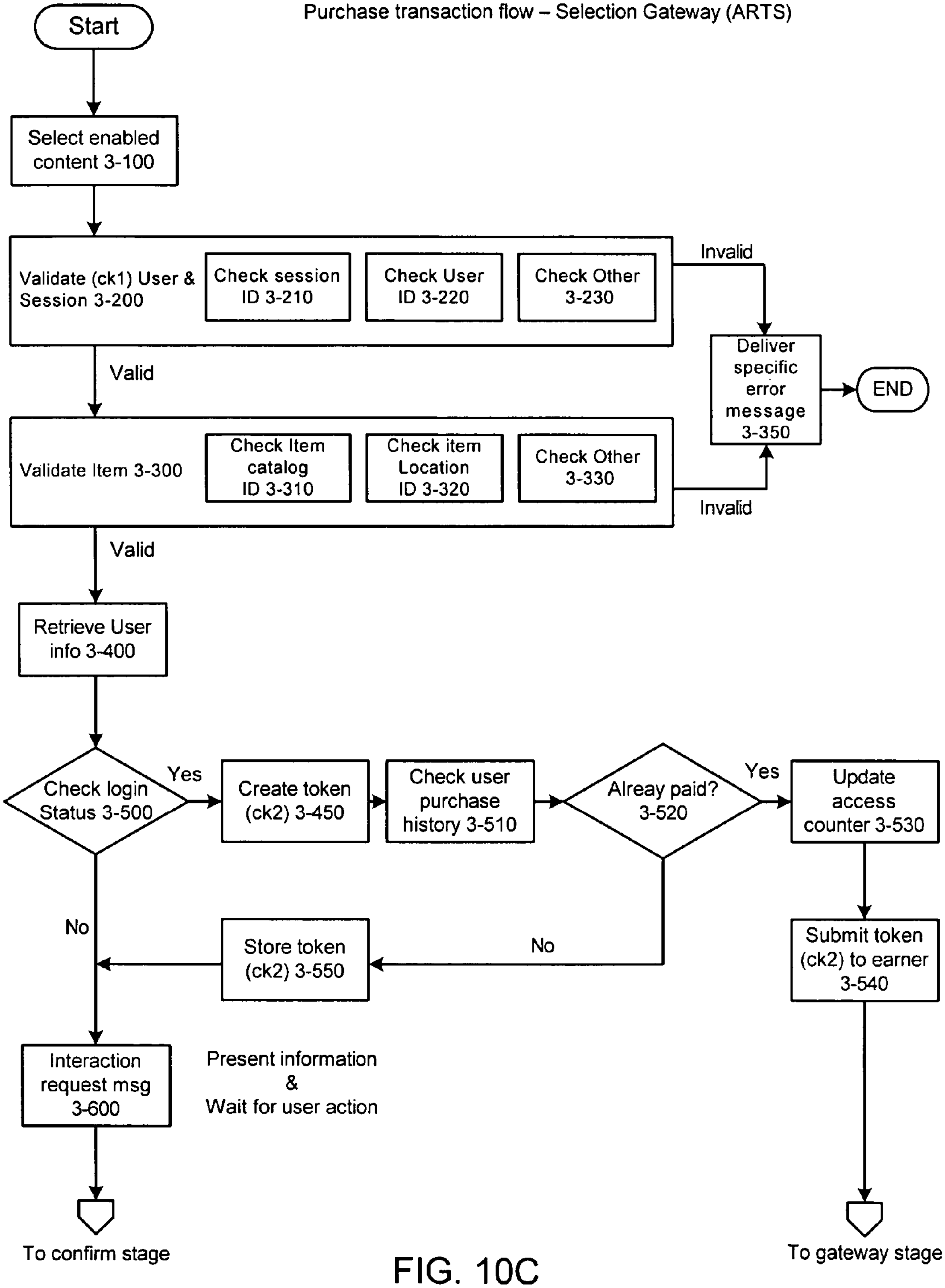
FIGS. 10*c* and 10*g* are flow charts of operational steps for implementing an embodiment of the present invention focusing on the processes of authentication, authorization, and issuance.
Figure 10D:
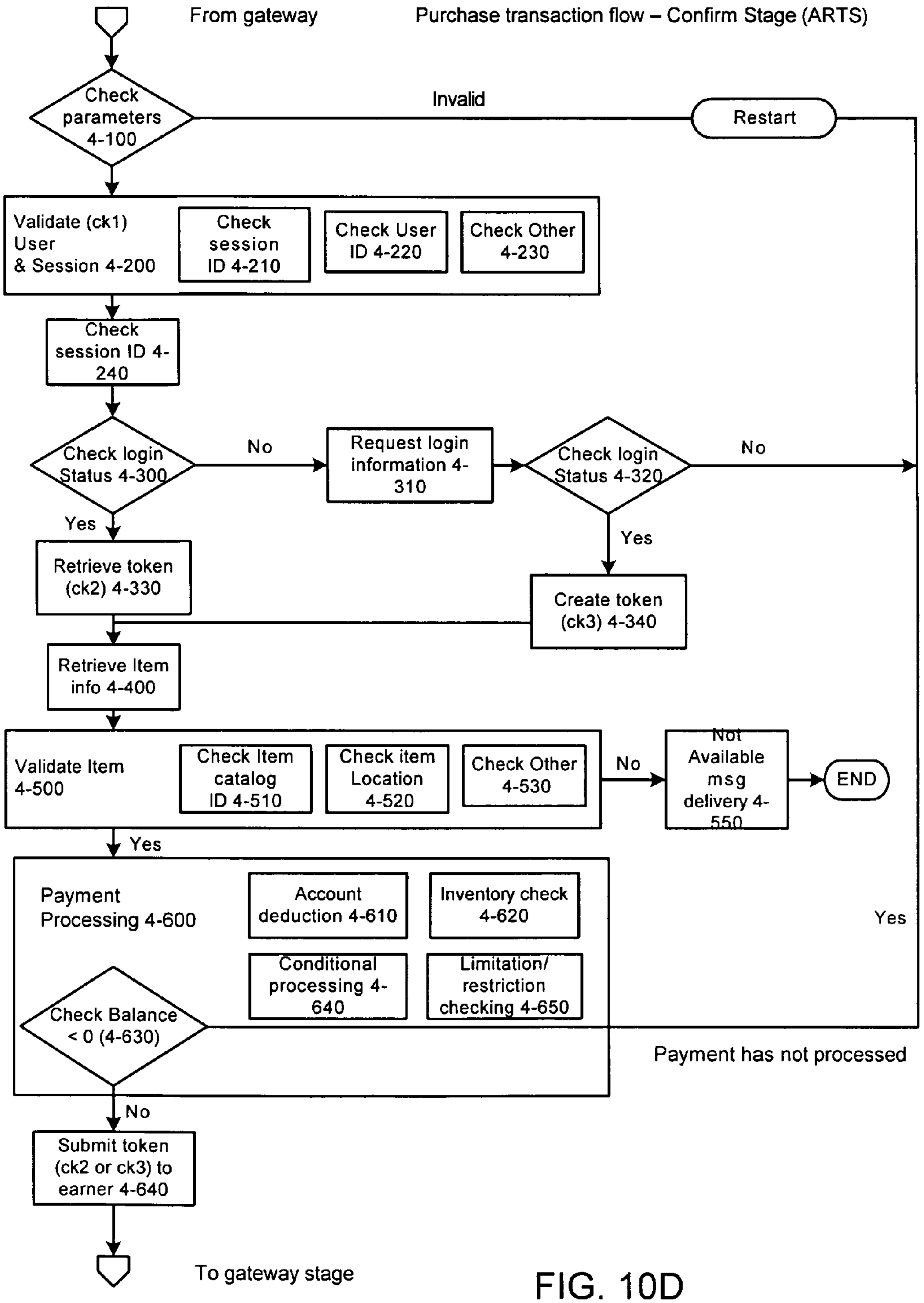
FIGS. 10*d* and 10*h* are flow charts that is entered from FIG. 10*c* when the user ID is not logged in or the item has not been purchased (purchase is not valid).
Figure 10E:
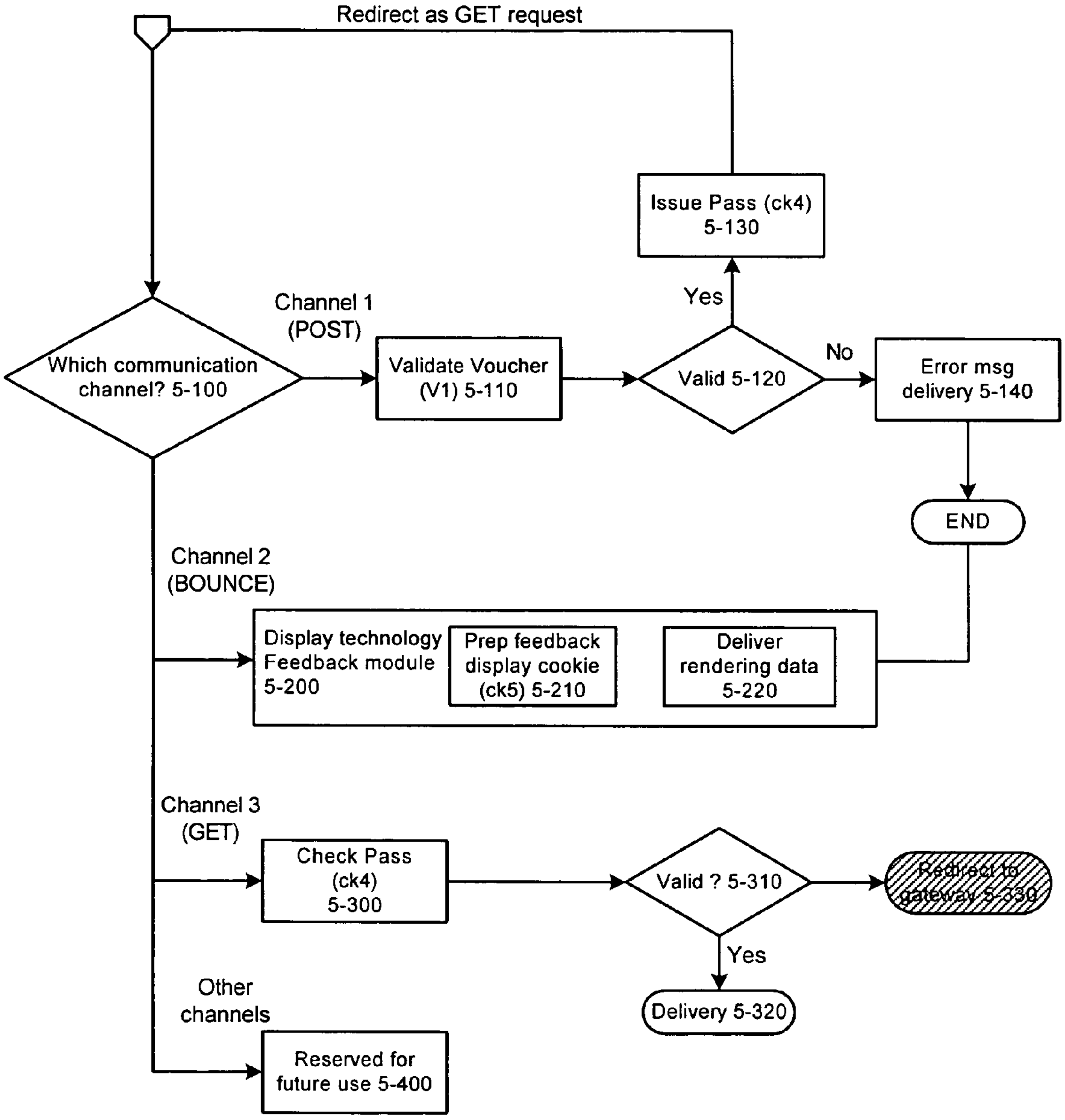
FIGS. 10*e* and 10*i* are flow charts entered from Figure when a token was issued as a voucher for the item.
Figure 10F:
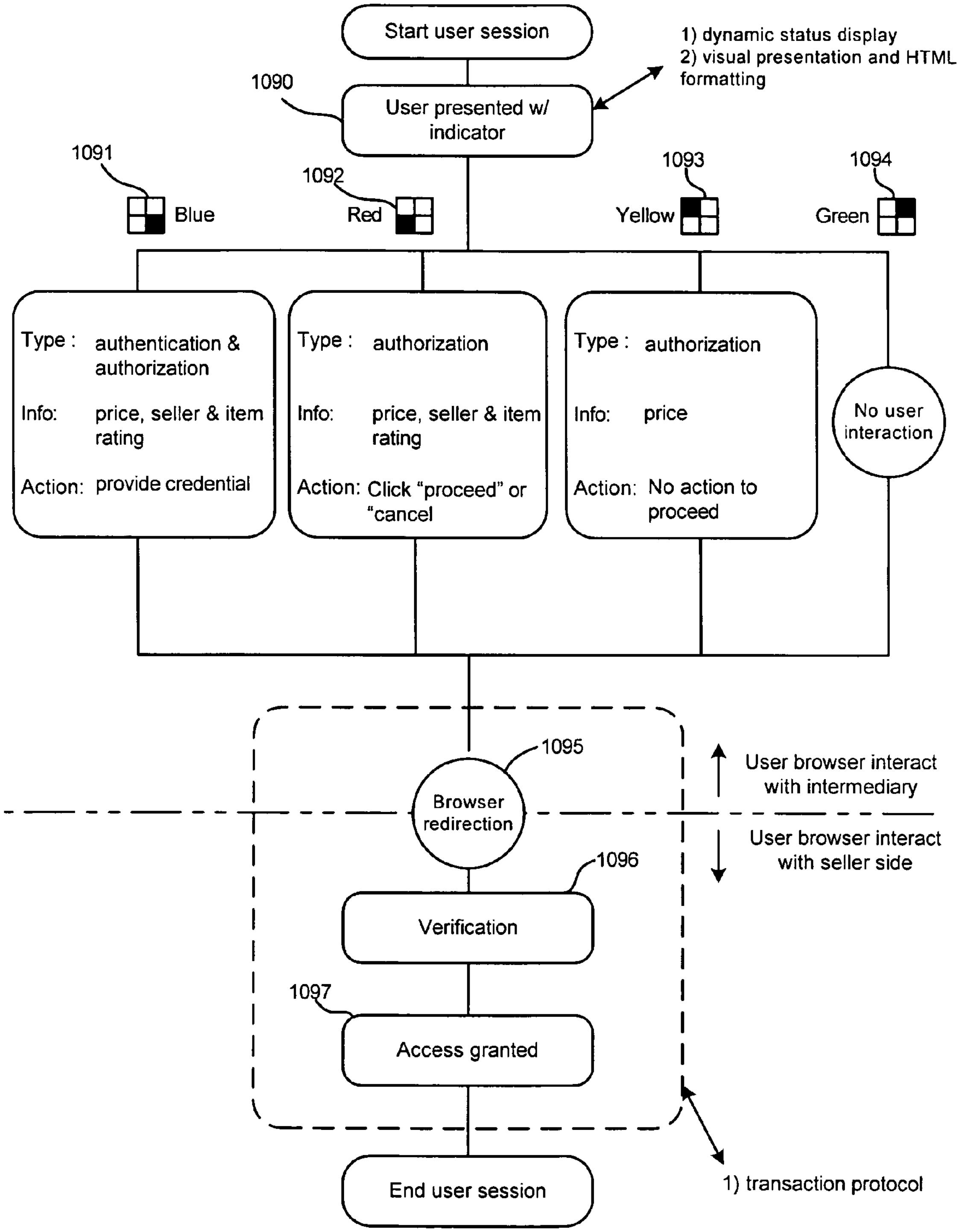
FIG. 10*f* is a flow chart showing examples of indicators having colors associated with access to web-based content.
Figure 10G:
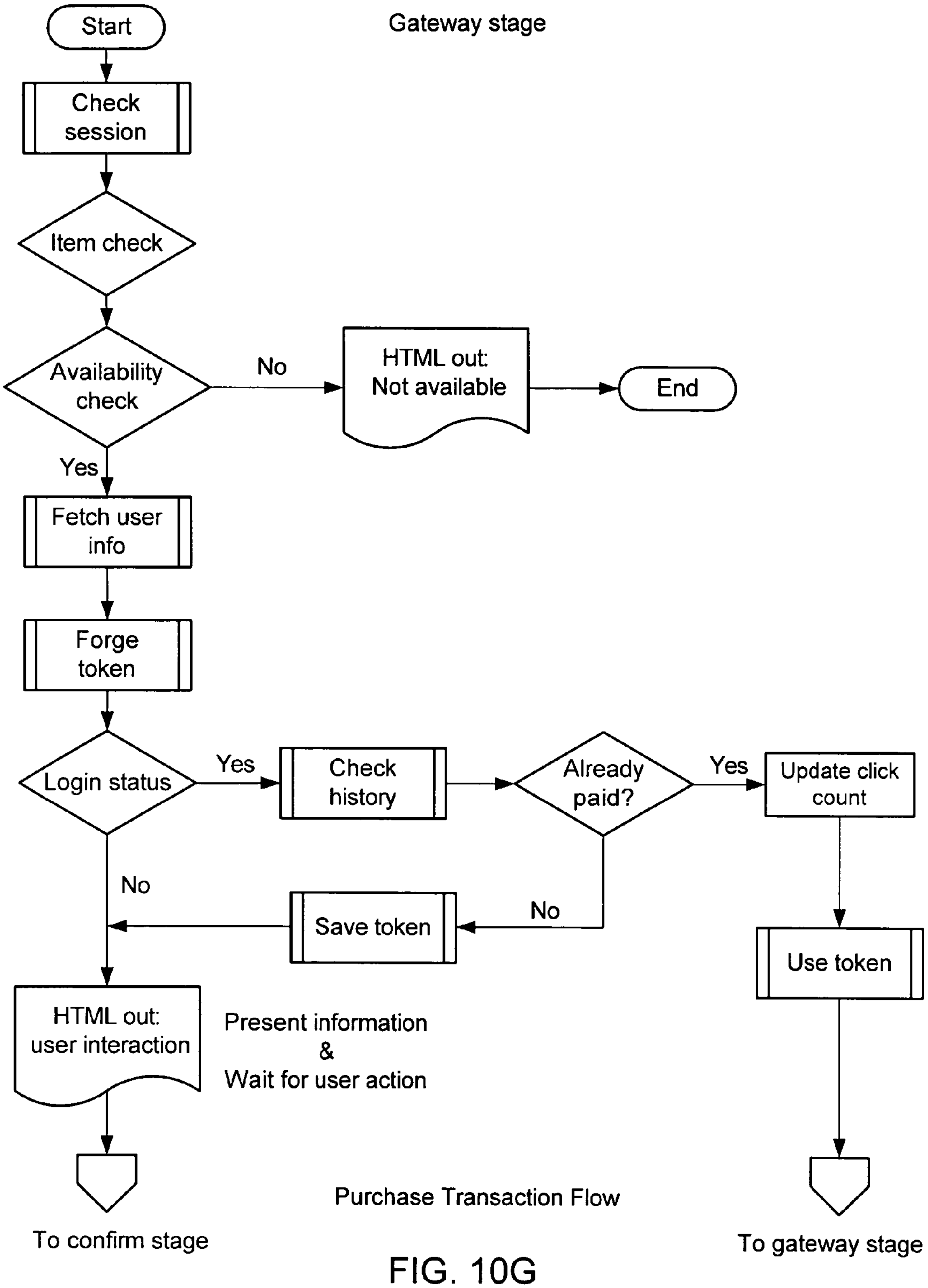

FIGS. 10*c* and 10*g* are flow charts of operational steps for implementing an embodiment of the present invention focusing on the processes of authentication, authorization, and issuance. FIG. 10*c* begins with a user viewing displayed information with a link enabled through an embodiment of the present invention by the establishment of a purchase flow where a link provides access to information or more specific to the invention, access rights purchasing capability. This user selects 3-100 the enabled link, which begins the process of FIG. 10*c*. The link selection makes information available to the ARTS (Access Rights Transaction Server) including session information (Ck1) and item information. This information can be made available by embedding it into the link or through a browser cookie or other tracking or storage mechanism. ARTS takes Ck1 and enters a validation step 3-200, where the several checks are performed. These include 3-210 session ID verification to validate that the session exists, 3-220 user ID to validate that the user of the session exists, and other checks 3-230 as necessary to validate other information provided through the link independently or in combination with other information. Another check 3-310 item ID verification is performed to validate that the item exists in the item catalog, 3-320 user ID to validate that the user of the session exists, and other checks 3-330 as necessary to validate other information provided through the link independently or in combination with other information. Invalid results from the validation check independently or in combination causes an error notification 3-350 and an exit.

Successful validation leads to 3-400. From Ck1, the session ID is used to associate a handle to a user and user ID. The user ID is then checked by ARTS to determine if the user is logged into the system 3-500. A logged in user ID leads to 3-450, where Ck2 is created. Ck2 is a token representing the selected item, including item information such as item ID, token ID, item location or path to a file location (URL). In 3-510, the user ID is used to compare the item ID to the purchase history of the user ID, whereby the item can be identified as a fully purchased item, conditionally purchased item, or other purchase status. If the item has been purchased and the purchase is still valid 3-520, ARTS increments internal counters for content access (number of visits) or related accounting information 3-530 before the token is issued to the earner server for earner server gateway processing 3-540. If the item has not been purchased or the purchase is not valid, the token Ck2 is saved for later use.

Figure 10H:
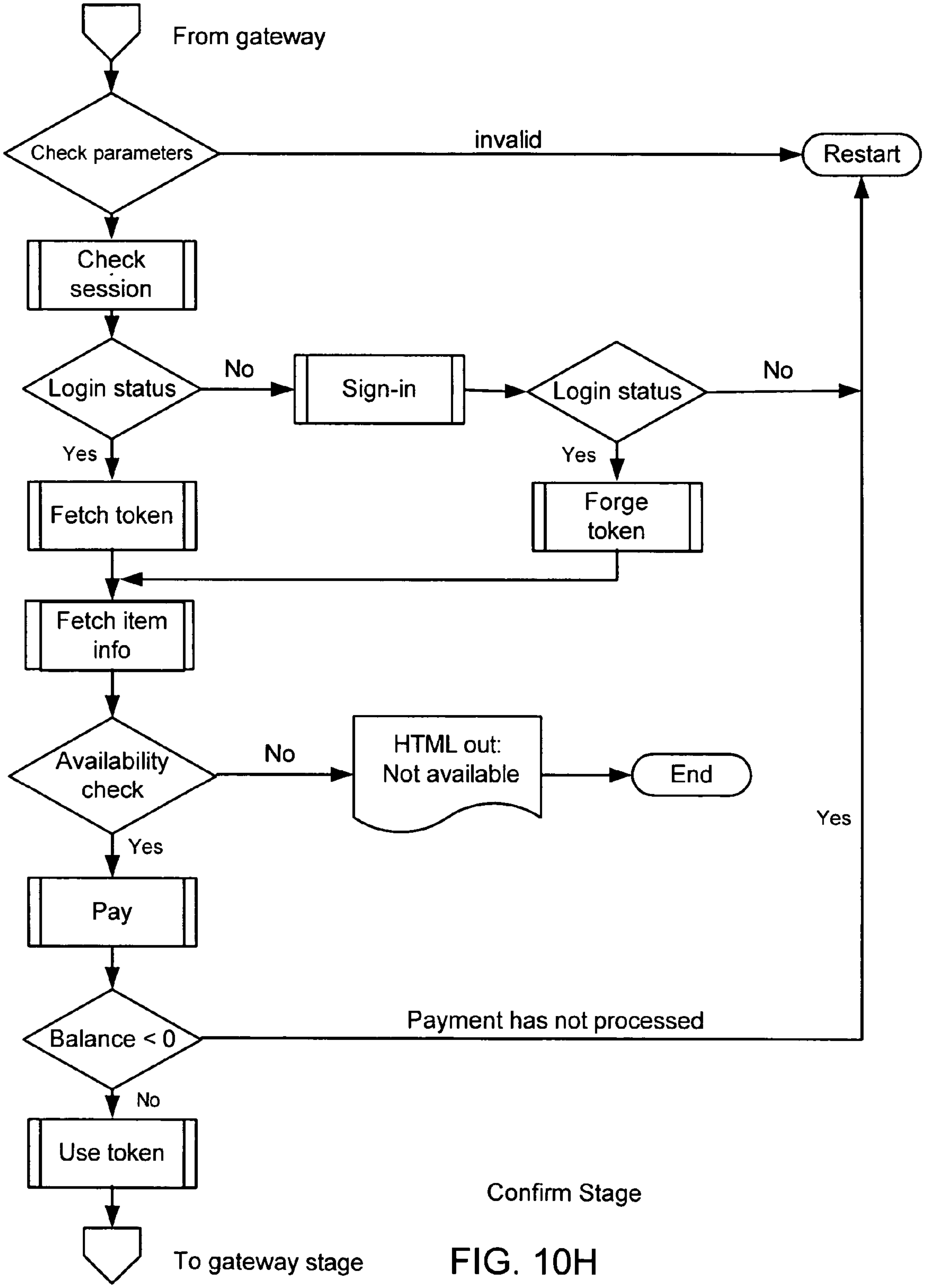

3-600 is reached if the user ID is not logged on, the item has not been paid for, or if ARTS determines other information needs to be presented. The user may be presented with a login request, purchase confirmation, item status, or other information. The user response and additional parameters are then processed by ARTS in FIG. 10*d*, the ARTS confirmation stage. FIGS. 10*d* and 10*h* are flow charts that is entered from FIG. 10*c* when the user ID is not logged in or the item has not been purchased (purchase is not valid). This stage provides repeated authentication and authorization before allowing a purchase to enter the conversion and delivery phase of FIG. 10*e*. 4-100 verifies the parameters passed into the confirmation stage, where the item ID is checked again. Invalid parameters take the user out of the transaction-processing loop.

4-200 performs repeated validation of the Ck1 to insure the user 4-210, session 4-220, and other information 4-230 exists and/or is current. Invalid Ck1 causes an exit from the transaction processing. User ID is extracted from Ck1 4-240 and the login status is checked 4-300. If the user ID login is valid, the token Ck2 from FIG. 10*c* is retrieved. If the login is not valid, 4-310 requests login information. Login verification 4-2[1]30 here failure leads to an exit, while success causes a new token to be created Ck3 in 4-430.

Based on the item ID validated in 4-100, 4-400 retrieves additional item information. 4-500 validates the item, performing checks on catalog ID 4-510, location information 4-520, and/or other information 4-530 as necessary. Any invalid condition causes an exit where 4-550 sends a message regarding Item's unavailable status. Valid item status then allows payment processing to occur 4-600.

4-600 includes several check and confirmations, the most fundamental is balance checking 4-630. In 4-630, an attempted balance deduction on the user's account is tested to check the remaining balance. A negative balance returns a failure condition. Other accounting checks are included, but are not limited to account deduction flags 4-610, limitation/restriction checking 4-650, conditional processing 4-640, inventory checks 4-620, and more. Any failure or negative conditions will rollback any attempted deductions for purchasing the item (payment has not been processed), causing an exit. Payment process and checking as listed above does not require specific ordering as any failure or negative condition causes the payment process to stop and roll-back to the payment not processed state. Specific ordering of the function in 4-600 can be modified based on sub-function condition analysis, where the conditional processing module 4-640 may be found to catch the most failure conditions. In such a case, 4-640 may be positioned as the first step in 4-600. Thus, the functional implementation of 4-600 and its sub-functions are recognized as optimizeable functions whose order may be modified as necessary.

If payment processing is approved, token Ck2 or Ck3, depending on results of 4-300 through 4-340 can be provided to the client to be submitted by the client to the earner server for gateway processing 4-640. At this stage, the token Ck2 or Ck3 has become a voucher (V1) for accessing the item.

Figure 10I:
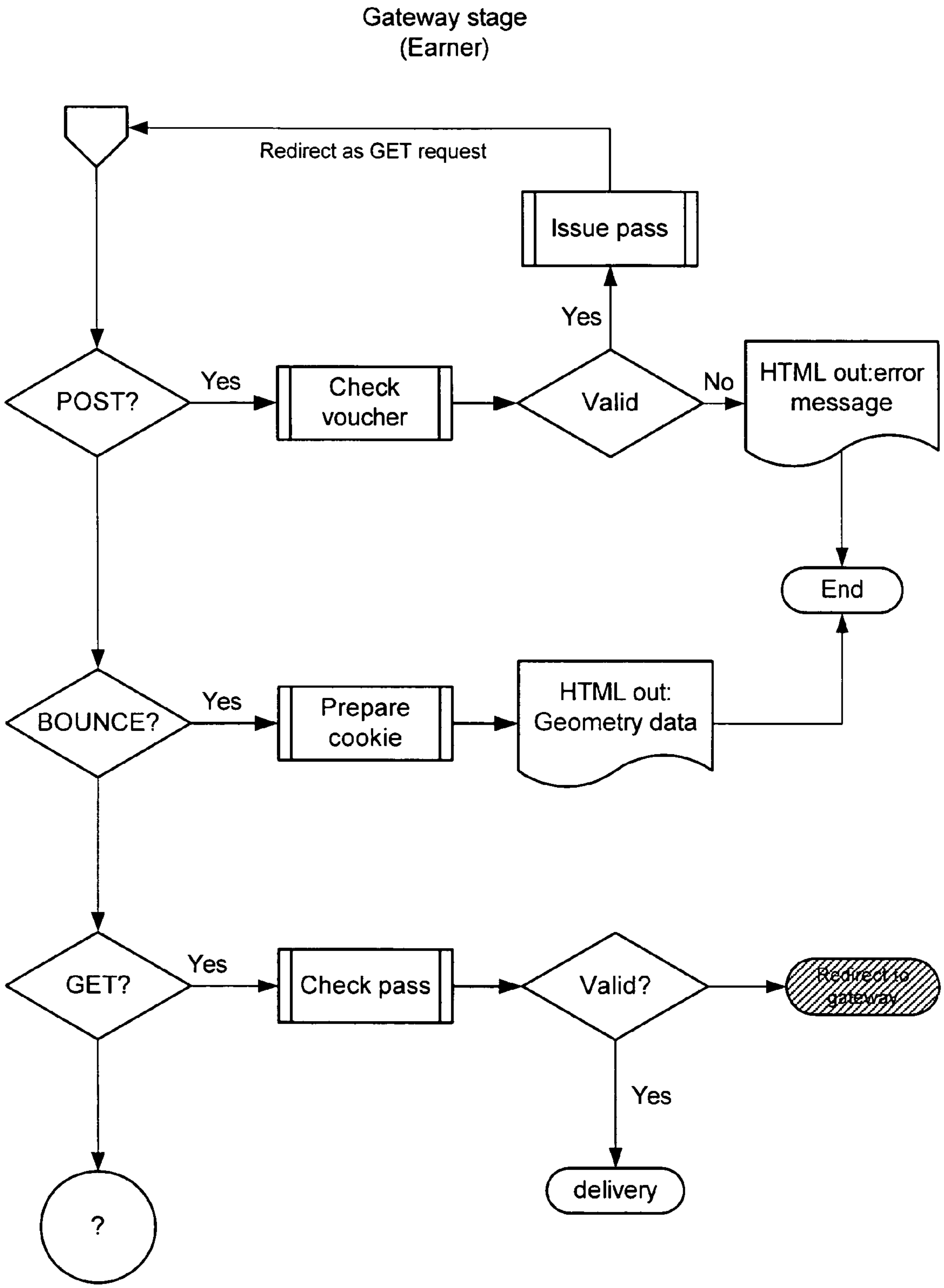
Figure 10J:
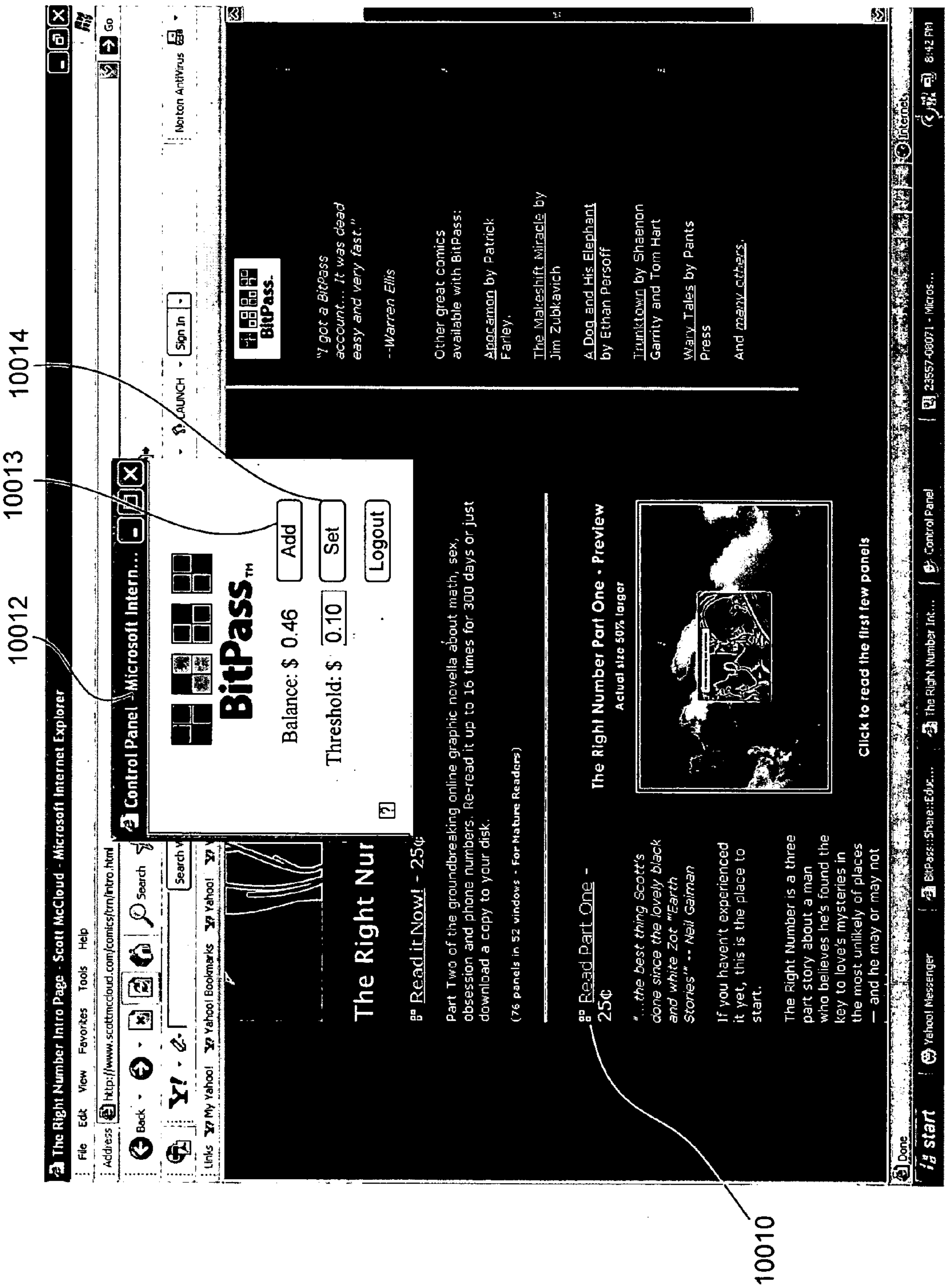
FIG. 10*j* is an example of a user interface displayed when a potential spender clicks on an icon associated with content that costs less than his threshold.
Figure 10K:
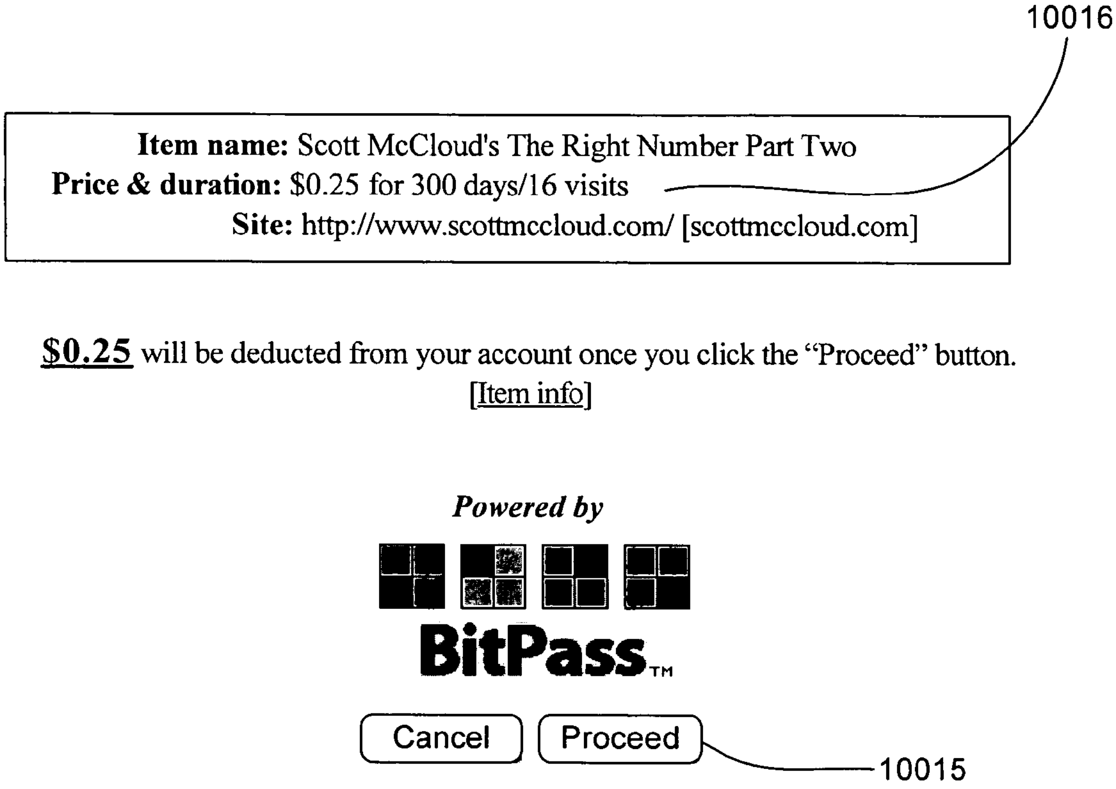
FIG. 10*k* is an example of a user interface displayed when a Spender buys web-based content.

FIGS. 10*e* and 10*i* are flow charts entered from Figure when a token was issued as a voucher for the item. This stage primarily provides issuance, conversion, and delivery steps in processing the request to access an item and the actions our at the earner server element, with most activity in the gateway module therein. The earner server 300 from FIG. 10*a* listens on predetermined channel modalities for processing of transactions for items. Theses channel modalities can take many forms including but not limited multiple protocols, multiple command (and subcommands) within a protocol, physically different communications media, singular media or mechanism with modulated communication, or a combination of two or more communication mechanism stated above or mechanisms suggested or implied thought not explicitly mentioned. For purposes of clarifying the process, one example of channel modality will be used, where the channels are based on web browser technology, including GET, POST, and other HTTP requests, however this is not intended to represent the only implementation of said channels.

One of the useful properties of a described embodiment of the transaction protocol is that the URL of the page delivered after the final step of the protocol is a URL that is uncluttered by a complicated query string. All purchasers of access to the same premium content will see the same final premium content URL. Unlike URLs that contain query strings that contain historical information, such as session ID information or user ID information, the target premium URLs arrived at n the BitPass transaction protocol are the same.

Voucher information is not passed in the URL as a query string, but rather passed through a parallel channel, either POST or via the referrer field.

These URLs have several advantages:

1) They tend to be shorter and hence more readable
2) They can be copy and pasted into weblogs or other web pages online and be easily indexed by search engines such as Google, which compute the PageRanks of URLs. URLs that are unique, such as those produced by users copying and pasting URLs from Amazon.com, have no chance of accumulating any PageRank. Having target URLs for premium content that are the same no matter who buys access to them, enables search engines such as Google to compute PageRanks for premium content URLs even when those search engines and their robots do not have access to the actual content of the premium URL.

5-100 processes the communication from the client browser by looking for accepted channels of communication for determining appropriate action by the earner server gateway. In a preferred embodiment of the invention, the POST request represents a channel (Chi). If 5-100 determines the channel to be a POST request, 5-110 comes into play, extracting the voucher (V1) contents and verifying compliant content and structure. 5-120 can then validate V1 causing an error message 5-140 if invalid, or conduct further processing: A valid V1 is then converted into a pass Ck4 5-130, which is used for easier processing of the item when appropriate.

In a preferred embodiment of the invention, V1 is submitted to the earner server gateway via POST in an HTTP form with specific content to identify the user and item: target path, query string, time stamp, origination IP address, proxy IP address (if any), expiration time, version, earn id and a unique string, etc are unique in a one time POST (V1 is used only once and valid only once). Likewise, the Pass literally is a cookie, partially constructed from the contents of the voucher with additional information and an authentication hash. The cookie allows for weak verification of the user and for multiple connections via HTTP, however the cookie has a limited life and cannot exist if a voucher hasn't been issued. In a preferred embodiment, the Ck4 cookie facilitates reduced serial transactions and negotiations to access or download content. Specifically, the cookie allows for multiple simultaneous connections linking the purchaser to the item or item directory as indicated in the item catalog, as it contains information such as target URL, IP address, proxy information, expiration date, authentication hash, and other information as needed for security or identification. This cookie is then issued to the browser in a redirect using a GET request.

5-100 then sees the GET request as another channel (Ch3), and as before, new channel invokes new behavior. 5-300 is invoked, where content and structure of the pass is extracted for evaluation. 5-310 verifies the validity of Ck4, where invalid conditions cause a redirection back to ARTS. Verified Ck4 causes the earner server gateway module to authorize delivery of the item.

5-200 is invoked if 5-100 sees a BOUNCE request. In a preferred embodiment, this represents another channel (Ch2) with a resulting set of behaviors from the earner server gateway. These specific behaviors are covered in another document and are covered under separate intellectual property.

5-400 is invoked if 5-100 sees other commands not mentioned heretofore. 5-400 is reserved for future communication and can further address additional channels or be used specifically as a channel (Ch4). In such a case, it can be used as a catchall channel to process other information not delivered via the other channels. If necessary, 5-400 could be used to process communication including multiple separate commands or series of commands depending on the structure, source, or content of the communication.

FIG. 10*f* is a flow chart showing examples of indicators having colors associated with items of web-based content. A colored icon on a content-enabled page gives a potential spender an indication of his ability to purchase the associated item. In some embodiments, clicking on an icon of any color will take you to the BitPass Control Panel which allows you to log in.

Blue—Indicates that he has not logged in. The item is premium and the user must log in and pay before buying the item.

Yellow—Indicates that he is logged in and the price of the item is below his purchase threshold.

Red—Indicates that he is logged in, but the price of the item is above his purchase threshold.

Green—Indicates that he is logged in, has already bought the item, and still has permission to access the premium content.

It is important to understand that two potential spenders, presented with the same item of web-based content could possibly see different indicators associated with the web-based content depending whether they are logged on, how much money is in their accounts, and what their threshold value is.

A the potential spender ("a user") sees a first color of indicator (for example, blue) 1091 associated with an item of web-based content, the user's browser interacts with an intermediary such as a web-based access server, to decide whether the user has access to the content. Here, color 1091 indicates premium content and lack of log-in. The access server checks whether the user is authenticated (i.e., he is who he says he is) and whether the user is authorized to access premium content.

If the potential spender ("a user") sees a second color of indicator (for example, red) 1092 associated with an item of web-based content, the user's browser interacts with an intermediary such as a web-based access server, to decide whether the user is authorized to access premium content. It looks at the item's price, the seller's settings of threshold, and the user's account value.

If the potential spender ("a user") sees a third color of indicator (for example, yellow) 1093 associated with an item of web-based content, the user's browser interacts with an intermediary such as a web-based access server, to decide whether the user has access to the content. Here, color 1091 indicates premium content and the access server checks whether the user is authenticated (i.e., he is who he says he is) and whether the user is authorized to access premium content.

FIG. **10*j* is an example of a user interface displayed when a potential spender clicks on an icon 10010 associated with content that costs more than his threshold. Here, the icon 10010 is red because the item costs twenty five cents and the threshold is ten cents. The user has forty six cents in his account. The user may add money to his account through the 1013 "Add" button. Clicking on the Add button causes and adding money to the user's account changes a stored value representing an amount of money in his account. The user can change his threshold by typing in a new threshold value and clicking on the "Set" button 10014**. Changing the threshold value changes a value associated with the user in a memory of a data processor.

FIG. **10*k* is an example of a user interface displayed when a Spender buys web-based content by clicking on Proceed button 10015. In this example, the user has increased his threshold to twenty five cents or more and the icon 10010 associated with the content is changed to yellow (indicating that the item's cost was under the user's threshold). The user will now be able to access the content for 30 days (in this example) 10016**. The described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this description.

Additional Discussion of Technology Implementation:

There are a couple of cookies involved in the dynamic indicator interaction and earner gateway ($^G/_W$).

The cookies for the dynamic indicators preferably have no structure. They are just simple variables. E.g. Cookie for the spender balances info is named "bal" and has the balance as value.

"bal", "thr", "zero", "usrid", "ulstat" are the cookies of this kind They are scoped to be readable by any URL on, for example, a bitpass.com domain.

The cookies for the pass (which is simplified version of voucher) have some structure. And they are scoped to a specific path owned by the server, as well.

In the following paragraphs, the voucher is discussed first: "Voucher" is basically name/value pairs, encoded as application/x-www-form--urlencoded MIME type and posted to the earner gateway.

Here is the name/value pair table.

| Name | Value | Type/syntax | |
|---|---|---|---|
| version | Version | float | 1.0 |
| pubid | Earner id | unsigned int | Internal id |
| i_id | Item id | unsigned int | Internal id |
| cpath | Content path | String | Unix path |
| qstr | Query string | String | URI query string |
| passexp | Pass cookie expiration time | unsigned int | Seconds |
| uniq_id | Submission unique id | Hex string | 32char. 128 bit |
| c time | Voucher generation time | unsigned int | Unix time stamp |
| ip | IP address | xxx.xxx.xxx.xxx | IPv4 address |
| proxy | Proxy IP address | xxx.xxx.xxx.xxx | IPv4 address |
| mode | Mode | String | "test" or "live" |
| expires | Expiration date | unsigned int | Seconds |
| hash | MD5 hash | Hex string | 32char. 128 bit * |
| voucher | RSA signature | Base64 encoded string | ** |
| VID | Voucher unique id | Hex string | 32char. 128bit |
| VISIT | Number of visit | unsigned int | Unsigned int |

*hash: hash of selected values

**voucher: RSA signature of hash. Encode using BASE64 scheme.

The pass cookie is a simplified version of voucher.

Each cookie preferably has six properties associated to it.

1) Name
2) Value
3) TTL (time-to-live)
4) Path
5) Domain
6) SSL flag.

1) The conversion of voucher into the cookie distributes the entries inside of the voucher to these six properties. Other embodiments do not contain or use some of these fields (for example some do not include an SSL flag). Name: in some versions of a gateway, same name is used over and over again. But some versions of a gateway use unique name for each path. This is entirely due to the capabilities of the language/library being used.
2) Value is a serialized version of data structure. Simply, this is a string with 2 kinds of delimiters so that multiple name/value pair can be encoded into single string. This structure contains "ip", "proxy", "hash", "path", "expires" values. Again, "hash" is a checksum hash of the cookie to prevent tempering.
3) TTL is set to the "passexp" value from the voucher.
4) Path is set to a real path which is mapped from the "cpath" value and base URL
5) Domain is the earner's domain.

In FIG. **12*a***: For a Friend (FAF) Sender procedure, shows an embodiment of the process involved when sending content free to a friend. To be eligible for the free for friend promotion, several (three main) conditions should be met. 1) Sender has purchased the item, 2) Seller has decided to use the free for friend to promote their content, 3) The promotion offer is still available. If any of three is not satisfied, sender has to pay the full price for his/her friend. For the purposes of this figure, Spender and Sender are the same.

The FAF procedure can begin when a Spender selects content (item) to send to another spender or potential spender in step 1.

In step 2, The process is initiated based on the availability of following information:

sender identification
receipt id for the previous purchase
item identification
receiver email address and short message (optional)
from given item identification, system fetches full item information The sender, receipt, item information, etc, is based on login, session, or link information provided by a Spender's actions and/or retrieved from Access Rights Transaction server.

In step 3, check is performed at the Access Rights Transaction server to determine whether seller (Earner) elected to promote this specific content using free for a friend. If so, step 4 is used to find out the subsidy amount.

In step 5, the Spender's previous purchase history is checked. If Sender has purchased this specific item before, the subsidy offer is still valid. If not, in step 6, set the subsidy to zero, since the Spender has not passed the condition of the embodiment to send the content using FAF for this example. The purchase history or receipt info can be taken from local cookies or storage records or extracted from the Spenders history when checking the Access Rights Transaction Server.

The steps 3 through 4 and 5 through 6 can be done in any order, and are depicted in the shown order for the shown embodiment. The actual implementation order of the checks and processes can be based on customer policy, subsidy policy, efficiency of design, processing power, or other reasons.

In step 7, if list price is still larger then the seller subsidy (subsidy does not cover entire price), then the sender must pay (8) the price difference. Failing to do so terminates the transaction. If the invention is used to deliver multiple items to multiple recipients, using the FAF send procedure, a more streamlined approach may be used to check the ability to pay for the price difference. In such a condition, the total number of FAF gift codes multiplied by the price difference yields the total cost to the Sender. The total cost should be less than the Sender's account balance or ability to pay to enable the transaction to complete.

In step 9, issue gift code: this code is ties to specific item and is not tied to specific receiver (friend) in a preferred embodiment. Other gift code ties may be used in addition to the item tied code. Such schemes may tie the gift code to the item, receiver, both, or another trackable, unique method.

In step A, the gift code is sent to the friend. The code can be sent via a number of methods, with a simple embodiment sending the code via email. Other methods may include, but are not limited to FTP, SSH, HTTP POST, HTTP GET, SMS, verbal expression, sign language, and more. In a preferred embodiment, a gift code is not tied to specific receiver, which means the code is transferable. If the receiver of the code decided to do so, he/she can give the code to someone else.

Several other conditions can be created or modified in the implementation of this procedure. Likewise, if the three main criteria described in step 1 are not satisfied, another implementation may be used which is based on the For a Friend procedures, but does not distribute content access for free. Also, point out in step 4 that subsidy can be based on time, visits, or an algorithm based on any of several variables including but not limited to Spender purchasing patterns or purchase history, Earner revenue goals, time, visits, revisits, etc. In step 6, the may be special processing set where a Sender is not required to have purchased the content before sending it. There may be marketing, promotional, or other reasons why a Sender can continue a FAF send procedure in this case.

FIG. 12*b*: For a Friend Receiver procedure begins after a Receiver, the friend in the for a friend naming, receives a gift code. For the purposes of this description, the receiver and redeemer are interchangeable.

In Step 1, The process is initiated by the receiver providing the gift code to the system, which is validate by step 2.

In step 3, if the code is not valid (does not exist or expired), system will notify the redeemer in step 4 and will end the interaction.

In step 5, if the redeemer is not already a member in the system, a new account will be created in step 6. If the redeemer is a member, the member account information will be fetched in step 7.

In step 8, system will issue a valid voucher to the receiver and update the receiver's account purchase history, so that the redeemer can access the content as if they have paid for the content by themselves.

In step 9, system will redirect the redeemer's browser to the content.

While the redeemer was used as the receiver for simplicity sake in the explanation above, the redeemer does not have to be the receiver. In addition, additional security may be added into the transaction procedure. Example features could be involve the following:

1) tying an extra secret phrase into the gift code
   sender provide the secret phrase at sender step 1,
   system stores the information at sender step 9
2) this secret phrase will not be sent to the receiver through the same channel, using the same method, or even the same protocol or language. Sender will be asked to transmit the secret phrase using other communication method to the receiver. —secret phrase is not sent at sender step A
3) when the gift code is redeemed, the secret phrase must be presented with the gift code itself. —redeemer provides the secret phrase at receiver step 1.

FIG. 11*a*, Free for a friend link example, shows a visual representation of implementing Free for a friend capabilities. The link 1102 appears on a content page that a Spender has purchased, and, if Free for a friend is enabled, can be used to initiate steps in a Free for a friend process.

FIG. 11*b*: Free for a friend send example, shows an example send page 1106 in the Free for a friend process. If the Free for a friend link 1104 has been clicked, the Free for a friend process begins where information about the content, Sender, and Receiver are entered by the Sender via page 1106. The price subsidy 1107 of the Free for a friend promotion for the item is displayed in this case (e.g., five cents)

FIG. 11*c*: Receiver email example, shows an example email 1111 sent to the Receiver of the free for a friend request. The example email 1111 includes information on the Sender and Receiver, a message created by the sender, and links 1113 to access the content that has been sent Free for a friend. By clicking the link, the Redeemer can access the content. Note: since the gift code is tied to the item, and not the receiver in this case, the Receiver can forward the message to someone else. Whoever uses the gift code first, then becomes the Redeemer who accesses the content. As indicated before, the gift code is tied to the item in the example, however, it may be tied to the Receiver, a passcode or security code, a Sender, or other entity.

It will be understood that the embodiments described herein are presented for the purpose of example only. The invention is described in the claims and equivalents.

What is claimed is:

1. A method of allowing access to web-based content, comprising:

allowing a potential spender to prepay money into an account stored in a database where, at a time such prepayment into the account is made, the prepayment is not associated with a particular sales transaction for web-based content;

receiving from the potential spender an indication that the potential spender desires to initiate the particular sales transaction for the web-based content;

receiving a purchase price cost for access to the web-based content; and authenticating that the potential spender is currently logged into the account and obtaining a threshold value for a purchase price limit set by the potential spender;

providing an indication to the potential spender, prior to initiating the particular sales transaction, that access to the web-based content will be granted when the potential spender has been authenticated as currently logged into the account and the threshold value for a purchase price limit set by the potential spender is greater than or equal to the purchase price cost of the web-based content.

2. The method of claim 1 further comprising a step receiving information from a potential earner about the web-based content, including one of the following: an access duration, a license, an image, a revisit threshold, and an expiration date.

3. The method of claim 1 wherein the web-based content comprises content selected from a group consisting of: animation, film, business information, comics, educational materials, games, game components, mobile telephone ringtones, music, photographs, prose, eBook content, Internet news feeds, and software.

4. The method of claim 1 further comprising steps of (i) registering the potential spender by creating the prepay account and (ii) receiving a payment for deposit in the account.

5. The method of claim 4 wherein the registering the spender further comprises receiving a user-defined delay rate that can be used to give the potential spender a chance to cancel a transaction within a time period set by the delay rate.

6. The method of claim 1 wherein the providing step comprises displaying to the potential spender an icon associated with the web-based content, the icon indicating whether the potential spender has enough money in the account to afford the web-based content.

7. The method of claim 1 wherein the providing step further comprises providing an indication to the potential spender that access to the web-based content will not be granted when the purchase price cost of the web-based content is more than the amount of money in the account.

8. The method of claim 1 wherein the providing step further comprises providing the indication to the potential spender that access to the web-based content will not be granted only when the purchase price cost of the web-based content is more than or equal to a purchase price limit set by the potential spender.

9. A method of allowing access to web-based content, comprising:

allowing a potential spender to prepay money into an account stored in a database where, at a time such prepayment into the account is made, the prepayment is not associated with a particular sales transaction for web-based content;

receiving from the potential spender an indication that the potential spender desires to initiate the particular sales transaction for the web-based content;

receiving a purchase price cost for access to the web-based content; and authenticating that the potential spender is currently logged into the account and obtaining a threshold value for a purchase price limit set by the potential spender;

initiating the particular sales transaction to grant the potential spender access to the web-based content without further confirmation from the potential spender when the potential spender has been authenticated as currently logged into the account and the threshold value for a purchase price limit set by the potential spender is greater than or equal to the purchase price cost of the web-based content.

10. The method of claim 9 further comprising a step of deducting from a balance of the prepay account the purchase price cost of the web-based content in response to initiation of the particular sales transaction.

11. The method of claim 9 further comprising a step receiving information from a potential earner about the web-based content, including one of the following: an access duration, a license, an image, a revisit threshold, and an expiration date.

12. The method of claim 9 wherein the web-based content comprises content selected from a group consisting of: animation, film, business information, comics, educational materials, games, game components, mobile telephone ringtones, music, photographs, prose, eBook content, Internet news feeds, and software.

13. The method of claim 9 further comprising steps of (i) registering the potential spender by creating the prepay account and (ii) receiving a payment for deposit in the account.

14. The method of claim 13 wherein the registering step comprises sending the potential spender a user name and a password.

15. The method of claim 13 wherein the registering step comprises receiving the threshold value for a purchase price limit.

16. The method of claim 13 wherein the registering the spender further comprises receiving a user-defined delay rate that can be used to give the potential spender a chance to cancel a transaction within a time period set by the delay rate.

17. The method of claim 9 further comprising a step of providing an indication to the potential spender, prior to initiating the particular sales transaction, that access to the web-based content will be granted when an amount of money in the account is greater than or equal to the purchase price cost of the web-based content.

18. The method of claim 17 wherein the providing step further comprises providing an indication to the potential spender that access to the web-based content will not be granted when the purchase price cost of the web-based content is more than the threshold value.

19. The method of claim 17 wherein the providing step comprises displaying to the potential spender an icon associated with the web-based content, the icon indicating that the purchase price cost of the web-based content is less than or equal to the threshold value.

20. The method of claim 1 further comprising a step of deducting from a balance of the prepay account the purchase price cost of the web-based content in response to initiation of the particular sales transaction.

* * * * *